(12) United States Patent
Kanetaka

(10) Patent No.: US 7,502,172 B2
(45) Date of Patent: Mar. 10, 2009

(54) ZOOM OPTICAL SYSTEM AND IMAGE TAKING APPARATUS USING THE SAME

(75) Inventor: Fumikazu Kanetaka, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/445,299

(22) Filed: Jun. 2, 2006

(65) Prior Publication Data

US 2006/0285222 A1 Dec. 21, 2006

(30) Foreign Application Priority Data

Jun. 15, 2005 (JP) ............................. 2005-174882
Nov. 11, 2005 (JP) ............................. 2005-327514
Mar. 24, 2006 (JP) ............................. 2006-82886

(51) Int. Cl.
*G02B 15/14* (2006.01)

(52) U.S. Cl. ........................... 359/680; 359/689

(58) Field of Classification Search ............... 359/680, 359/689, 686

See application file for complete search history.

(56) References Cited

U.S. PATENT DOCUMENTS

| 5,483,380 | A | * | 1/1996 | Nozawa | 359/686 |
| 6,088,169 | A | * | 7/2000 | Ohno | 359/682 |
| 6,906,868 | B2 | * | 6/2005 | Minefuji | 359/689 |
| 6,930,839 | B2 | * | 8/2005 | Hagimori et al. | 359/684 |
| 7,016,119 | B2 | * | 3/2006 | Saori | 359/682 |
| 7,085,067 | B2 | * | 8/2006 | Enomoto | 359/680 |
| 7,142,372 | B2 | * | 11/2006 | Eguchi | 359/689 |
| 7,215,482 | B2 | * | 5/2007 | Matsusaka | 359/682 |

FOREIGN PATENT DOCUMENTS

| JP | 2004-318106 A | 11/2004 |
| JP | 2004-318107 A | 11/2004 |

* cited by examiner

*Primary Examiner*—Darryl J Collins
(74) *Attorney, Agent, or Firm*—Kenyon & Kenyon LLP

(57) ABSTRACT

A zoom optical system comprising, in order from an object side: a first lens unit having a negative refractive power; a second lens unit having a positive refractive power; and a third lens unit having a positive refractive power, a space between the lens units being changed to thereby perform zooming and focusing, wherein the first lens unit is constituted of a negative lens.

28 Claims, 42 Drawing Sheets

ZOOM OPTICAL SYSTEM AND IMAGE TAKING APPARATUS USING THE SAME

CROSS REFERENCE TO RELATED APPLICATION

This application claims benefit under 35 U.S.C. § 119 of Japanese Patent Applications of No. 2005-174,882 filed in Japan on Jun. 15, 2005, No. 2005-327,514, filed in Japan on Nov. 11, 2005, and No. 2006-82,886, filed in Japan on Mar. 24, 2006, the contents of which are incorporated herein by reference.

BACKGROUND OF THE INVENTION

1. Field of the Invention

The present invention relates to a zoom optical system, and an image taking apparatus provided with such zoom optical system.

2. Description of the Related Art

There have been known various zoom optical systems including: a first lens unit having a negative refractive power; a second lens unit having a positive refractive power; and a third lens unit having a positive refractive power. In the optical system having such lens arrangement, since the first lens unit has a negative refractive power, the system is advantageous in reducing a diameter of the optical system while securing an appropriate angle of field in a wide-angle end. In addition, various four-unit types of zoom optical systems have also been known. As such zoom optical systems, there are known systems described in Japanese Patent Application Laid-Open Nos. 2004-318,099, 2004-318,106, and 2004-318,107.

BRIEF SUMMARY OF THE INVENTION

The present invention provides a comparatively compact high-performance zoom optical system, and an image taking apparatus using this zoom optical system.

In the present invention, a first type of zoom optical system comprises, in order from an object side: a first lens unit having a negative refractive power; a second lens unit having a positive refractive power; and a third lens unit having a positive refractive power, the zoom optical system changing a space between the lens units to thereby perform zooming and focusing, the first lens unit being constituted of a biconcave negative lens, the zoom optical system satisfies the following condition (1):

$$-3.0 < (r_{1GF} + r_{1GR})/(r_{1GF} - r_{1GR}) < 0.3 \quad (1),$$

wherein $r_{1GF}$ denotes a paraxial radius of curvature of an object-side surface of the negative lens of the first lens unit, and $r_{1GR}$ denotes a paraxial radius of curvature of an image-side surface of the negative lens of the first lens unit.

In the present invention, a second type of zoom optical system has, in order from an object side: a first lens unit having a negative refractive power; a second lens unit having a positive refractive power; and a third lens unit having a positive refractive power, the zoom optical system changing a space between the lens units to thereby perform zooming and focusing, the first lens unit being constituted of a negative lens, the zoom optical system satisfies the following condition (4):

$$-5.0 < f_{1G}/f_{2G} < -1.3 \quad (4),$$

wherein $f_{1G}$ denotes a focal length of the first lens unit, and $f_{2G}$ denotes a focal length of the second lens unit.

In the present invention, a third type of zoom optical system has, in order from an object side: a first lens unit having a negative refractive power; a second lens unit having a positive refractive power; and a third lens unit having a positive refractive power, the zoom optical system changing a space between the lens units to thereby perform zooming and focusing, the first lens unit being constituted of a negative lens, the zoom optical system satisfying the following conditions (5) to (7):

$$1.8 < f_t/f_w \quad (5);$$

$$0.50 < f_{2G}/f_w < 2.00 \quad (6);$$

and $$1.0 < d_{12W}/d_{23W} < \infty \quad (7),$$

wherein $f_W$ denotes a focal length of the zoom optical system in a wide-angle end, $f_t$ denotes a focal length of the zoom optical system in a telephoto end, $f_{2G}$ denotes a focal length of the second lens unit, $d_{12W}$ denotes an axial length between a lens surface of the first lens unit closest to an image side and a lens surface of the second lens unit closest to the object side in the wide-angle end, and $d_{23W}$ denotes an axial length between a lens surface of the second lens unit closest to the image side and a lens surface of the third lens unit closest to the object side in the wide-angle end.

In the present invention, a fourth type of zoom optical system has, in order from an object side: a first lens unit having a negative refractive power; a second lens unit having a positive refractive power; and a third lens unit having a positive refractive power, the zoom optical system changing a space between the lens units to thereby perform zooming and focusing, the first lens unit being constituted of a negative lens, the second lens unit being constituted of, in order from the object side, a positive lens, a positive lens directing a convex surface on the object side and a negative lens directing a concave surface on an image side, the positive lens directing a convex surface on the object side being cemented to the negative lens directing a concave surface on the image side.

In the present invention, a fifth type of zoom optical system has, in order from an object side: a first lens unit having a negative refractive power; a second lens unit having a positive refractive power; and a third lens unit having a positive refractive power, the zoom optical system changing a space between the lens units to thereby perform zooming and focusing, the first lens unit including one negative lens, the third lens unit including a positive lens directing a convex surface on an image side, the zoom optical system satisfying the following condition (8):

$$0.1 < (r_{3GF} + r_{3GR})/(r_{3GF} - r_{3GR}) < 5.0 \quad (8),$$

wherein $r_{3GF}$ denotes a paraxial radius of curvature of an object-side surface of the positive lens of the third lens unit, and $r_{3GR}$ denotes a paraxial radius of curvature of an image-side surface of the positive lens of the third lens unit.

In the present invention, a sixth type of zoom optical system has, in order from an object side: a first lens unit having a negative refractive power; a second lens unit having a positive refractive power; a third lens unit having a positive refractive power; and a fourth lens unit, the zoom optical system changing a space between the lens units to thereby perform zooming and focusing, the first lens unit including a negative lens, the number of lenses included in the first lens, unit being one, the number of lenses included in the second lens unit being three, the number of lenses included in the third lens unit being one, the number of lenses included in the fourth lens unit-being one, the second lens unit including two positive lenses and a negative lens.

In the present invention, a seventh type of zoom optical system has, in order from an object side: a first lens unit having a negative refractive power; a second lens unit having a positive refractive power; a third lens unit having a positive refractive power; and a fourth lens unit, the zoom optical system changing a space between the lens units to thereby perform zooming and focusing, the fourth lens unit being fixed to an image surface.

In the present invention, an eighth type of zoom optical system has, in order from an object side: a first lens unit having a negative refractive power; a second lens unit having a positive refractive power; a third lens unit having a positive refractive power; and a fourth lens unit, the zoom optical system changing a space between the lens units to thereby perform zooming and focusing, the first lens unit being constituted of a biconcave lens, the second lens unit having an aperture stop, the third lens unit being constituted of a positive lens having a convex surface on an image side, the fourth lens unit being constituted of a lens, the number of the lenses constituting the second lens unit being not less than that of the lenses constituting the first lens unit, the third lens unit and the fourth lens unit.

In the present invention, an image taking apparatus comprises: the zoom optical system of the present invention; and an image sensor disposed on an image-surface side of the zoom optical system.

Advantages of the invention will be set forth in the description which follows, and in part will be obvious from the description. Advantages of the invention may be realized and obtained by means of the instrumentalities and combinations particularly pointed out hereinafter.

BRIEF DESCRIPTION OF THE DRAWINGS

The present invention will become more fully understood from the detailed description given below and the accompanying drawings, which are given by way of illustration only and thus are not limitative of the present invention, wherein.

DESCRIPTION OF THE PREFERRED EMBODIMENT

Figure 1A:
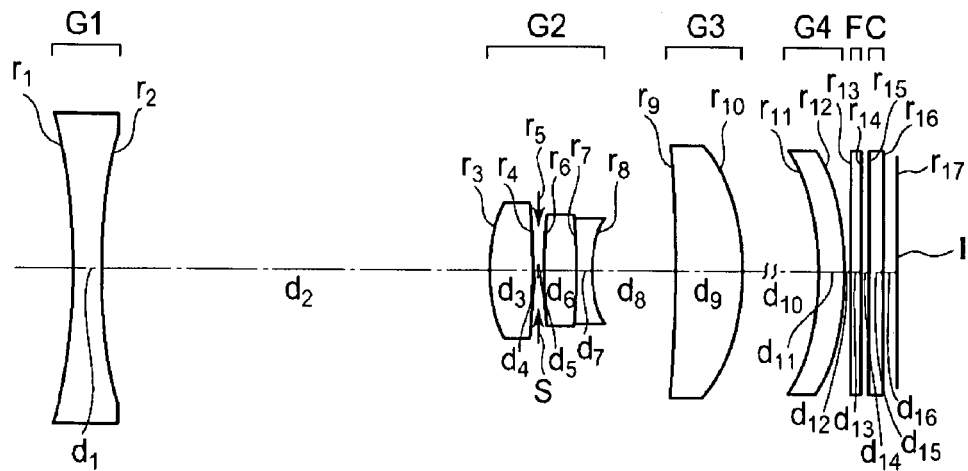
FIGS. 1A to 1C are sectional views in an wide-angle end, an intermediate state and a telephoto end of the zoom optical system of Example 1 of the present invention when focused on an infinite object.

First, there will be described a basic constitution of a zoom optical system of the present invention.

In the present invention, a zoom optical system is based on an optical system having, in order from an object side: a first lens unit having a negative refractive power; a second lens unit having a positive refractive power; and a third lens unit having a positive refractive power. The optical system changes a space between the lens units to thereby perform zooming and focusing, and the first lens unit is constituted of a negative lens.

That is, in the present invention, the zoom optical system is a negative-lead type zoom lens system which includes three or more lens units, in order from an object side, of a negative lens unit, a positive lens unit and a positive lens unit.

According to such lens arrangement, even when a total length is reduced, an appropriate zooming ratio can be secured, and an angle of field in a wide-angle end is easily secured.

On the other hand, when the angle of field is enlarged, the diameter of the first lens unit easily increases. Especially, when the number of the lenses in the first lens unit increases, the diameter of the lens disposed on the object side easily increases.

Therefore, in the present invention, the first lens unit is constituted of a negative lens. In consequence, the first lens unit is easily miniaturized and thinned. This is advantageous in achieving a compact zoom optical system in use or in a collapsed state.

The above-described basic constitution is variously modified to constitute each type of zoom optical system. Each type of optical system will be described hereinafter in detail.

The first type of zoom optical system comprises, in order from an object side, a first lens unit having a negative refractive power, a second lens unit having a positive refractive power and a third lens unit having a positive refractive power. The zoom optical system changes a space between the lens units to thereby perform zooming and focusing, the first lens unit is constituted of a biconcave negative lens, and the zoom optical system satisfies the following condition (1):

$$-3.0 < (r_{1GF} + r_{1GR})/(r_{1GF} - r_{1GR}) < 0.3 \quad (1),$$

wherein $r_{1GF}$ denotes a paraxial radius of curvature of an object-side surface of the negative lens of the first lens unit, and $r_{1GR}$ denotes a paraxial radius of curvature of an image-side surface of the negative lens of the first lens unit.

The condition (1) is set for satisfactorily performing miniaturization and attaining an aberration balance in the state in which the zoom optical system is used.

Below the lower limit of −3.0 in the condition (1), there increases an absolute value of the curvature of the concave surface of the negative lens on the incidence side, and it becomes difficult to suppress distortion and astigmatism on the wide-angle side.

On the other hand, above the upper limit of 0.3 in the condition (1), the principal point of the first lens unit comes close to the image side, and this is disadvantageous in reducing a total length in the image taking state. In addition, there decreases the absolute value of the curvature of the concave surface on the object side. This easily degrades the spherical aberration correcting function of the first lens (the negative lens of the first lens unit), that is, the function of intentionally generating a positive spherical aberration in the first lens so that this positive spherical aberration cancels the spherical aberration of the whole zoom lens.

In the first type, the negative lens of the first lens unit can be provided with an aspherical surface having such a shape that the negative refractive power of the surface weakens with distance from the optical axis.

When the first lens unit is constituted of a negative lens, in the first lens unit, a ray having a large incidence height easily has a large incidence angle on a lens surface. The above-described constitution inhibits the incidence angle of the ray having a large incidence height from being excessively enlarged, and generations of miscellaneous aberrations are easily suppressed. Therefore, a satisfactory aperture can be easily secured, and an optical performance can be appropriately balanced.

The aspherical surface can be disposed on the object-side surface of the negative lens of the first lens unit.

Such constitution can reduce a protruding amount of the peripheral portion of the object-side concave surface of the negative lens, and this is advantageous in reducing the total length.

The aspherical surface preferably satisfies the following condition (2):

$$-0.1 < Asp_{1GF}/r_{1GF} < 0 \quad (2),$$

wherein $Asp_{1GF}$ denotes a deviation of the aspherical surface from a reference sphere in a position where an off-axial chief ray having a maximum angle of field passes through the object-side surface of the negative lens of the first lens unit in the wide-angle end.

Especially, in a case where the aspherical surface is disposed on the object side of the negative lens, the condition (2) is preferably satisfied. It is to be noted that the deviation of the aspherical surface is a length from a reference sphere (a spherical surface whose vertex comes into contact with the aspherical surface and which has a radius of curvature equal to a paraxial radius of curvature of the aspherical surface) to the aspherical surface, the length being measured in a direction parallel to the optical axis.

Below the lower limit value of −0.1 in the condition (2), the deviation of the aspherical surface becomes excessively large, and an off-axial aberration tends to be overcorrected. On the other hand, above the upper limit value of 0, the deviation of the aspherical surface becomes excessively small, and the off-axial aberration tends to be undercorrected. The incident ray height tends to be large on a wide-angle side, and an effect of miniaturization is weakened.

On the other hand, when the image-side surface of the negative lens of the first lens unit is formed to be aspherical, the off-axial aberration of the first lens is effectively reduced.

In this case, the aspherical surface preferably satisfies the following condition (3):

$$-0.01 < Asp_{1GR}/r_{1GR} < 0.1 \quad (3),$$

wherein $Asp_{1GR}$ denotes a deviation of the aspherical surface from a reference sphere in a position where the off-axial chief ray having a maximum angle of field passes through the image-side surface of the negative lens of the first lens unit in the wide-angle end.

In a case where the condition (3) is satisfied, when surface shapes of the object-side surface and the image-side surface are adjusted, both of the correction of the off-axial aberration in the wide-angle end and the miniaturization can satisfactorily be realized.

Next, the second type of zoom optical system will be described. The zoom optical system comprises, in order from an object side: a first lens unit having a negative refractive power; a second lens unit having a positive refractive power; and a third lens unit having a positive refractive power. The zoom optical system changes a space between the lens units to thereby perform zooming and focusing, the first lens unit is constituted of a negative lens, and the zoom optical system satisfies the following condition (4):

$$-5.0 < f_{1G}/f_{2G} < -1.3 \quad (4),$$

wherein $f_{1G}$ denotes a focal length of the first lens unit, and $f_{2G}$ denotes a focal length of the second lens unit.

The condition (4) is set for satisfactorily miniaturizing the zoom optical system and balancing aberrations in the state in which the system is used.

When the first lens unit is constituted of a negative lens, the lens unit advantageously becomes compact when collapsed.

On the other hand, when the first lens unit is constituted of a negative lens, an influence of the aberration on the first lens unit needs to be considered.

The second type of zoom optical system is constituted so that the above condition (4) is satisfied, and the first lens unit has an appropriately small negative refractive power with respect to the positive refractive power of the second lens unit. Therefore, even when the first lens unit is constituted of a negative lens, it is possible to suppress the generations of the aberrations in the first lens unit.

When the negative refractive power of the first lens unit is below the lower limit of −5.0 in the condition (4), the generation of the aberration in the first lens unit is easily suppressed. However, the space between the first lens unit and the second lens unit needs to be lengthened for the zooming, and the total length or diameter tends to increase. Alternatively, the refractive power of the second lens unit becomes excessively large, and the aberration of the second lens unit is not easily suppressed. To avoid this, the number of the lenses constituting the second lens unit needs to be increased, and it becomes difficult to miniaturize the lens unit when collapsed.

On the other hand, when the negative refractive power of the first lens unit is above the upper limit of −1.3 in the condition (4), a large off-axial aberration is easily generated in the first lens unit, and it becomes difficult to correct the aberration.

The negative lens of the first lens unit can be constituted as a biconcave negative lens.

Such constitution more preferably balances a compact size and miscellaneous aberrations in the use state.

The negative lens preferably satisfies the following condition (1):

$$-3.0 < (r_{1GF} + r_{1GR})/(r_{1GF} - r_{1GR}) < 0.3 \quad (1),$$

wherein $r_{1GF}$ denotes a paraxial radius of curvature of an object-side surface of the negative lens of the first lens unit, and $r_{1GR}$ denotes a paraxial radius of curvature of an image-side surface of the negative lens of the first lens unit.

Such constitution is preferably advantageous in securing the miniaturization and an optical performance.

Moreover, it is more preferable that the object-side surface of the negative lens is formed to be aspherical, and the following condition (2) is satisfied.

$$-0.1 < Asp_{1GF}/r_{1GF} < 0 \quad (2),$$

wherein $Asp_{1GF}$ denotes an deviation of the aspherical surface from a reference sphere in a position where an off-axial chief ray having a maximum angle of field passes through the object-side surface of the negative lens of the first lens unit in the wide-angle end.

Such constitution is more preferable in respect of aberration correction and miniaturization.

The third type of zoom optical system comprises, in order from an object side: a first lens unit having a negative refractive power; a second lens unit having a positive refractive power; and a third lens unit having a positive refractive power. The zoom optical system changes a space between the lens units to thereby perform zooming and focusing, the first lens unit is constituted of a negative lens, and the zoom optical system satisfies the following conditions (5) to (7):

$$1.8 < f_t/f_w \quad (5);$$

$$0.50 < f_{2G}/f_W < 2.00 \quad (6);$$

and $$1.0 < d_{12W}/d_{23W} < \infty \quad (7),$$

wherein $f_W$ denotes a focal length of the zoom optical system in a wide-angle end, $f_t$ denotes a focal length of the zoom optical system in a telephoto end, $f_{2G}$ denotes a focal length of the second lens unit, $d_{12W}$ denotes an axial length between a lens surface of the first lens unit closest to an image side and a lens surface of the second lens unit closest to the object side in the wide-angle end, and $d_{23W}$ denotes an axial length between a lens surface of the second lens unit closest to the image side and a lens surface of the third lens unit closest to the object side in the wide-angle end.

In the third type of zoom optical system, in a case where a necessary ray passes through the first lens unit in the vicinity of the wide-angle end in which the axial length between the first lens unit and the second lens unit increases, an effective diameter of the first lens unit is substantially determined.

Therefore, in the third type of zoom optical system, the focal length of the second lens unit is appropriately shortened so as to prevent the first lens unit from being too much separated from the second lens unit in the wide-angle end.

The condition (5) means a zooming ratio of the whole zoom optical system, and is a prerequisite in defining the focal length of the second lens unit.

The condition (6) defines the focal length of the second lens unit which is normalized with that of the whole zoom optical system in the wide-angle end.

When the first lens unit is constituted of a negative lens, the total length is reduced, and also it is possible to provide a margin in the change of the space between the first lens unit and the second lens unit. On the other hand, when the negative refractive power of the first lens unit is strengthened, it becomes difficult to correct the aberration generated in the first lens unit.

However, when an appropriately strong refractive power is imparted to the second lens unit as defined in the condition (6), the zooming ratio above 1.8 is advantageously secured.

When the condition (6) is below the lower limit of 0.50, and the refractive power of the second lens unit increases, this is disadvantageous for the aberration correction of the second lens unit.

When the condition (6) is above the upper limit of 2.00, and the refractive power of the second lens unit decreases, the change of the space between the first lens unit and the second lens unit increases so as to secure the zooming ratio, and an effect of miniaturization is weakened. Alternatively, to realize both of the securing of the zooming ratio and the miniaturizing, the refractive power of the first lens unit has to be strengthened. Therefore, the constituting the first lens unit of a negative lens is disadvantageous in inhibiting the generation of the aberration in the first lens unit.

The condition (7) defines the axial length between the first lens unit and the second lens unit with respect to the axial length between the second lens unit and the third lens unit in the wide-angle end.

If the condition (7) is below the lower limit of 1.0, this is disadvantageous in securing the refractive power of the second lens unit and securing the space between the first lens unit and the second lens unit. This is also disadvantageous in securing both of the miniaturization and the zooming ratio. Alternatively, the refractive powers of the first and second lens units tend to be strengthened, and it becomes difficult to balance the aberrations in the whole zooming range.

The second lens unit can be constituted of three lenses including two positive lenses and one negative lens.

When the first lens unit is constituted of a negative lens, it is difficult to impart a strong refractive power to the first lens unit, and the positive refractive power is concentrated on the second lens unit. Therefore, it is preferable that the aberrations of the second lens unit itself are reduced.

The second lens unit includes two positive lenses, and the positive refractive power is shared by these two positive lenses so as to easily inhibit the generation of the aberration. Furthermore, one negative lens is disposed to generate an aberration opposite to that of the positive lens, and the generation of the spherical aberration or the like can be inhibited in the second lens unit.

Next, the fourth type of zoom optical system will be described. The zoom optical system comprises, in order from an object side: a first lens unit having a negative refractive power; a second lens unit having a positive refractive power; and a third lens unit having a positive refractive power. The zoom optical system changes a space between the lens units to thereby perform zooming and focusing, and the first lens unit is constituted of a negative lens.

The second lens unit is constituted of, in order from the object side, a positive lens, a positive lens directing its convex surface on the object side and a negative lens directing its concave surface on an image side, the positive lens directing its convex surface on the object side being cemented to the negative lens directing its concave surface on the image side.

In the fourth type of zoom optical system, when the first lens unit is constituted of a negative lens, a burden of the zooming function imposed on the second lens unit increases. To solve this problem, the second lens unit is constituted of, in order from the object side, the positive lens, the positive lens directing its convex surface on the object side and the negative lens directing its concave surface on the image side, and the positive refractive power is shared by two positive lenses. Moreover, the spherical aberration opposite to that of the positive lens is generated in the negative lens, so that the optical performance becomes satisfactory.

Moreover, in the second lens unit, the positive lens is cemented to the negative lens to thereby reduce influences of eccentricities of the positive and negative lenses. This is also advantageous in obtaining a compact zoom optical system in the collapsed state.

Furthermore, when the lenses are arranged as described above, the principal point of the second lens unit can be brought close to an object, and this is advantageous in miniaturization of the zoom optical system and enhancement of the zooming ratio.

In the fourth type of zoom optical system, an aperture stop can be disposed between the positive lens and the positive lens directing its convex surface on the object side in the second lens unit.

When the first lens unit is constituted of only one negative lens, the aperture stop is preferably disposed in the above-described position. By disposing the aperture stop in this position, the negative lens and the positive lens are arranged on the object side of the aperture stop. This is advantageous in correcting distortion or chromatic aberration of magnification. This is also advantageous in that the aperture stop is not excessively separated from the first lens unit, and the diameter of the first lens unit is reduced.

The aperture shape of the aperture stop may be fixed. In this case, a member for adjusting brightness may be disposed in a space between other lenses.

In this constitution, since the aperture shape of the aperture stop is fixed, the lenses before and after the aperture stop can be brought close to the aperture stop, and this is advantageous in achieving a compact zoom optical system. It is especially preferable that the brightness adjusting member is constituted as a stop having a variable aperture shape, the member is disposed immediately before the second lens unit, and the member is constituted so as to move integrally with the second lens unit during the zooming.

According to such constitution, the diameters of the lens units are well balanced in a state having a small F number. In addition, since a chief ray position deviates little during the brightness adjustment, the system can be constituted with less aberration fluctuations.

Next, the fifth type of zoom optical system will be described. The zoom optical system comprises, in order from an object side: a first lens unit having a negative refractive power; a second lens unit having a positive refractive power; and a third lens unit having a positive refractive power. The zoom optical system changes a space between the lens units to thereby perform zooming and focusing, the first lens unit is constituted of a negative lens, the third lens unit includes a positive lens directing its convex surface on an image side, and the zoom optical system satisfies the following condition (8):

$$0.1<(r_{3GF}+r_{3GR})/(r_{3GF}-r_{3GR})<5.0 \qquad (8),$$

wherein $r_{3GF}$ denotes a paraxial radius of curvature of an object-side surface of the positive lens of the third lens unit, and $r_{3GR}$ denotes a paraxial radius of curvature of an image-side surface of the positive lens of the third lens unit.

The constituting the third lens unit of a positive lens is advantageous in securing the movement space of the second lens unit, achieving miniaturization, and increasing the zooming ratio. The third lens unit is formed into such a shape that the above condition (8) is satisfied, and the curvature of the convex image-side surface of the positive lens is increased. Accordingly, while the principal point is brought close to the image side, and aberrations are balanced, the positive lens is brought close to the center of the optical system (as viewed in the optical axis direction), and the diameter of the lens is inhibited from being enlarged.

If the condition (8) is below the lower limit of 0.1, an incidence angle of an off-axial ray increases in the object-side surface of the third lens unit. This is disadvantageous in correcting an off-axial aberration. If the condition (8) is above the upper limit of 5.0, the third lens unit has an extreme meniscus shape, and it becomes difficult to inhibit the generation of the aberration in the image-side surface.

In the fifth type, the focusing may be performed by moving only the third lens unit.

According to such constitution, since only one lens is movable during the focusing, a driving mechanism for the focusing can be simplified. Especially, since the third lens unit has a convex surface having a large curvature on the image side, there are reduced fluctuations of the incidence angle of an off-axial chief ray due to the movement for the focusing. There are also reduced aberration fluctuations due to the movement of the third lens unit for the focusing.

Moreover, when the third lens unit is constituted of a plastic molded lens, the lens can be inexpensive.

Furthermore, the image-side surface of the third lens unit has a large curvature, but when this surface is formed to be aspherical, the generations of the aberrations can be easily inhibited.

It is to be noted that each type of zoom optical system can be constituted so that a fourth lens unit having an aspherical surface is disposed between the third lens unit and the image surface, and the space between the third lens unit and the fourth lens unit is changed for the zooming or the focusing.

When the fourth lens unit is disposed between the third lens unit and the image surface, and the aspherical surface is disposed in the fourth lens unit, it is easy to obtain a function of maintaining flatness of the image surface at a time when the space between the third lens unit and the fourth lens unit is changed, or adjusting fluctuations of the entrance pupil position.

Moreover, this type of zoom optical system has an effect of reducing the aberration fluctuations in a case where the focusing is performed by moving only the third lens unit.

Furthermore, when any lens having the aspherical surface in the fourth lens unit is the plastic molded lens, the lens becomes light in weight and it becomes easy to manufacture the aspherical surface.

In addition, each type of zoom optical system can be constituted so that the fourth lens unit as a single lens is disposed between the third lens unit and the image surface, and the space between the third lens unit and the fourth lens unit is changed for the zooming or the focusing.

Such constitution is preferable in reducing the total length of the zoom optical system.

Moreover, each type of zoom optical system can be constituted so that the fourth lens unit having a positive refractive power is disposed between the third lens unit and the image surface, and the space between the third lens unit and the fourth lens unit is changed for the zooming or the focusing.

Such constitution is preferable in correcting the aberration, because the positive refractive power of the fourth lens unit can share a part of the positive refractive power of the third lens unit.

Furthermore, in the constitution in which the space between the third lens unit and the fourth lens unit is changed for the zooming, an effect is easily obtained such as reduction of aberration fluctuations accompanying the zooming, reduction of fluctuations of the entrance pupil position or reduction of fluctuations of the total length.

In addition, fixing of the fourth lens unit during the zooming and the focusing is advantageous in miniaturizing the lens driving mechanism.

Moreover, it is preferable that the change amount of the space between the third lens unit and the fourth lens unit during the zooming is small as compared with the change amount of the space between the first lens unit and the second lens unit and the change amount of the space between the second lens unit and the third lens unit. According to such constitution, the aberration fluctuations accompanying the movement of the third lens unit can be reduced.

Next, the sixth type of zoom optical system will be described. The zoom optical system comprises, in order from an object side: a first lens unit having a negative refractive power; a second lens unit having a positive refractive power; a third lens unit having a positive refractive power; and a fourth lens unit, and the zoom optical system changes a space between the lens units to thereby perform zooming and focusing. The first lens unit includes a negative lens, the number of lenses included in the first lens unit is one, the number of lenses included in the second lens unit is three, the number of lenses included in the third lens unit is one, the number of lenses included in the fourth lens unit is one, and the second lens unit is constituted of two positive lenses and a negative lens.

Such constitution is advantageous in maintaining an aberration performance while constituting the optical system to be compact in a used or collapsed state.

To miniaturize the zoom optical system in the used or collapsed state, it is advantageous to reduce the number of the lenses included in the zoom optical system. In the case where the zoom optical system comprises, in order from the object side, four or more lens units of a negative lens unit, a positive lens unit, a positive lens unit and a lens unit, the height of the off-axial ray is large in the first lens unit. Therefore, the first lens unit constituted of one lens is advantageous in reducing the size of the zoom optical system in the diametric direction. In the first lens-unit constituted of one negative lens, enlargement of the first lens unit in a thickness direction is easily inhibited. This is advantageous in reducing the total length in the used or collapsed state.

On the other hand, the second lens unit having the positive refractive power has a function of performing the zooming by changing the space between the first lens unit and the second lens unit. Therefore, the burden of the zooming function imposed on the second lens unit easily becomes large, and influences on aberration fluctuations easily become large. Therefore, when the three lenses in the second lens unit include two positive lenses and one negative lens, the positive refractive power of the second lens unit is easily secured. Moreover, since one negative lens is included in the second lens unit, aberrations of the second lens unit itself are easily reduced.

Moreover, since the second lens unit performs a zooming function or the like, each of the third lens unit and the fourth lens unit may be constituted of one lens, and this contributes to miniaturization.

It is to be noted that in a case where a lens unit is further provided in addition to the first lens unit having the negative refractive power, the second lens unit having the positive refractive power and the third lens unit having the positive refractive power arranged in order from the object side, it is preferable that the fourth lens unit is added between the third lens unit and the image, and the zoom optical system is formed as a four-unit zoom optical system as a whole.

Such constitution is preferable for miniaturizing the zoom optical system and maintaining the optical performance.

In a case where the fourth lens unit is added, the fourth lens unit is preferably fixed during the zooming. Such constitution is preferable, because a movement mechanism for the zooming can be simplified.

In each type of zoom optical system described above, the total number of the lenses included in the zoom optical system is preferably six. Such constitution is more preferable in constituting the system to be compact.

Moreover, each type of zoom optical system described above preferably satisfies the following condition:

$$0.6 < TLG_{sum}/f_W < 1.7 \qquad (9),$$

wherein $TLG_{sum}$ denotes a sum of thicknesses of the lens units constituting the zoom optical system, and $f_W$ denotes a focal length of the zoom optical system in the wide-angle end.

If the condition (9) is below the lower limit of 0.6, the thickness of the lens unit is reduced, and it becomes difficult to miniaturize the system while the aberrations are kept in balance. If the condition (9) is above the upper limit of 1.7, the thickness of the zoom optical system, when collapsed, increases.

Instead of the condition (9), the following condition (10) or (11) may be satisfied. Moreover, these conditions may be satisfied at the same time:

$$0.2 < TLG_{sum}/f_t < 1.5 \qquad (10),$$

wherein $TLG_{sum}$ denotes the sum of the thicknesses of the lens units constituting the zoom optical system, and ft denotes a focal length of the zoom optical system in a telephoto end.

If the condition (10) is below the lower limit of 0.2, the thickness of the lens unit is reduced, and it becomes difficult to miniaturize the system while the aberrations are kept in balance. If the condition (10) is above the upper limit of 1.5, the thickness of the zoom optical system, when collapsed, increases.

$$1.2 < TLG_{sum}/Y' < 3.0 \qquad (11),$$

wherein $TLG_{sum}$ denotes the sum of the thicknesses of the lens units constituting the zoom optical system, and Y' denotes an image height. In the case where the zoom optical system is used with an electronic image sensor, the image height Y' is a half of the diagonal length of an effective image taking region of the light receiving surface of the image sensor.

If the condition (11) is below the lower limit of 1.2, the thickness of the lens unit is reduced, and it becomes difficult to miniaturize the system while the aberrations are kept in balance. If the condition (11) is above the upper limit of 3.0, the thickness of the zoom optical system, when collapsed, increases.

It is to be noted that the effective image taking region of the light receiving surface means a region for obtaining image information for use in printing, displaying or the like on the light receiving surface of the image sensor which receives an optical image formed by the zoom optical system.

Figure 46:
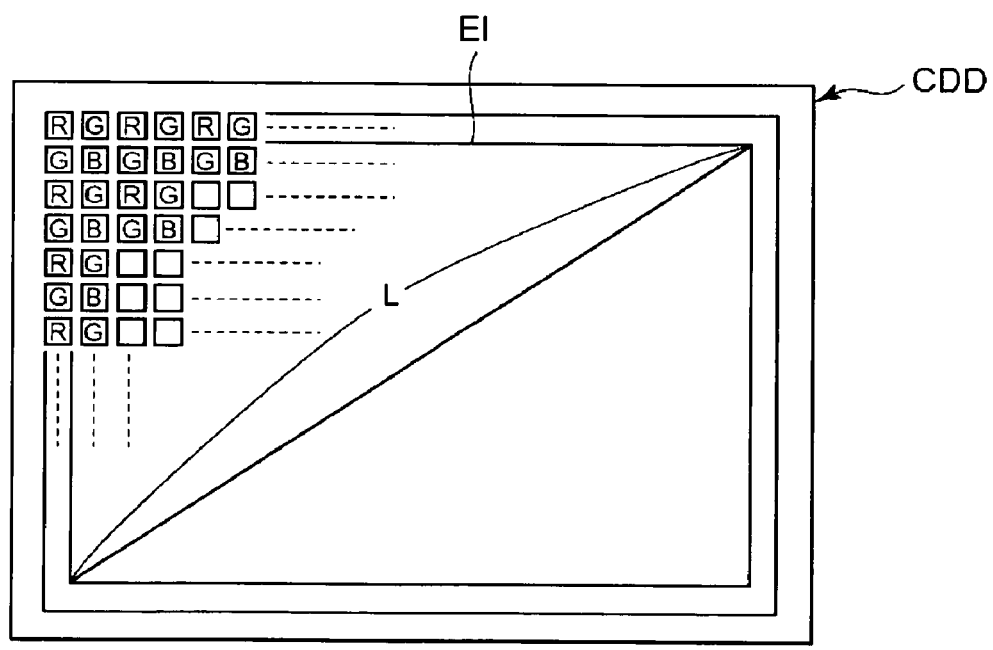
FIG. 46 is an explanatory view of an effective image taking region of an image sensor.

In a case where the effective image taking region of the image sensor is rectangular, and the optical axis of the zoom lens system passes through the center of the effective image taking region, the image height in the effective image taking region of the light receiving surface is a half of the diagonal length L of the effective image taking region. The diagonal length L of the effective image taking region will be described. FIG. 46 is a diagram showing an example of the pixel arrangement on the image receiving surface of the image sensor. In this example, red (R), green (G) and blue (B) pixels are arranged at an equal pitch in a mosaic form. The effective image taking region means a region in the light receiving surface of the image sensor for use in reproducing the taken image (displaying the image in a personal computer, printing the image by a printer or the like).

An effective image taking region E1 is sometimes set to be smaller than the whole light receiving surface of the image sensor in accordance with a performance of the optical system as shown in, for example, FIG. 46. For example, as to an image (image circle) obtained by the optical system, an image quality of a peripheral portion is inferior to that of the center in many cases. In such case, it is an example that the region is set to be small, in which a part of the peripheral portion of the image circle is not used in reproducing the image. In this example, the length L is the diagonal length of this effective image taking region set to be small.

Each type of zoom optical system described above preferably satisfies the following condition (12):

$$-3.0 < \Delta_{12WT}/f_W < -1 \qquad (12),$$

wherein $\Delta_{12WT}$ denotes a difference of a space between the first lens unit and the second lens unit in the telephoto from that in the wide-angle end, and $f_W$ denotes a focal length of the zoom optical system in the wide-angle end.

If the condition (12) is below the lower limit value of −3.0, the total length easily increases. If the condition (12) exceeds the upper limit value of −1, the zoom optical system is disadvantageous in securing a zooming ratio.

Instead of the condition (12), the following condition (13) or (14) may be satisfied. Moreover, these condition formulas may be satisfied at the same time:

$$-0.9 < \Delta_{12WT}/f_t < -0.3 \qquad (13),$$

wherein $\Delta_{12WT}$ denotes a difference of a space between the first lens units and the second lens units in the telephoto end from that in the wide-angle end, and $f_t$ denotes a focal length of the zoom optical system in the telephoto end.

$$-5.0 < \Delta_{12WT}/Y' < -1.0 \qquad (14),$$

wherein $\Delta_{12WT}$ denotes a difference of a space between the first lens units and the second lens units in the telephoto end and the wide-angle end. In the case where the zoom optical system is used with an electronic image sensor, the image height Y' is a half of the diagonal length of an effective image taking region of the light receiving surface of the image sensor.

Next, a seventh type of zoom optical system will be described. The zoom optical system comprises, in order from an object side: a first lens unit having a negative refractive power; a second lens unit having a positive refractive power; a third lens unit having a positive refractive power; and a fourth lens unit, the zoom optical system changes a space between the lens units to thereby perform zooming and focusing, and the fourth lens unit is fixed to an image surface.

According to such constitution, it is possible to achieve a small-sized zoom optical system which has less constituting lenses and whose zooming ratio is about three-fold.

In this type of zoom optical system, the focusing can be performed by moving only the third lens unit.

Moreover, each of the first lens unit and the fourth lens unit is preferably constituted of one lens element. Furthermore, the third lens unit is preferably constituted of one lens element.

In addition, the fourth lens unit preferably has the positive refractive power.

Moreover, the first lens unit preferably moves along a locus convex toward the image side during the zooming from the wide-angle end toward the telephoto end.

Furthermore, the second lens unit preferably moves toward the object side during the zooming from the wide-angle end toward the telephoto end.

In addition, preferably, the movement amount of the third lens unit, during the zooming from the wide-angle end to the telephoto end when focused on an infinite object, is smaller than the movement amount of a focusing lens unit during focusing from an object at infinity to an object at the minimum object distance in the telephoto end.

Moreover, the second lens unit is preferably constituted of a positive lens element and a negative lens component. Here, the lens component means a single lens or a cemented lens.

Furthermore, the second lens unit is preferably constituted of, in order from the object side, a positive lens element, and a cemented lens formed by cementing a positive lens element to a negative lens element.

In addition, an aperture stop is preferably disposed between the positive lens element and the negative lens component in the second lens unit.

Moreover, a light quantity adjusting element is arranged with a lens component between the aperture stop and the light quantity adjusting element. Here, the light quantity adjusting element includes an element such as a shutter for adjusting a quantity of light with an elapse of time, and an element such as an ND filter for changing light transmittance to adjust the quantity of light.

Furthermore, the zoom optical system is preferably constituted so that the maximum ray height of the fourth lens unit is higher than that of the third lens unit in a wide-angle state, and the maximum ray height of the fourth lens unit is lower than that of the third lens unit in a telephoto state.

Next, the eighth type of zoom optical system will be described. The zoom optical system comprises, in order from an object side: a first lens unit having a negative refractive power; a second lens unit having a positive refractive power; a third lens unit having a positive refractive power; and a fourth lens unit, and the zoom system changes a space between the lens units to thereby perform zooming and focusing.

The first lens unit is constituted of a biconcave lens, the second lens unit has an aperture stop, the third lens unit is constituted of a positive lens having a convex surface on an image side and the fourth lens unit is constituted of a lens.

The number of the lenses constituting the second lens unit is not less than that of the lenses constituting the first lens unit, the third lens unit and the fourth lens unit.

In the first lens unit, the outer diameter tends to increase in order to secure the angle of field on the wide-angle side. This tendency is strengthened, when the total length of the first lens unit increases. When the first lens unit is constituted of one lens, the number of the constituting lenses is reduced. Therefore, the zoom optical system can be constituted to be compact, and the outer diameter can be reduced. When this lens is constituted to be biconcave, basic (low-order) aberration correction can efficiently be performed in two surfaces. On the other hand, when the first lens unit is constituted of one lens, a capability of correcting a chromatic aberration becomes insufficient in the first lens unit.

To effectively compensate for this insufficiency, the third lens unit is constituted of one positive lens having a convex surface on an image side. Since the convex surface is disposed on the image side, the principal point is moved toward an image side, and the correction effect can be improved. Moreover, the exit pupil position can be shifted toward the object side, and the position can be adapted to a characteristic of an image sensor (the exit pupil comes close to a position for establishing an image-side telecentric optical system). Furthermore, the fourth lens unit is disposed in order to reduce image surface fluctuations generated by the third lens unit constituted of the lens having the convex surface on the image side. Each of the first lens unit, the third lens unit and the fourth lens unit is constituted of one lens. Moreover, since the second lens unit bears the burden of aberration correcting function of various aberrations, mainly an axial aberration, the number of the lenses constituting the second lens unit is set to be not less than that of the lenses constituting the first lens unit, the third lens unit and the fourth lens unit. In the second lens unit, even if the number of the lenses increases, the lens outer diameter can be reduced because the lens is disposed in the vicinity of the aperture stop. Therefore, it is possible to use the lens having small lens thickness. Also, an eccentricity between the lenses can be reduced by assembling the lens unit with high precision. Therefore, this is not contrary to the compactness.

The second lens unit is preferably constituted of four or less lenses including at least two positive lenses and at least one negative lens. This arrangement is suitable for strengthening the positive power of the second lens unit, and correcting the chromatic aberration. The second lens unit is further preferably constituted of two positive lenses and one negative lens.

This type of zoom optical system can be constituted so that the fourth lens unit is constituted of a meniscus lens directing its concave surface on the object side, and the third lens unit is moved to perform focusing.

A concave surface is disposed on the object side of the fourth lens unit. Therefore, even when the third lens unit is moved to perform the focusing, especially fluctuations of a curvature of field can be reduced. Furthermore, when the fourth lens unit is constituted of a meniscus lens, the space occupied by the fourth lens unit can be reduced.

The fourth lens unit is further preferably fixed with respect to the image surface during the zooming and the focusing.

Moreover, this type of zoom lens preferably satisfies the following condition (1):

$$-3.0 < (r_{1GF} + r_{1GR})/(r_{1GF} - r_{1GR}) < 0.3 \tag{1},$$

wherein $r_{1GF}$ denotes a paraxial radius of curvature of an object-side surface of the negative lens of the first lens unit, and $r_{1GR}$ denotes a paraxial radius of curvature of an image-side surface of the negative lens of the first lens unit.

Furthermore, this type of zoom optical system preferably satisfies the following conditions (5) to (7):

$$1.8 < f_t/f_W \tag{5};$$

$$0.50 < f_{2G}/f_W < 2.00 \tag{6};$$

and $$1.0 < d_{12W}/d_{23W} < 0 \tag{7},$$

wherein $f_W$ denotes a focal length of the zoom optical system in a wide-angle end, $f_t$ denotes a focal length of the zoom optical system in a telephoto end, $f_{2G}$ denotes a focal length of the second lens unit, $d_{12W}$ denotes an axial length between a lens surface of the first lens unit closest to an image side and a lens surface of the second lens unit closest to the object side in the wide-angle end, and $d_{23W}$ denotes an axial length between a lens surface of the second lens unit closest to the image side and a lens surface of the third lens unit closest to the object side in the wide-angle end.

Moreover, this type of zoom optical system may be constituted so that an aperture shape of the aperture stop is fixed, and a member for adjusting brightness is disposed in a space between other lenses.

Furthermore, this type of zoom optical system preferably satisfies the following condition (8):

$$0.1 < (r_{3GF} + r_{3GR})/(r_{3GF} - r_{3GR}) < 5.0 \qquad (8),$$

wherein $r_{3GF}$ denotes a paraxial radius of curvature of an object-side surface of the positive lens of the third lens unit, and $r_{3GR}$ denotes a paraxial radius of curvature of an image-side surface of the positive lens of the third lens unit.

The above constitutions can appropriately be combined regardless of whether the constitutions have been described above as modifications of one type or as different types. Moreover, when a plurality of constitutions is simultaneously satisfied, a miniaturizing effect, an aberration correcting effect and the like can be obtained more easily.

That is, even when constitutions described in a certain type of zoom optical system are applied to another type of zoom optical system, a more preferable effect can be obtained.

Moreover, the above-described conditions may arbitrarily be combined.

Furthermore, it is more preferable from a viewpoint of correction of an off-axial aberration that in the condition (1), the lower limit value is set to −2.0, further −1.0. From a viewpoint of miniaturization or correction of an axial aberration, it is more preferable that the upper limit value is set to 0.1, further 0.00, still further −0.005.

It is more preferable from a viewpoint of the aberration correction that in the condition (2), the lower limit value is set to −0.08, further −0.05. It is more preferable that the upper limit value is set to −0.01.

It is more preferable from a viewpoint of the aberration correction that in the condition (3), the lower limit value is set to 0.00, further 0.0005. It is more preferable that the upper limit value is set to 0.05, further 0.01.

It is more preferable from a viewpoint of the correction of the off-axial aberration that in the condition (4), the lower limit value is set to −3.0, further −2.0. From a viewpoint of the miniaturization or the correction of the axial aberration, it is more preferable that the upper limit value is set to −1.4, further −1.5.

It is preferable that the upper limit value of the condition (5) is set to 20.0 so as to prevent the zooming ratio from being excessively large. In a case where the zooming ratio is excessively large, when the maintaining of the optical performance and the constituting of the compact zoom optical system are to be achieved at the same time, the lens shape becomes complicated, or the number of necessary lenses increases, or an optical material to be used becomes expensive. Furthermore, it is more preferable from viewpoints of an optical performance and miniaturization that the lower limit value is set to 2.5 and the upper limit value is set to 4.0.

In addition, it is more preferable that the lower limit value of the condition (6) is set to 1.0, further 1.2. It is more preferable that the upper limit value is set to 1.8, further 1.6.

It is more preferable that the lower limit value of the condition (7) is set to 2.0, further 4.0. When the upper limit value is set to 20.0, it becomes easy to give the third lens unit a function of collimating the off-axial light beams from the second lens unit. In a case where the third lens unit is moved to perform the focusing, it is possible to secure a space for the focusing movement in the wide-angle end. Furthermore, it is more preferable to set the upper limit value to 10.0.

Moreover, as to the condition (8), it is more preferable that the lower limit value is set to 0.3, further 0.5. It is more preferable that the upper limit value is set to 3.0, further 2.5.

Moreover, it is more preferable that the lower limit value of the condition (9) is set to 0.8, further 1.0. It is more preferable to set the upper limit value to 1.5, further 1.3.

Furthermore, it is more preferable that the lower limit value of the condition (10) is set to 0.25, further 0.3. It is more preferable to set the upper limit value to 0.45, further 0.43.

In addition, as to the condition (11), it is more preferable that the lower limit value is set to 1.5, further 1.8. It is more preferable that the upper limit value is set to 2.8, further 2.5.

Moreover, it is more preferable that the lower limit value of the condition (12) is set to −2.5, further −2.2. The upper limit value is more preferably set to −1.3, further −1.5.

Furthermore, as to the condition (13), it is more preferable that the lower limit value is set to −0.8, further −0.7. It is more preferable that the upper limit value is set to −0.4, further −0.5.

Moreover, it is more preferable that the lower limit value of the condition (14) is set to −4.0, further −3.5. The upper limit value is more preferably set to −1.5, further −2.0.

Each of the above zoom optical systems has less constituting lenses, is small-sized, and has a satisfactory performance. The constitution is advantageous in miniaturizing the system when collapsed.

All of the above zoom optical systems can be used as an image taking optical system of an image taking apparatus. The image taking apparatus of the present invention includes any of the above-described zoom optical systems and an electronic image sensor disposed on the image side of the zoom optical system.

Since the above zoom optical system is advantageous for the miniaturization, the image taking apparatus using this zoom optical system is also advantageous for the miniaturization.

Next, specific numerical examples will be described.

Examples 1 to 18 of the zoom optical system will be described hereinafter.

FIGS. 1A to 18C show sectional views of the zoom optical systems of the Examples 1 to 18 when focused on an infinite object. In these drawings, FIGS. 1A, 2A, 3A, 4A, 5A, 6A, 7A, 8A, 9A, 10A, 11A, 12A, 13A, 14A, 15A, 16A, 17A and 18A are sectional views in the wide-angle end. FIGS. 1B, 2B, 3B, 4B, 5B, 6B, 7B, 8B, 9B, 10B, 11B, 12B, 13B, 14B, 15B, 16B, 17B and 18B are sectional views in an intermediate state. FIGS. 1C, 2C, 3C, 4C, 5C, 6C, 7C, 8C, 9C, 10C, 11C, 12C, 13C, 14C, 15C, 16C, 17C and 18C are sectional views in the telephoto end. In these drawings: a first lens unit is denoted with G1; a second lens unit is denoted with G2; a third lens unit is denoted with G3; a fourth lens unit is denoted with G4; an aperture stop is denoted with S; F denotes a parallel flat plate constituting a low pass filter coated with a wavelength range restricting coating which cuts off an infrared light; C denotes a parallel flat plate which is a cover glass of an electronic image sensor such as a CCD image sensor or a CMOS type image sensor; and an image surface is denoted with I. It is to be noted that the surface of the cover glass C may be coated with a wavelength range restricting multi-layer thin film. The cover glass C may be provided with a low pass filter function.

EXAMPLE 1

Figure 1B:
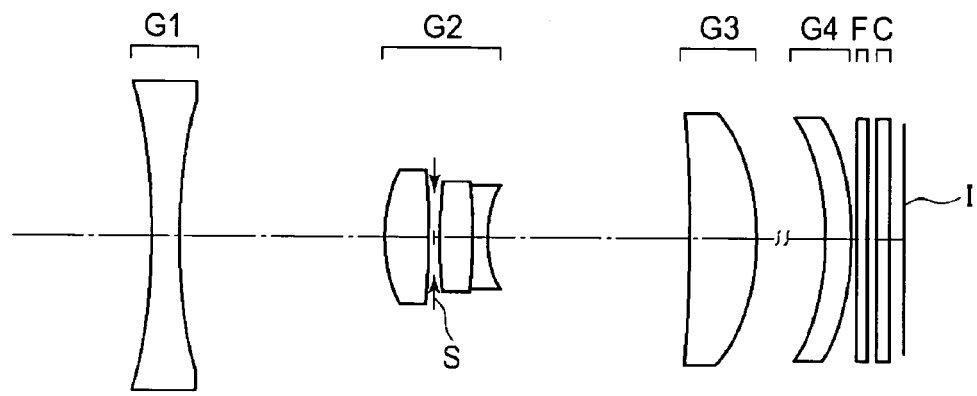
Figure 1C:
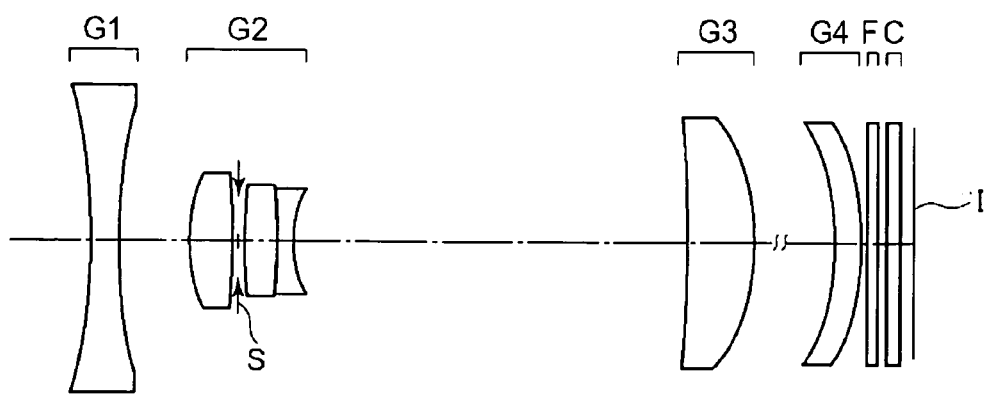

As shown in FIGS. 1A to 1C, the zoom optical system of Example 1 comprises, in order from the object side: a first lens unit G1 having a negative refractive power; a second lens unit G2 having a positive refractive power; a third lens unit G3 having a positive refractive power; and a fourth lens unit G4 having a positive refractive power. When zooming is performed from the wide-angle end to the telephoto end, the first lens unit G1 moves along a locus concave toward the object side, and is arranged slightly closer to the image side in the telephoto end than in the wide-angle end. The aperture stop S and the second lens unit G2 integrally and monotonously move toward the object side. The third lens unit G3 moves along a locus concave toward the object side while increasing the space between the third lens unit and the second lens unit G2. The third lens unit is arranged slightly closer to the image side in the telephoto end than in the wide-angle end. The fourth lens unit G4 is fixed with respect to the image surface I.

The first lens unit G1 is constituted of one biconcave negative lens, and the second lens unit G2 is constituted of, in order from the object side, a biconvex positive lens, and a cemented lens of a biconvex positive lens and a biconcave negative lens. The third lens unit G3 constituted of one positive meniscus lens directing its concave surface on the object side, and the fourth lens unit G4 constituted of one positive meniscus lens directing its concave surface on the object side. The aperture stop S is disposed between the biconvex positive lens and the cemented lens of the biconvex positive lens and the biconcave negative lens in the second lens unit G2.

Aspherical surfaces are used on six surfaces: opposite surfaces of the biconcave negative lens of the first lens unit G1; opposite surfaces of the biconvex positive single lens of the second lens unit G2; the image-side surface of the positive meniscus lens of the third lens unit G3; and the object-side surface of the positive meniscus lens of the fourth lens unit G4.

It is to be noted that the diagonal length of the effective image taking region of the image sensor disposed on the image surface I is 7.2 mm.

EXAMPLE 2

Figure 2A:
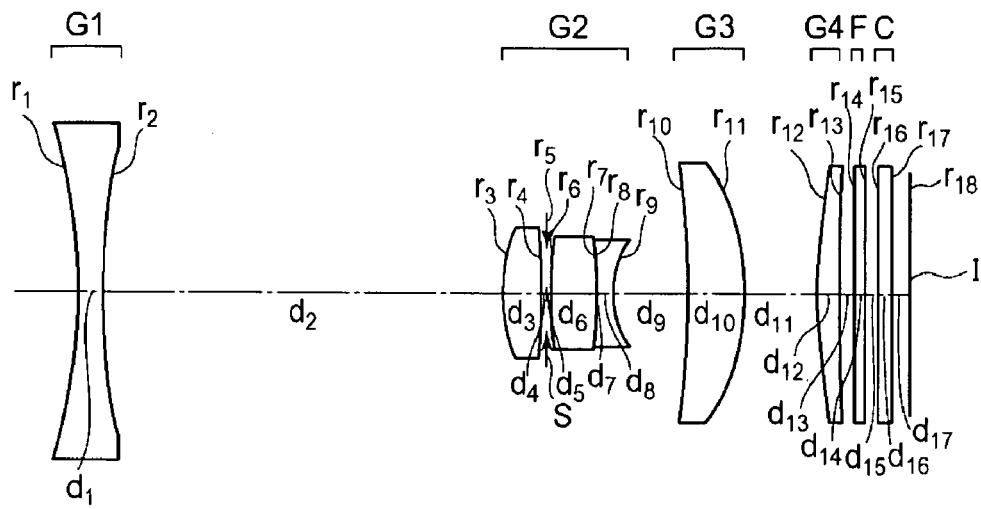
FIGS. 2A to 2C are sectional views similar to those of FIG. 1 of Example 2 of the present invention.
Figure 2B:
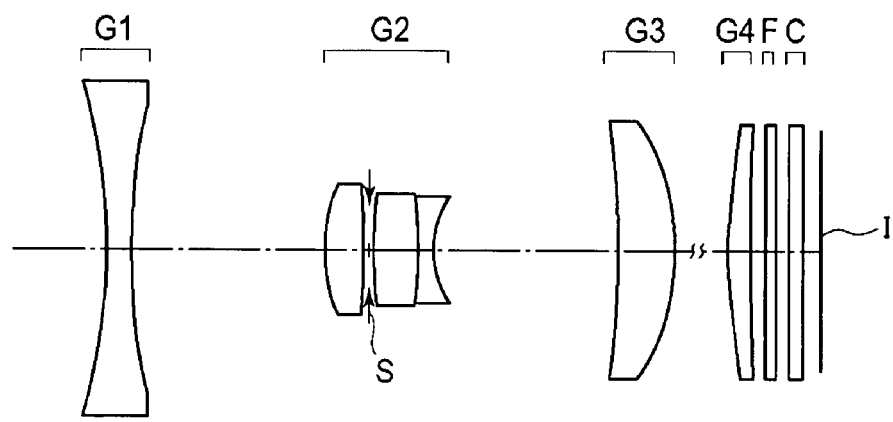
Figure 2C:
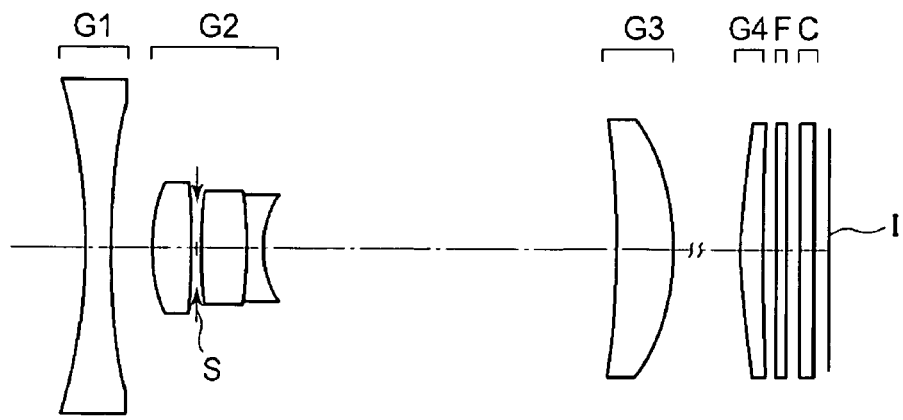

As shown in FIGS. 2A to 2C, the zoom optical system of Example 2 comprises, in order from the object side: a first lens unit G1 having a negative refractive power; a second lens unit G2 having a positive refractive power; a third lens unit G3 having a positive refractive power; and a fourth lens unit G4 having a positive refractive power. When zooming is performed from the wide-angle end to the telephoto end, the first lens unit G1 moves along a locus concave toward the object side, and is arranged slightly closer to the image side in the telephoto end than in the wide-angle end. The aperture stop S and the second lens unit G2 integrally and monotonously move toward the object side. The third lens unit G3 moves along a locus concave toward the object side while increasing the space between the third lens unit and the second lens unit G2. The third lens unit is arranged slightly closer to the image side in the telephoto end than in the wide-angle end. The fourth lens unit G4 is fixed with respect to the image surface I.

The first lens unit G1 constituted of one biconcave negative lens, and the second lens unit G2 constituted of, in order from the object side, a biconvex positive lens, and a cemented lens of a biconvex positive lens and a biconcave negative lens. The third lens unit G3 constituted of one positive meniscus lens directing its concave surface on the object side, and the fourth lens unit G4 constituted of one positive meniscus lens directing its convex surface on the object side. The aperture stop S is disposed between the biconvex positive lens and the cemented lens of the biconvex positive lens and the biconcave negative lens in the second lens unit G2.

Aspherical surfaces are used on five surfaces: opposite surfaces of the biconcave negative lens of the first lens unit G1; the object-side surface of the biconvex positive single lens of the second lens unit G2; the image-side surface of the positive meniscus lens of the third lens unit G3; and the object-side surface of the positive meniscus lens of the fourth lens unit G4.

It is to be noted that the diagonal length of the effective image taking region of the image sensor disposed on the image surface I is 7.6 mm.

EXAMPLE 3

Figure 3A:
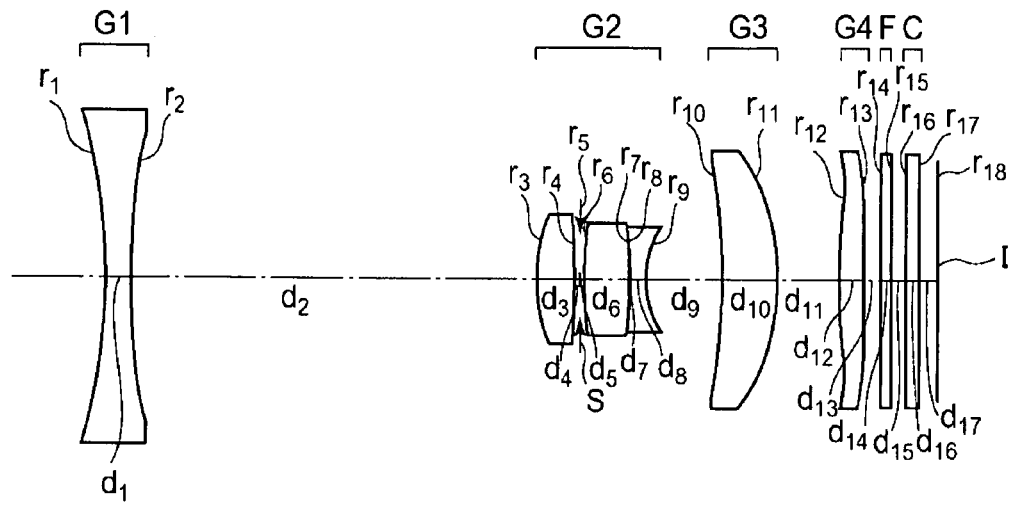
FIGS. 3A to 3C are sectional views similar to those of FIG. 1 of Example 3 of the present invention.
Figure 3B:
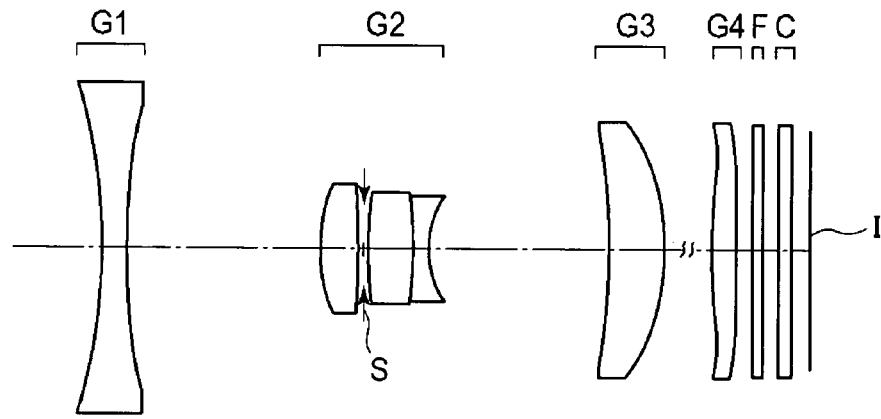
Figure 3C:
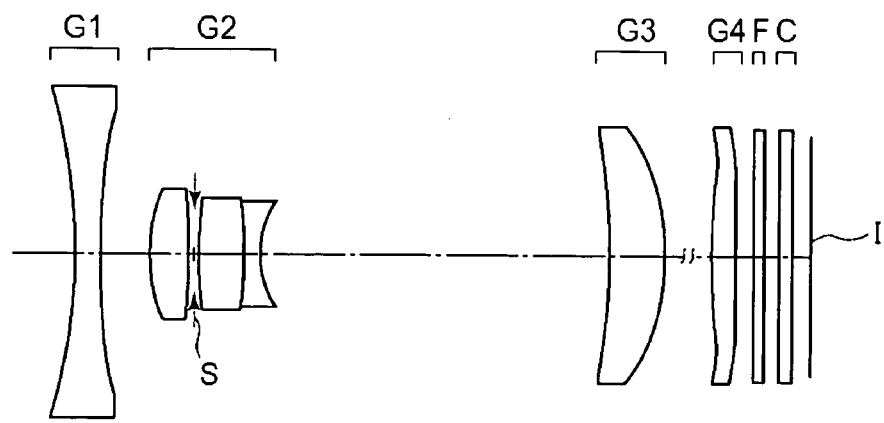

As shown in FIGS. 3A to 3C, the zoom optical system of Example 3 comprises, in order from the object side: a first lens unit G1 having a negative refractive power; a second lens unit G2 having a positive refractive power; a third lens unit G3 having a positive refractive power; and a fourth lens unit G4 having a positive refractive power. When zooming is performed from the wide-angle end to the telephoto end, the first lens unit G1 moves along a locus concave toward the object side, and is arranged closer to the image side in the telephoto end than in the wide-angle end. The aperture stop S and the second lens unit G2 integrally and monotonously move toward the object side. The third lens unit G3 slightly moves toward the image side while increasing the space between the third lens unit and the second lens unit G2, and the fourth lens unit G4 is fixed with respect to the image surface I.

The first lens unit G1 constituted of one biconcave negative lens, and the second lens unit G2 constituted of, in order from the object side, a biconvex positive lens, and a cemented lens of a biconvex positive lens and a biconcave negative lens. The third lens unit G3 constituted of one positive meniscus lens directing its concave surface on the object side, and the fourth lens unit G4 constituted of one positive meniscus lens directing its convex surface on the object side. The aperture stop S is disposed between the biconvex positive lens and the cemented lens of the biconvex positive lens and the biconcave negative lens in the second lens unit G2.

Aspherical surfaces are used on six surfaces: opposite surfaces of the biconcave negative lens of the first lens unit G1; the object-side surface of the biconvex positive single lens of the second lens unit G2; the image-side surface of the positive meniscus lens of the third lens unit G3; and opposite surfaces of the fourth lens unit G4.

It is to be noted that the diagonal length of the effective image taking region of the image sensor disposed on the image surface I is 7.6 mm.

EXAMPLE 4

Figure 4A:
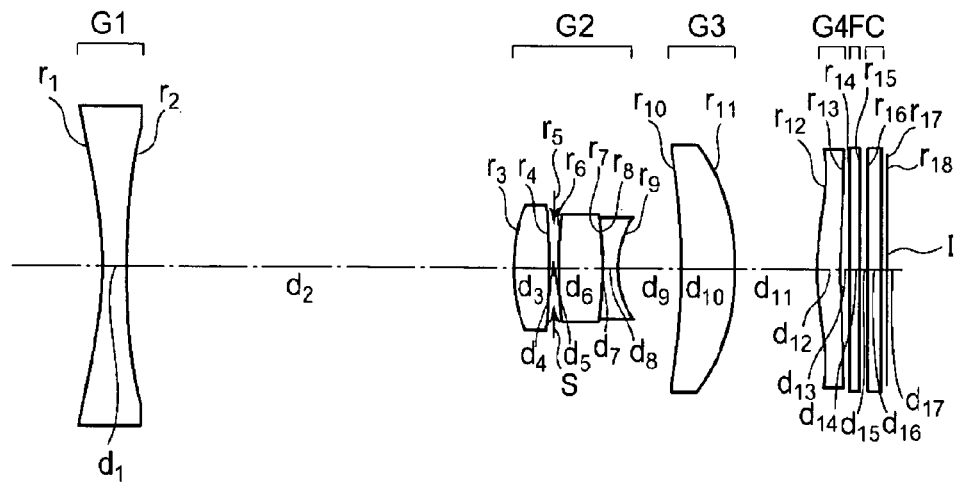
FIGS. 4A to 4C are sectional views similar to those of FIG. 1 of Example 4 of the present invention.
Figure 4B:
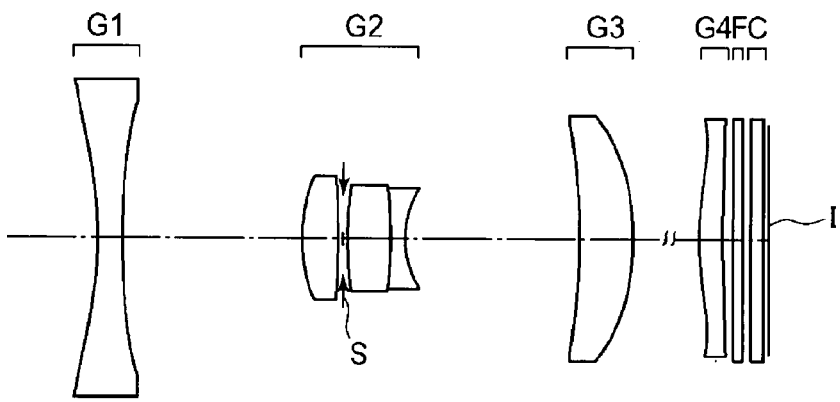
Figure 4C:
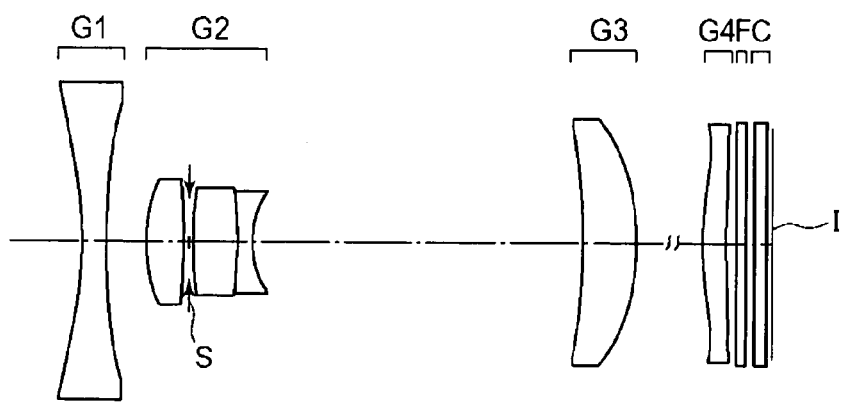

As shown in FIGS. 4A to 4C, the zoom optical system of Example 4 comprises, in order from the object side: a first lens unit G1 having a negative refractive power; a second lens unit G2 having a positive refractive power; a third lens unit G3 having a positive refractive power; and a fourth lens unit G4 having a positive refractive power. When zooming is performed from the wide-angle end to the telephoto end, the first lens unit G1 moves along a locus concave toward the object side, and is arranged closer to the image side in the telephoto end than in the wide-angle end. The aperture stop S and the second lens unit G2 integrally and monotonously move toward the object side. The third lens unit G3 moves along a locus concave toward the object side while increasing the space between the third lens unit and the second lens unit G2, and is arranged slightly closer to the image side in the telephoto end than in the wide-angle end. The fourth lens unit G4 is fixed with respect to an image surface I.

The first lens unit G1 constituted of one biconcave negative lens, and the second lens unit G2 constituted of, in order from the object side, a biconvex positive lens, and a cemented lens of a biconvex positive lens and a biconcave negative lens. The third lens unit G3 constituted of one positive meniscus lens directing its concave surface on the object side, and the fourth lens unit G4 constituted of one positive meniscus lens directing its convex surface on the object side. The aperture stop S is disposed between the biconvex positive lens and the cemented lens of the biconvex positive lens and the biconcave negative lens in the second lens unit G2.

Aspherical surfaces are used on six surfaces: opposite surfaces of the biconcave negative lens of the first lens unit G1; the object-side surface of the biconvex positive single lens of the second lens unit G2; the image-side surface of the positive meniscus lens of the third lens unit G3; and opposite surfaces of the positive meniscus lens of the fourth lens unit G4.

It is to be noted that the diagonal length of the effective image taking region of the image sensor disposed on the image surface I is 7.6 mm.

EXAMPLE 5

Figure 5A:
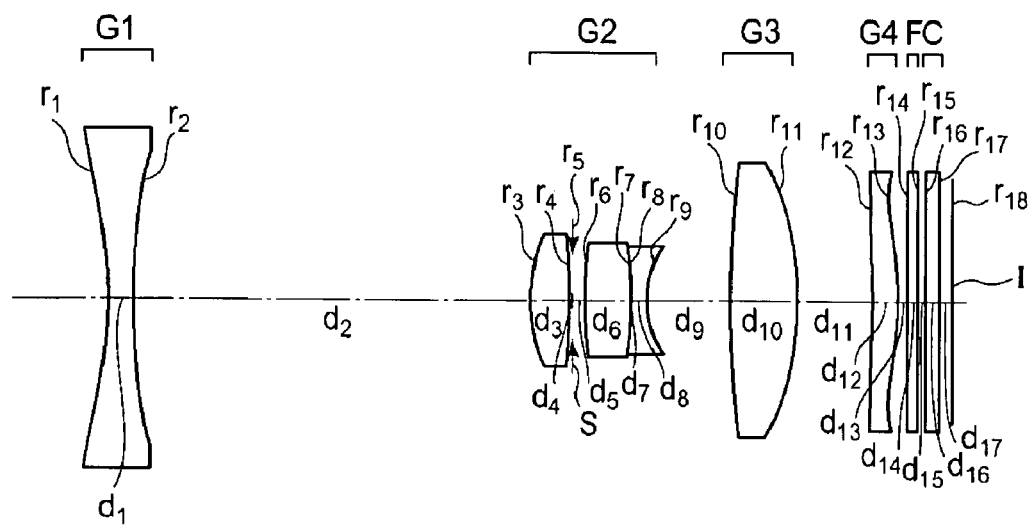
FIGS. 5A to 5C are sectional views similar to those of FIG. 1 of Example 5 of the present invention.
Figure 5B:
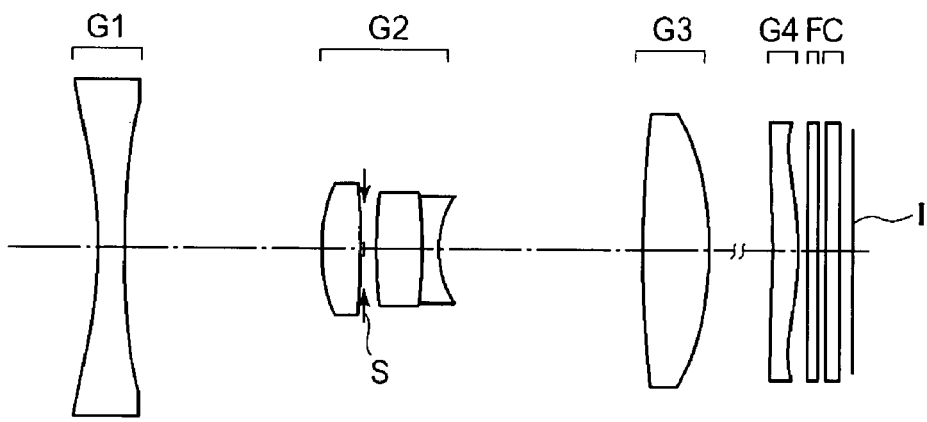
Figure 5C:
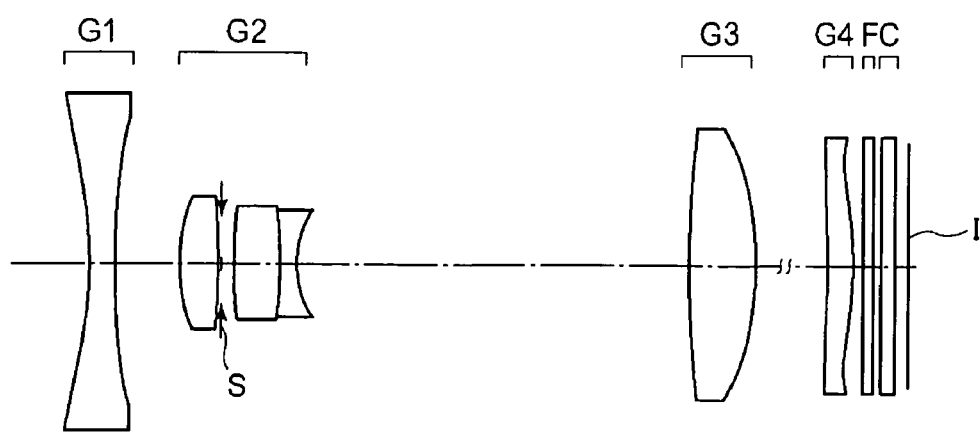

As shown in FIGS. 5A to 5C, the zoom optical system of Example 5 comprises, in order from the object side: a first lens unit G1 having a negative refractive power; a second lens unit G2 having a positive refractive power; a third lens unit G3 having a positive refractive power; and a fourth lens unit G4 having a positive refractive power. When zooming is performed from the wide-angle end to the telephoto end, the first lens unit G1 moves along a locus concave toward the object side, and is arranged slightly closer to the image side in the telephoto end than in the wide-angle end. The aperture stop S and the second lens unit G2 integrally and monotonously move toward the object side. The third lens unit G3 moves along a locus concave toward the object side while increasing the space between the third lens unit and the second lens unit G2, and is arranged slightly closer to the object side in the telephoto end than in the wide-angle end. The fourth lens unit G4 is fixed with respect to an image surface I.

The first lens unit G1 constituted of one biconcave negative lens, and the second lens unit G2 constituted of, in order from the object side, a biconvex positive lens, and a cemented lens of a biconvex positive lens and a biconcave negative lens. The third lens unit G3 constituted of one biconvex positive lens, and the fourth lens unit G4 constituted of one positive meniscus lens directing its concave surface on the object side. The aperture stop S is disposed between the biconvex positive lens and the cemented lens of the biconvex positive lens and the biconcave negative lens in the second lens unit G2.

Aspherical surfaces are used on five surfaces: opposite surfaces of the biconcave negative lens of the first lens unit G1; the object-side surface of the biconvex positive single lens of the second lens unit G2; the image-side surface of the biconvex positive lens of the third lens unit G3; and the image-side surface of the positive meniscus lens of the fourth lens unit G4.

It is to be noted that the diagonal length of the effective image taking region of the image sensor disposed on the image surface I is 7.6 mm.

EXAMPLE 6

Figure 6A:
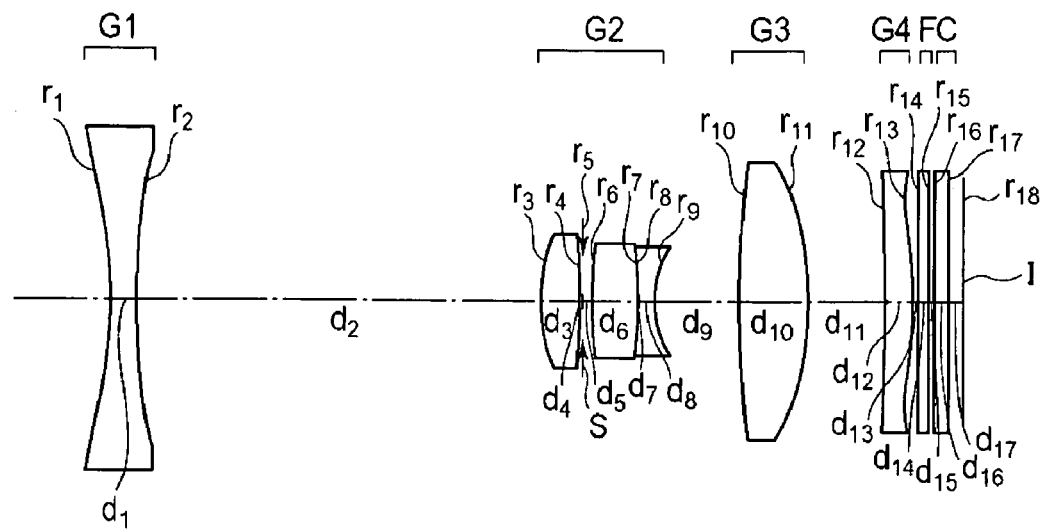
FIGS. 6A to 6C are sectional views similar to those of FIG. 1 of Example 6 of the present invention.
Figure 6B:
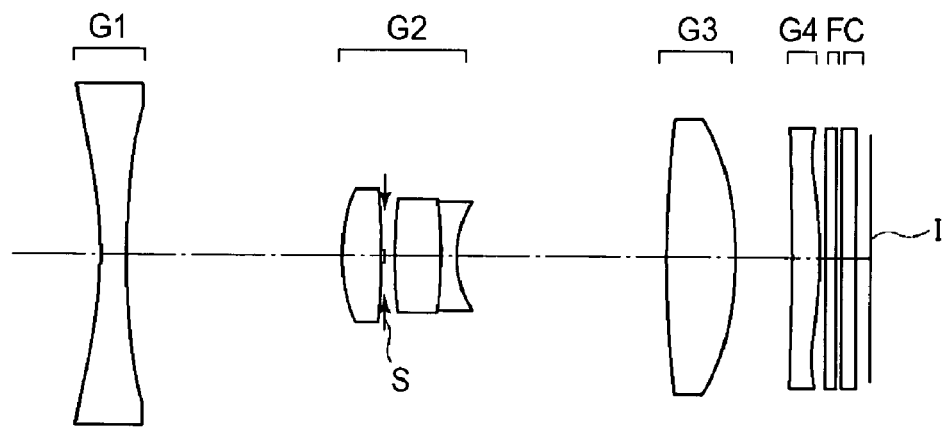
Figure 6C:
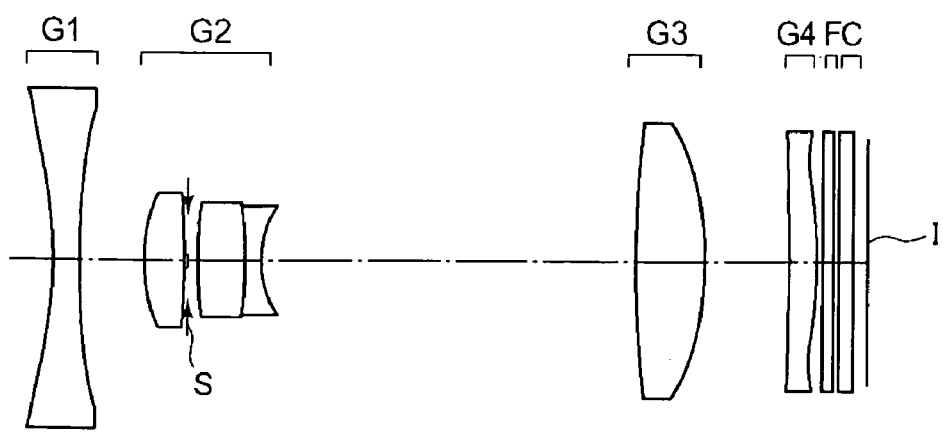

As shown in FIGS. 6A to 6C, the zoom optical system of Example 6 comprises, in order from the object side: a first lens unit G1 having a negative refractive power; a second lens unit G2 having a positive refractive power; a third lens unit G3 having a positive refractive power; and a fourth lens unit G4 having a positive refractive power. When zooming is performed from the wide-angle end to the telephoto end, the first lens unit G1 moves along a locus concave toward the object side, and is arranged slightly closer to an image side in the telephoto end than in the wide-angle end. The aperture stop S and the second lens unit G2 integrally and monotonously move toward the object side. The third lens unit G3 slightly moves along a locus concave toward the object side while increasing the space between the third lens unit and the second lens unit G2, and is arranged slightly closer to the object side in the telephoto end than in the wide-angle end. The fourth lens unit G4 is fixed with respect to the image surface I.

The first lens unit G1 constituted of one biconcave negative lens, and the second lens unit G2 constituted of, in order from the object side, a biconvex positive lens, and a cemented lens of a biconvex positive lens and a biconcave negative lens. The third lens unit G3 constituted of one biconvex positive lens, and the fourth lens unit G4 constituted of one positive meniscus lens directing its concave surface on the object side. The aperture stop S is disposed between the biconvex positive lens and the cemented lens of the biconvex positive lens and the biconcave negative lens in the second lens unit G2.

Aspherical surfaces are used on seven surfaces: opposite surfaces of the biconcave negative lens of the first lens unit G1; opposite surfaces of the biconvex positive single lens of the second lens unit G2; opposite surfaces of the biconvex positive lens of the third lens unit G3; and the image-side surface of the positive meniscus lens of the fourth lens unit G4.

It is to be noted that the diagonal length of the effective image taking region of the image sensor disposed on the image surface I is 7.6 mm.

EXAMPLE 7

Figure 7A:
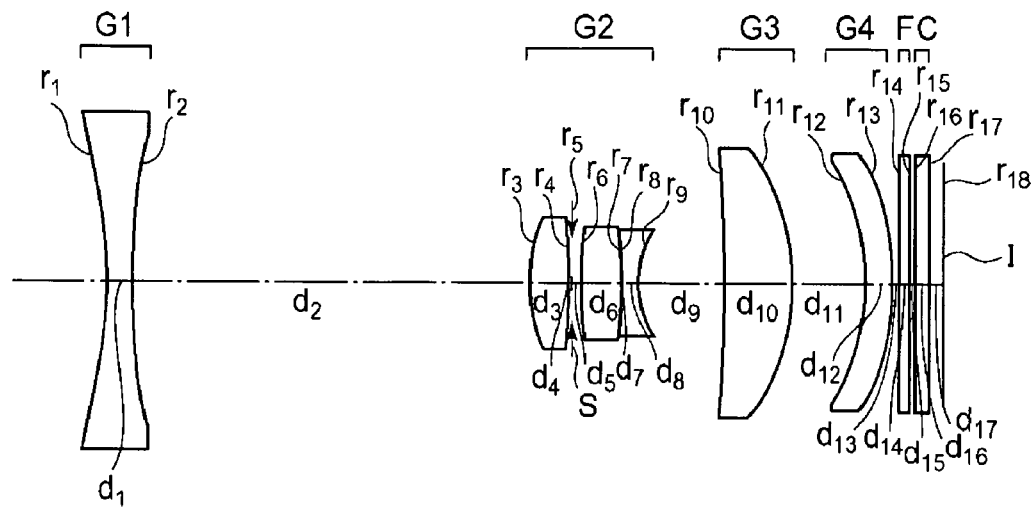
FIGS. 7A to 7C are sectional views similar to those of FIG. 1 of Example 7 of the present invention.
Figure 7B:
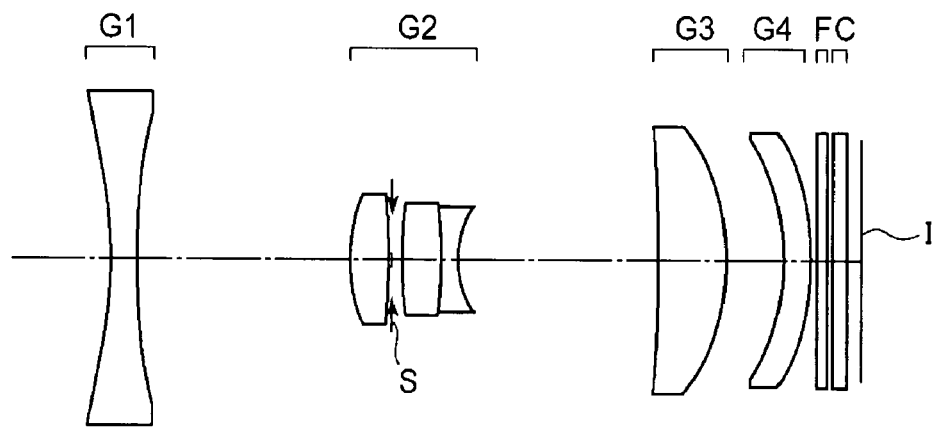
Figure 7C:
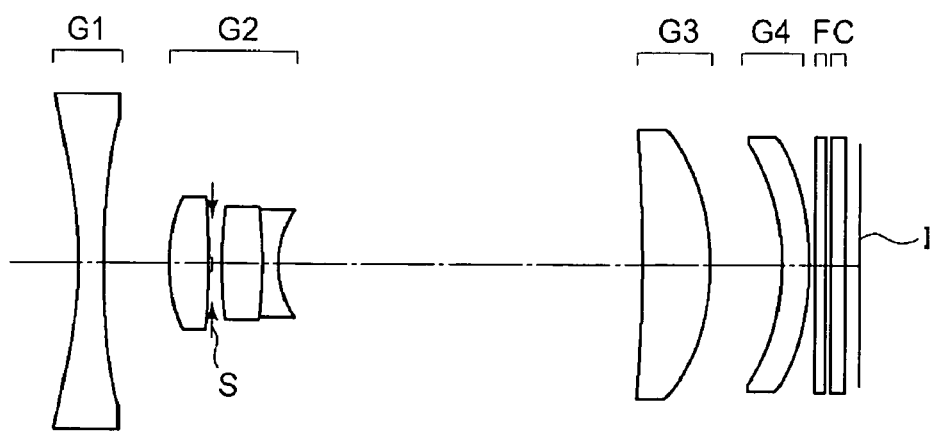

As shown in FIGS. 7A to 7C, the zoom optical system of Example 7 comprises, in order from the object side: a first lens unit G1 having a negative refractive power; a second lens unit G2 having a positive refractive power; a third lens unit G3 having a positive refractive power; and a fourth lens unit G4 having a positive refractive power. When zooming is performed from the wide-angle end to the telephoto end, the first lens unit G1 moves along a locus concave toward the object side, and is arranged slightly closer to an image side in the telephoto end than in the wide-angle end. The aperture stop S and the second lens unit G2 integrally and monotonously move toward the object side. The third lens unit G3 moves along a locus concave toward the object side while increasing the space between the third lens unit and the second lens unit G2, and is arranged slightly closer to the object side in the telephoto end than in the wide-angle end. The fourth lens unit G4 is fixed with respect to the image surface I.

The first lens unit G1 constituted of one biconcave negative lens, and the second lens unit G2 constituted of, in order from the object side, a biconvex positive lens, and a cemented lens of a biconvex positive lens and a biconcave negative lens. The third lens unit G3 constituted of one positive meniscus lens directing its concave surface on the object side, and the fourth lens unit G4 constituted of one positive meniscus lens directing its concave surface on the object side. The aperture stop S is disposed between the biconvex positive lens and the cemented lens of the biconvex positive lens and the biconcave negative lens in the second lens unit G2.

Aspherical surfaces are used on five surfaces: opposite surfaces of the biconcave negative lens of the first lens unit G1; the object-side surface of the positive single lens of the second lens unit G2; the image-side surface of the positive meniscus lens of the third lens unit G3; and the object-side surface of the positive meniscus lens of the fourth lens unit G4.

It is to be noted that the diagonal length of the effective image taking region of the image sensor disposed on the image surface I is 7.6 mm.

EXAMPLE 8

Figure 8A:
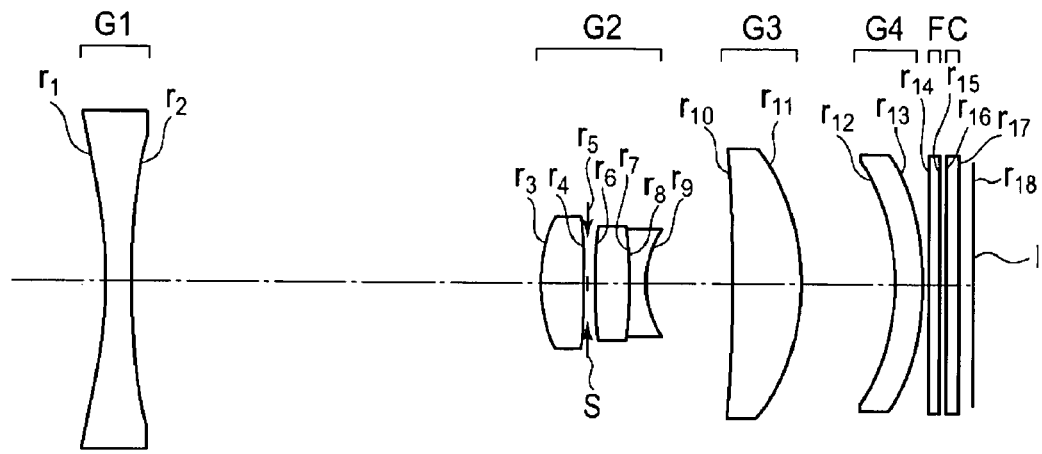
FIGS. 8A to 8C are sectional views similar to those of FIG. 1 of Example 8 of the present invention.
Figure 8B:
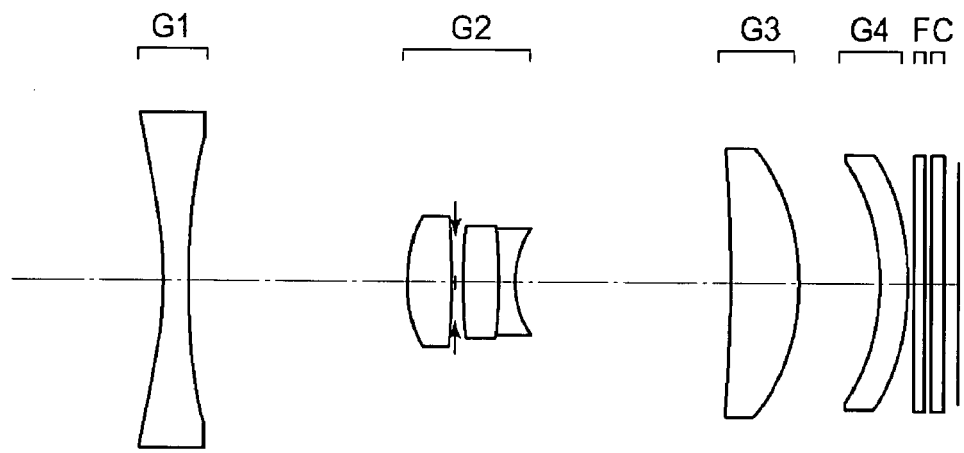
Figure 8C:
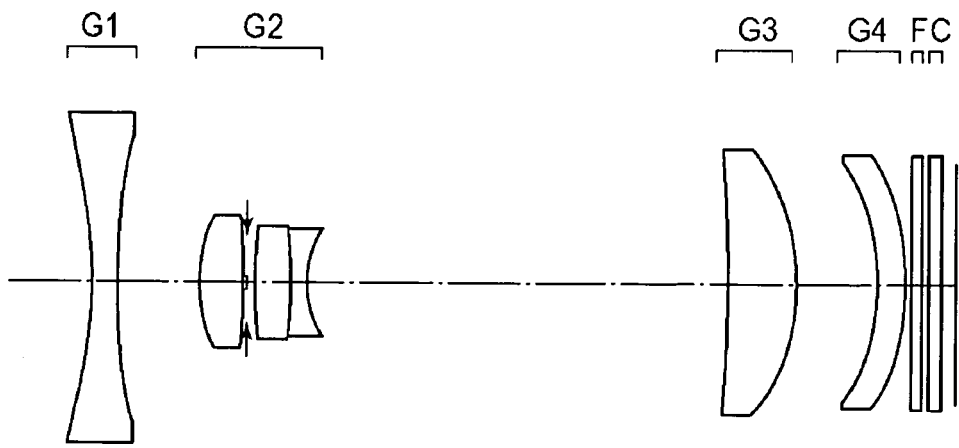

As shown in FIGS. 8A to 8C, the zoom optical system of Example 8 comprises, in order from the object side: a first lens unit G1 having a negative refractive power; a second lens unit G2 having a positive refractive power; a third lens unit G3 having a positive refractive power; and a fourth lens unit G4 having a positive refractive power. When zooming is performed from the wide-angle end to the telephoto end, the first lens unit G1 moves along a locus concave toward the object side, and is arranged slightly closer to an image side in the telephoto end than in the wide-angle end. The aperture stop S and the second lens unit G2 integrally and monotonously move toward the object side. The third lens unit G3 moves along a locus concave toward the object side while increasing the space between the third lens unit and the second lens unit G2, and is arranged slightly closer to the image side in the telephoto end than in the wide-angle end. The fourth lens unit G4 is fixed with respect to an image surface I.

The first lens unit G1 constituted of one biconcave negative lens, and the second lens unit G2 constituted of, in order from the object side, a biconvex positive lens, and a cemented lens of a biconvex positive lens and a biconcave negative lens. The third lens unit G3 constituted of one positive meniscus lens directing its concave surface on the object side, and the fourth lens unit G4 constituted of one positive meniscus lens directing its concave surface on the object side. The aperture stop S is disposed between the biconvex positive lens and the cemented lens of the biconvex positive lens and the biconcave negative lens in the second lens unit G2.

Aspherical surfaces are used on six surfaces: opposite surfaces of the biconcave negative lens of the first lens unit G1; opposite surfaces of the positive single lens of the second lens unit G2; the image-surface-side surface of the positive meniscus lens of the third lens unit G3; and the object-side surface of the positive meniscus lens of the fourth lens unit G4.

It is to be noted that the diagonal length of the effective image taking region of the image sensor disposed on the image surface I is 7.2 mm.

EXAMPLE 9

Figure 9A:
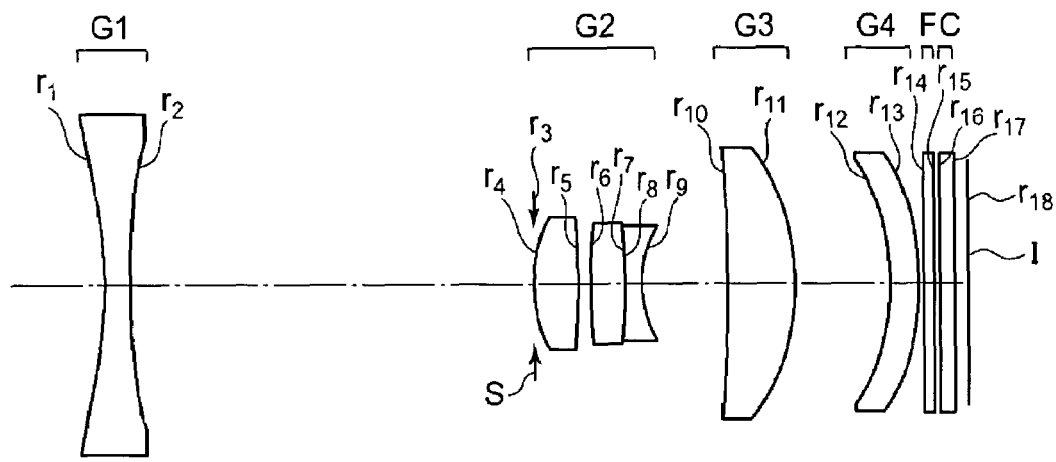
FIGS. 9A to 9C are sectional views similar to those of FIG. 1 of Example 9 of the present invention.
Figure 9B:
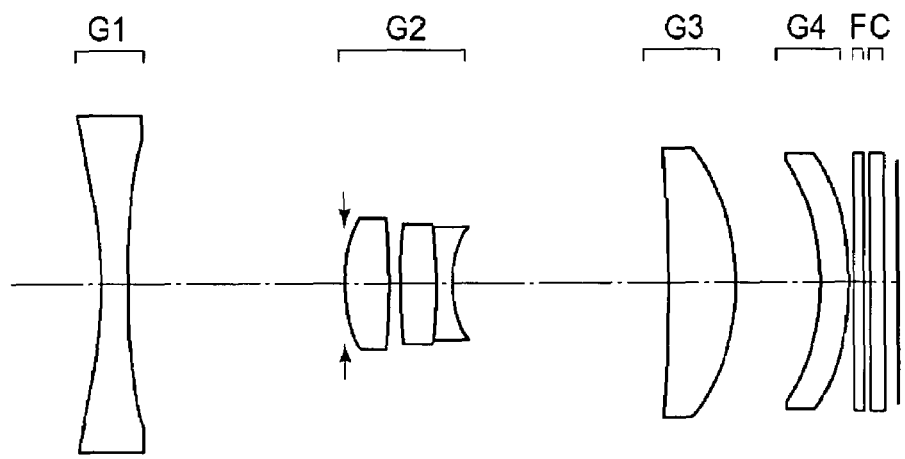
Figure 9C:
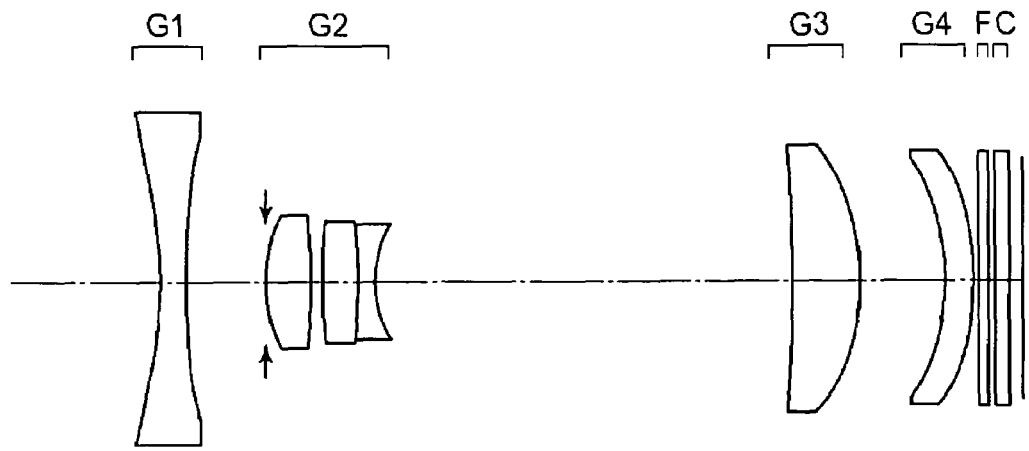

As shown in FIGS. 9A to 9C, the zoom optical system of Example 9 comprises, in order from the object side: a first lens unit G1 having a negative refractive power; a second lens unit G2 having a positive refractive power; a third lens unit G3 having a positive refractive power; and a fourth lens unit G4 having a positive refractive power. When zooming is performed from the wide-angle end to the telephoto end, the first lens unit G1 moves along a locus concave toward the object side, and is arranged slightly closer to the image side in the telephoto end than in the wide-angle end. The aperture stop S and the second lens unit G2 integrally and monotonously move toward the object side. The third lens unit G3 moves along a locus concave toward the object side while increasing the space between the third lens unit and the second lens unit G2, and is arranged slightly closer to the image side in the telephoto end than in the wide-angle end. The fourth lens unit G4 is fixed with respect to the image surface I.

The first lens unit G1 constituted of one biconcave negative lens, and the second lens unit G2 constituted of, in order from the object side, a biconvex positive lens, and a cemented lens of a biconvex positive lens and a biconcave negative lens. The third lens unit G3 constituted of one positive meniscus lens directing its concave surface on the object side, and the fourth lens unit G4 constituted of one positive meniscus lens directing its concave surface on the object side. The aperture stop S is disposed on the object side of the second lens unit G2.

Aspherical surfaces are used on six surfaces: opposite surfaces of the biconcave negative lens of the first lens unit G1; opposite surfaces of the positive single lens of the second lens unit G2; the image-side surface of the positive meniscus lens of the third lens unit G3; and the object-side surface of the positive meniscus lens of the fourth lens unit G4.

It is to be noted that the diagonal length of the effective image taking region of the image sensor disposed on the image surface I is 7.2 mm.

EXAMPLE 10

Figure 10A:
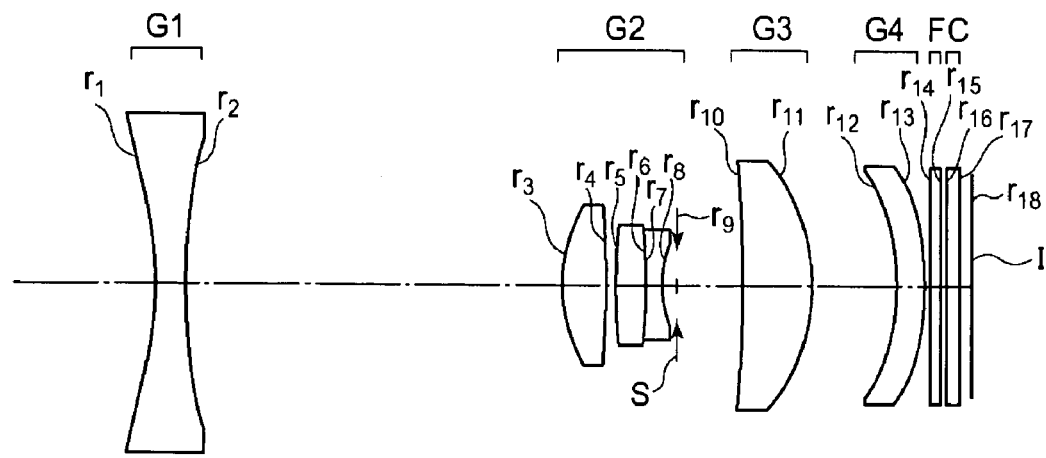
FIGS. 10A to 10C are sectional views similar to those of FIG. 1 of Example 10 of the present invention.
Figure 10B:
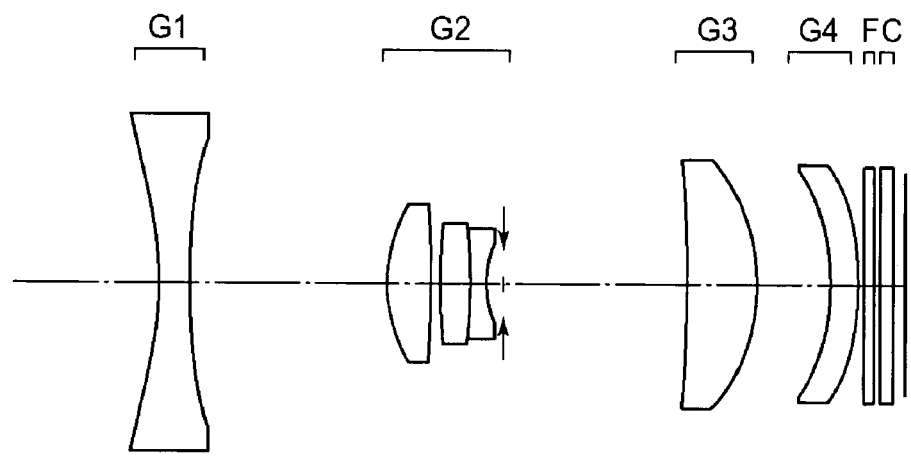
Figure 10C:
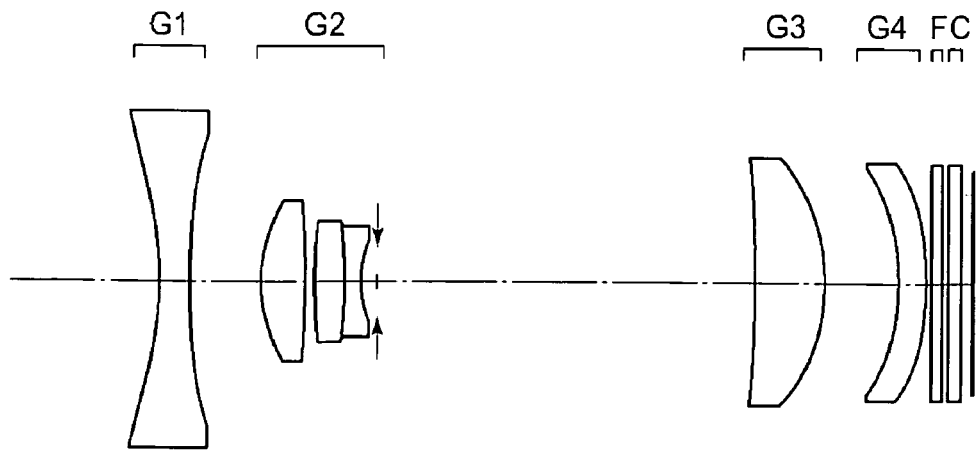

As shown in FIGS. 10A to 10C, the zoom optical system of Example 10 comprises, in order from the object side: a first lens unit G1 having a negative refractive power; a second lens unit G2 having a positive refractive power; a third lens unit G3 having a positive refractive power; and a fourth lens unit G4 having a positive refractive power. When zooming is performed from the wide-angle end to the telephoto end, the first lens unit G1 moves along a locus concave toward the object side, and is arranged slightly closer to the object side in the telephoto end than in the wide-angle end. The aperture stop S and the second lens unit G2 integrally and monotonously move toward the object side. The third lens unit G3 moves along a locus concave toward the object side while increasing the space between the third lens unit and the second lens unit G2, and is arranged slightly closer to the image side in the telephoto end than in the wide-angle end. The fourth lens unit G4 is fixed with respect to the image surface I.

The first lens unit G1 constituted of one biconcave negative lens, and the second lens unit G2 constituted of, in order from the object side, a biconvex positive lens, and a cemented lens of a biconvex positive lens and a biconcave negative lens. The third lens unit G3 constituted of one positive meniscus lens directing its concave surface on the object side, and the fourth lens unit G4 constituted of one positive meniscus lens directing its concave surface on the object side. The aperture stop S is disposed on the image side of the second lens unit G2.

Aspherical surfaces are used on six surfaces: opposite surfaces of the biconcave negative lens of the first lens unit G1; opposite surfaces of the positive single lens of the second lens unit G2; the image-side surface of the positive meniscus lens of the third lens unit G3; and the object-side surface of the positive meniscus lens of the fourth lens unit G4.

It is to be noted that the diagonal length of the effective image taking region of the image sensor disposed on the image surface I is 7.2 mm.

EXAMPLE 11

Figure 11A:
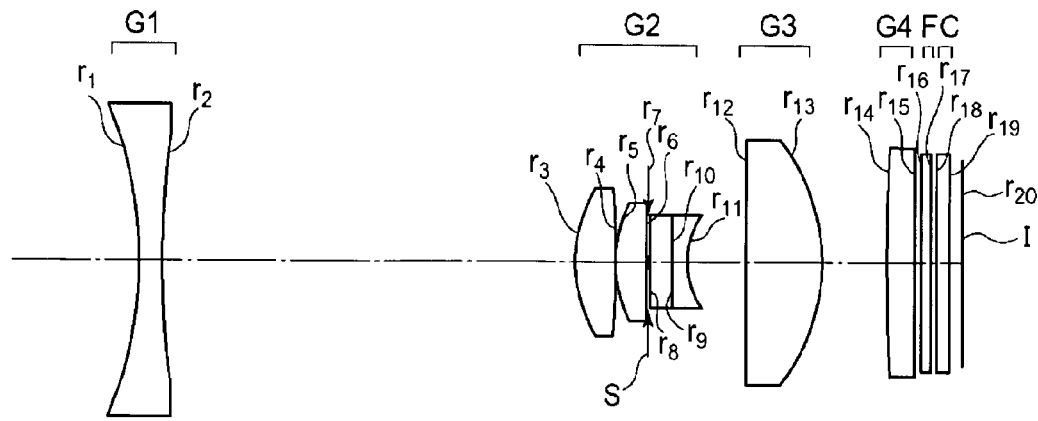
FIGS. 11A to 11C are sectional views similar to those of FIG. 1 of Example 11 of the present invention.
Figure 11B:
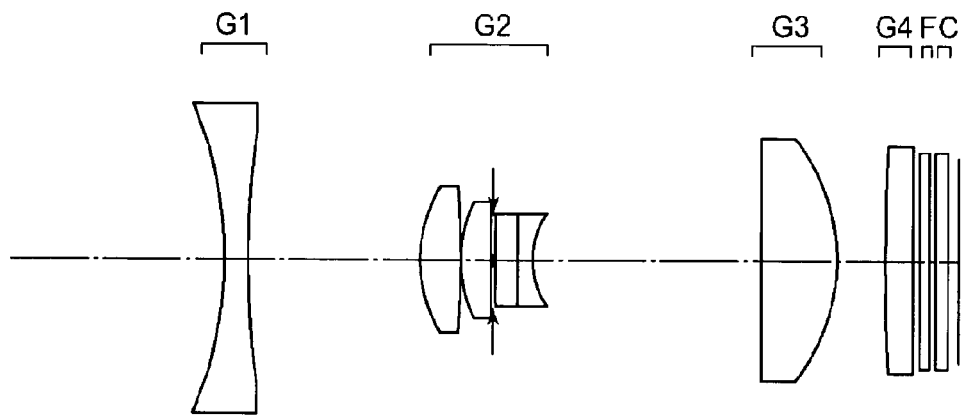
Figure 11C:
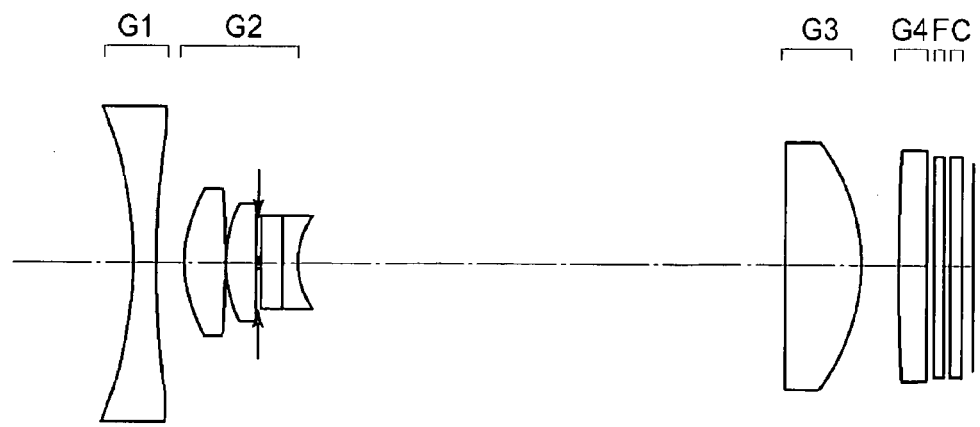

As shown in FIGS. 11A to 11C, the zoom optical system of Example 11 comprises, in order from the object side: a first lens unit G1 having a negative refractive power; a second lens unit G2 having a positive refractive power; a third lens unit G3 having a positive refractive power; and a fourth lens unit G4 having a positive refractive power. When zooming is performed from the wide-angle end to the telephoto end, the first lens unit G1 moves along a locus concave toward the object side, and is arranged slightly closer to the object side in the telephoto end than in the wide-angle end. The aperture stop S and the second lens unit G2 integrally and monotonously move toward the object side. The third lens unit G3 monotonously moves toward the image side while increasing the space between the third lens unit and the second lens unit G2, and the fourth lens unit G4 is fixed with respect to the image surface I.

The first lens unit G1 constituted of one biconcave negative lens, and the second lens unit G2 constituted of, in order from the object side, a biconvex positive lens, a positive meniscus lens directing its convex surface on the object side and a cemented lens of a positive meniscus lens directing its convex surface on the object side and a negative meniscus lens directing its convex surface on the object side. The third lens unit G3 constituted of one biconvex positive lens, and the fourth lens unit G4 constituted of one biconvex positive lens. The aperture stop S is disposed between the positive meniscus lens directing its convex surface on the object side and the cemented lens in the second lens unit G2.

Aspherical surfaces are used on six surfaces: opposite surfaces of the biconcave negative lens of the first lens unit G1; opposite surfaces of the biconvex positive lens of the second lens unit G2; the image-side surface of the biconvex positive lens of the third lens unit G3; and an object-side surface of the biconvex positive lens of the fourth lens unit G4.

It is to be noted that the diagonal length of the effective image taking region of the image sensor disposed on the image surface I is 7.2 mm.

EXAMPLE 12

Figure 12A:
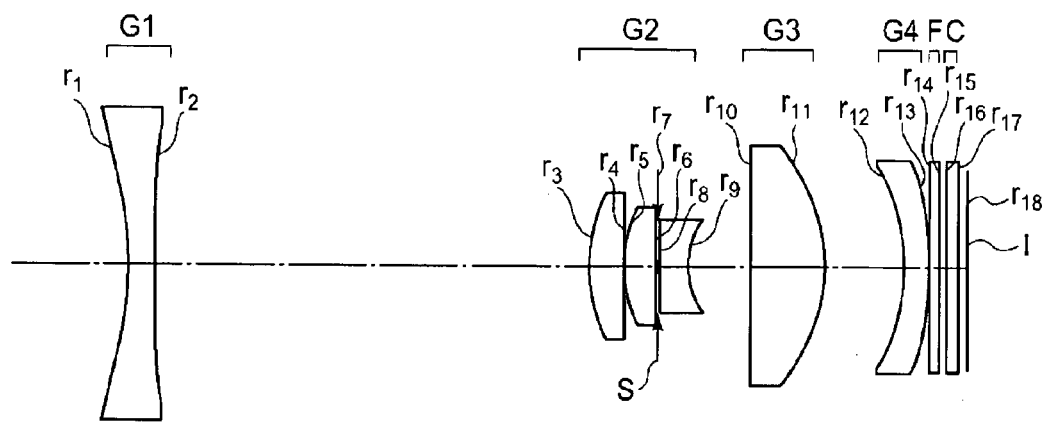
FIGS. 12A to 12C are sectional views similar to those of FIG. 1 of Example 12 of the present invention.
Figure 12B:
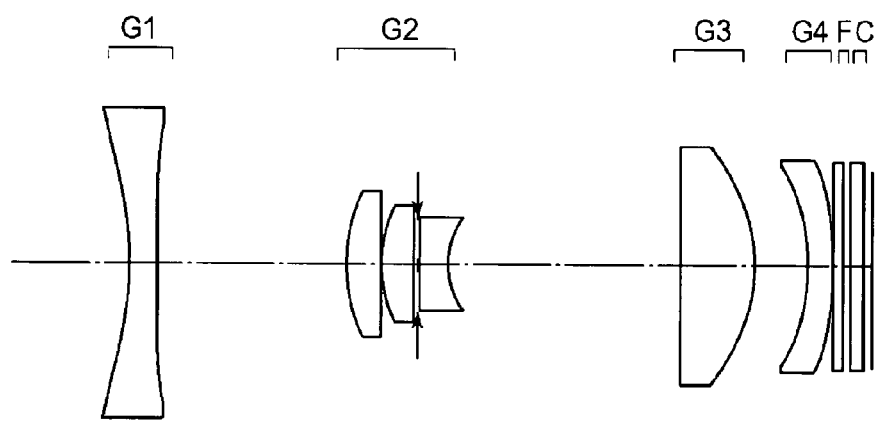
Figure 12C:
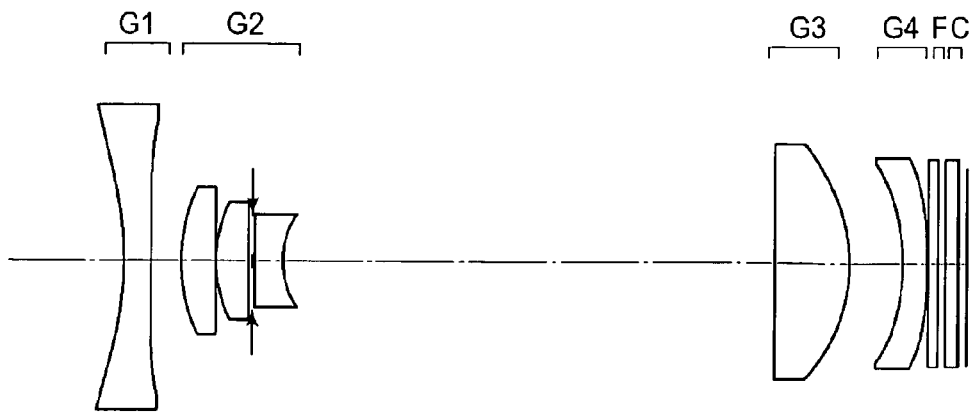

As shown in FIGS. 12A to 12C, the zoom optical system of Example 12 comprises, in order from the object side: a first lens unit G1 having a negative refractive power; a second lens unit G2 having a positive refractive power; a third lens unit G3 having a positive refractive power; and a fourth lens unit G4 having a negative refractive power. When zooming is performed from the wide-angle end to the telephoto end, the first lens unit G1 moves along a locus concave toward the object side, and is arranged slightly closer to the object side in the telephoto end than in the wide-angle end. The aperture stop S and the second lens unit G2 integrally and monotonously move toward the object side. The third lens unit G3 monotonously moves toward the image side while increasing the space between the third lens unit and the second lens unit G2, and the fourth lens unit G4 is fixed with respect to the image surface I.

The first lens unit G1 constituted of one biconcave negative lens, and the second lens unit G2 constituted of, in order from the object side, two biconvex positive lenses, and a negative meniscus lens directing its convex surface on the object side. The third lens unit G3 constituted of one positive meniscus lens directing its convex surface on the image side, and the fourth lens unit G4 constituted of one negative meniscus lens directing its convex surface on the image side. The aperture stop S is disposed between the biconvex positive lens on the image side and the negative lens in the second lens unit G2.

Aspherical surfaces are used on seven surfaces: opposite surfaces of the biconcave negative lens of the first lens unit G1; opposite surfaces of the biconvex positive lens on the object side in the second lens unit G2; the image-side surface of the positive meniscus lens of the third lens unit G3; and opposite surfaces of the negative meniscus lens of the fourth lens unit G4.

It is to be noted that the diagonal length of the effective image taking region of the image sensor disposed on the image surface I is 7.2 mm.

EXAMPLE 13

Figure 13A:
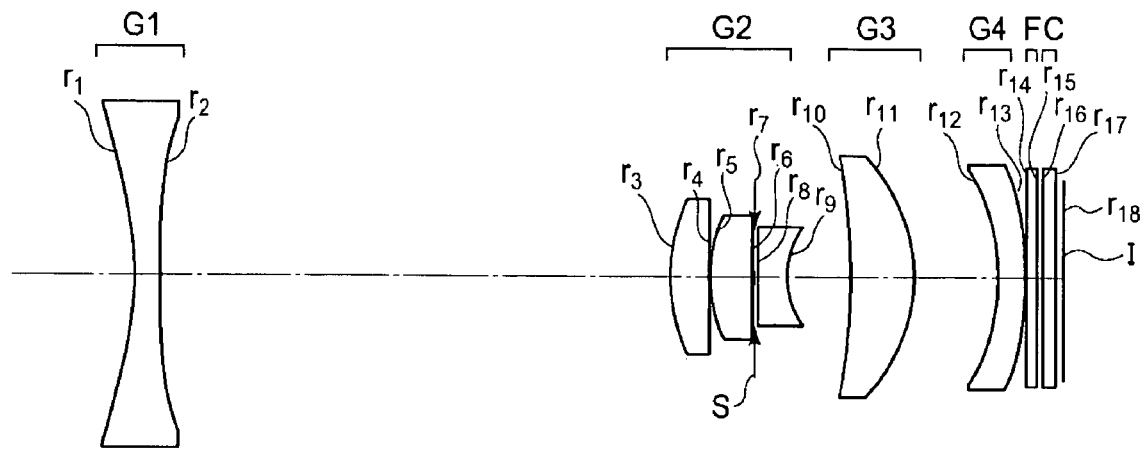
FIGS. 13A to 13C are sectional views similar to those of FIG. 1 of Example 13 of the present invention.
Figure 13B:
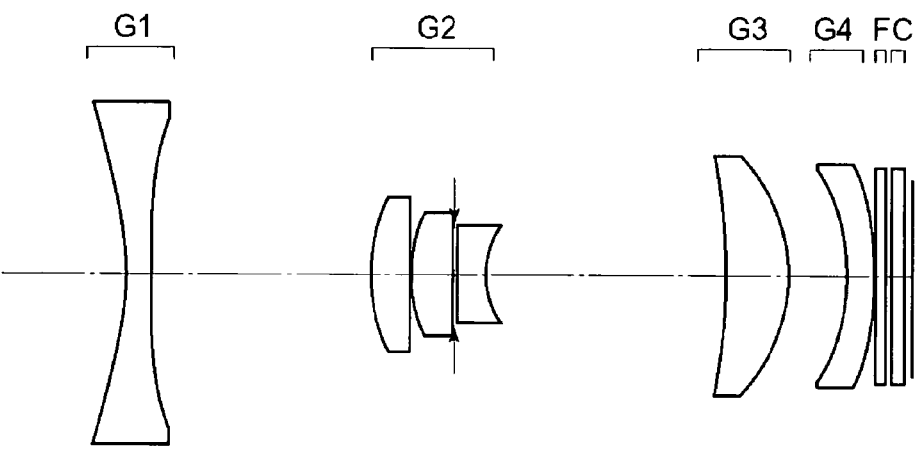
Figure 13C:
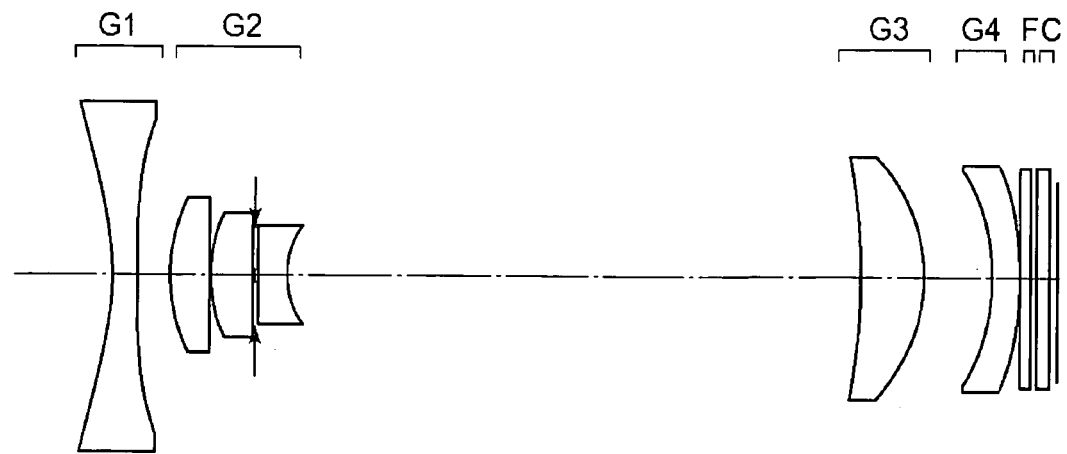

As shown in FIGS. 13A to 13C, the zoom optical system of Example 13 comprises, in order from the object side: a first lens unit G1 having a negative refractive power; a second lens unit G2 having a positive refractive power; a third lens unit G3 having a positive refractive power; and a fourth lens unit G4 having a negative refractive power. When zooming is performed from the wide-angle end to the telephoto end, the first lens unit G1 moves along a locus concave toward the object side, and is arranged slightly closer to the object side in the telephoto end than in the wide-angle end. The aperture stop S and the second lens unit G2 integrally and monotonously move toward the object side. The third lens unit G3 moves along a locus concave toward the object side while increasing the space between the third lens unit and the second lens unit G2. The third lens unit is arranged slightly closer to the image side in the telephoto end than in the wide-angle end. The fourth lens unit G4 is fixed with respect to the image surface I.

The first lens unit G1 constituted of one biconcave negative lens, and the second lens unit G2 constituted of, in order from the object side, a biconvex positive lenses, a positive meniscus lens directing its convex surface on the object side and a negative meniscus lens directing its convex surface on the object side. The third lens unit G3 constituted of one positive meniscus lens directing its convex surface on the image side, and the fourth lens unit G4 constituted of one negative meniscus lens directing its convex surface on the image side. The aperture stop S is disposed between the positive meniscus lens directing its convex surface on the object side and the negative lens in the second lens unit G2.

Aspherical surfaces are used on six surfaces: opposite surfaces of the biconcave negative lens of the first lens unit G1; opposite surfaces of the biconvex positive lens of the second lens unit G2; the image-side surface of the biconvex positive lens of the third lens unit G3; and the object-side surface of the negative meniscus lens of the fourth lens unit G4.

It is to be noted that the diagonal length of the effective image taking region of the image sensor disposed on the image surface I is 7.2 mm.

EXAMPLE 14

Figure 14A:
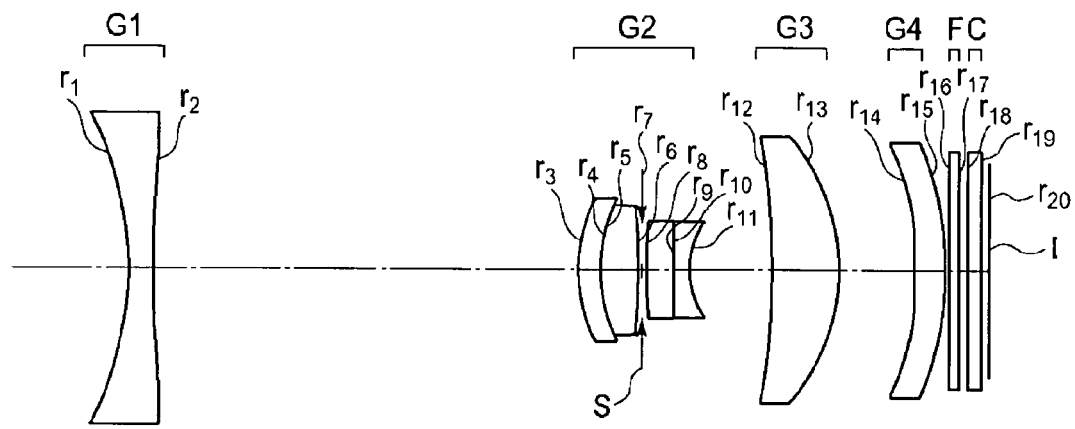
FIGS. 14A to 14C are sectional views similar to those of FIG. 1 of Example 14 of the present invention.
Figure 14B:
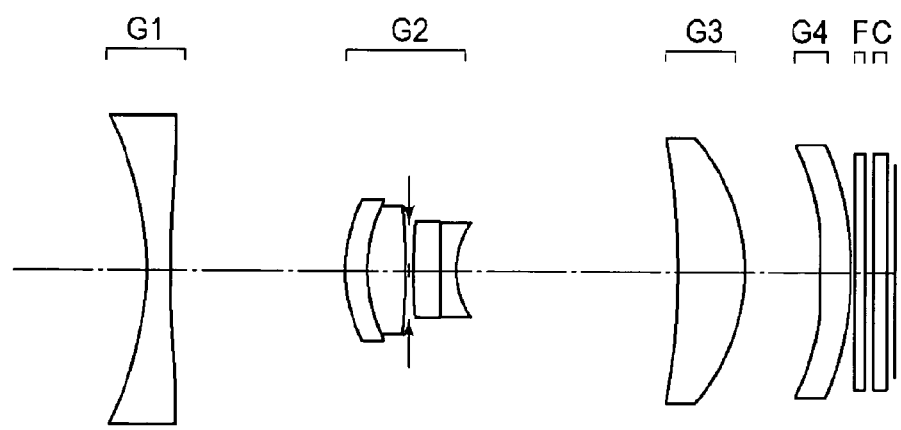
Figure 14C:
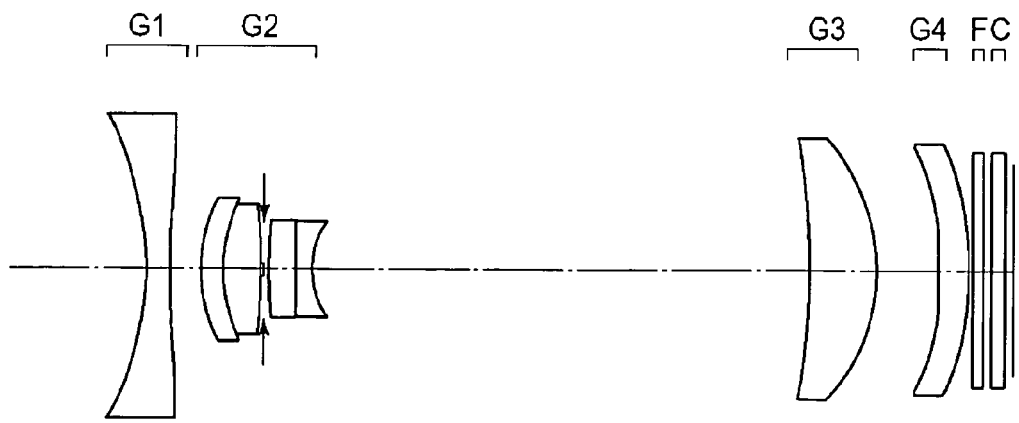

As shown in FIGS. 14A to 14C, the zoom optical system of Example 14 comprises, in order from the object side: a first lens unit G1 having a negative refractive power; a second lens unit G2 having a positive refractive power; a third lens unit G3 having a positive refractive power; and a fourth lens unit G4 having a positive refractive power. When zooming is performed from the wide-angle end to the telephoto end, the first lens unit G1 moves along a locus concave toward the object side, and is arranged slightly closer to the object side in the telephoto end than in the wide-angle end. The aperture stop S and the second lens unit G2 integrally and monotonously move toward the object side. The third lens unit G3 monotonously moves toward the image side while increasing the space between the third lens unit and the second lens unit G2, and the fourth lens unit G4 is fixed with respect to the image surface I.

The first lens unit G1 constituted of one biconcave negative lens, and the second lens unit G2 constituted of, in order from the object side, a cemented lens of a positive meniscus lens directing its convex surface on the object side and a biconvex positive lens, and a cemented lens of a positive meniscus lens directing its convex surface on the object side and a negative meniscus lens directing its convex surface on the object side. The third lens unit G3 constituted of one positive meniscus lens directing its convex surface on the image side, and the fourth lens unit G4 constituted of one positive meniscus lens directing its convex surface on the image side. The aperture stop S is disposed between two cemented lenses of the second lens unit G2.

Aspherical surfaces are used on six surfaces: opposite surfaces of the biconcave negative lens of the first lens unit G1; the object-side surface and the image-side surface of the cemented lens on the object side in the second lens unit G2; the image-side surface of the positive meniscus lens of the third lens unit G3; and the object-side surface of the positive meniscus lens of the fourth lens unit G4.

It is to be noted that the diagonal length of the effective image taking region of the image sensor disposed on the image surface I is 7.2 mm.

EXAMPLE 15

Figure 15A:
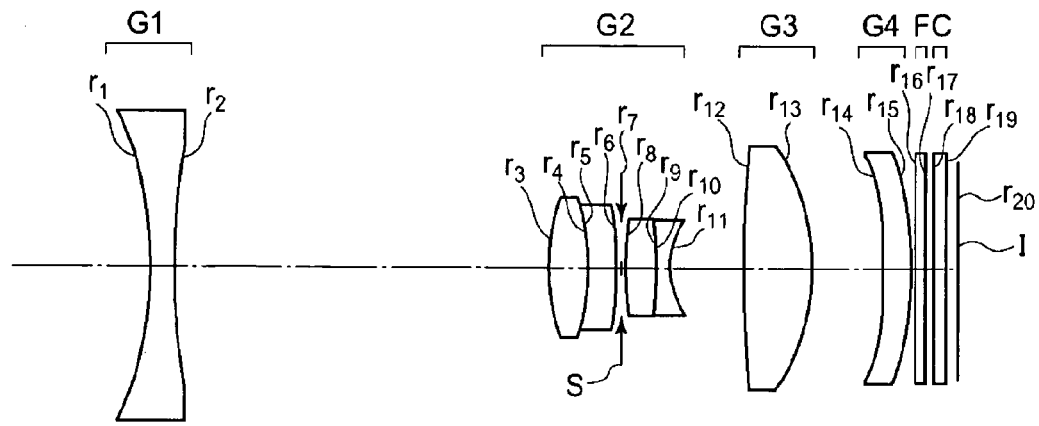
FIGS. 15A to 15C are sectional views similar to those of FIG. 1 of Example 15 of the present invention.
Figure 15B:
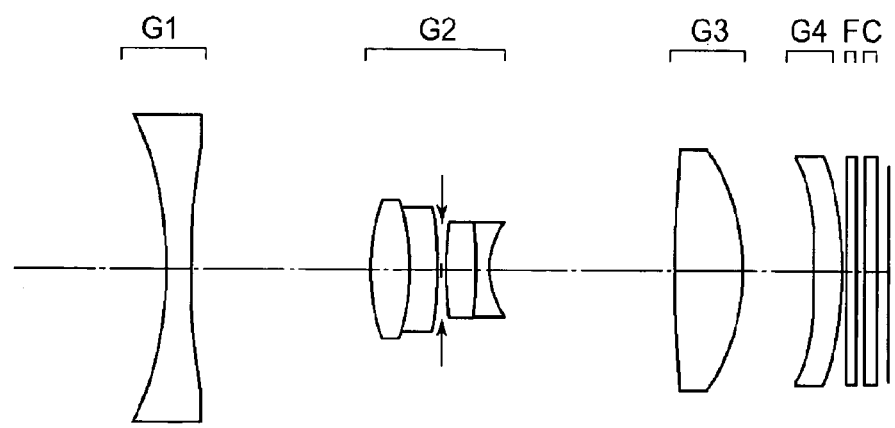
Figure 15C:
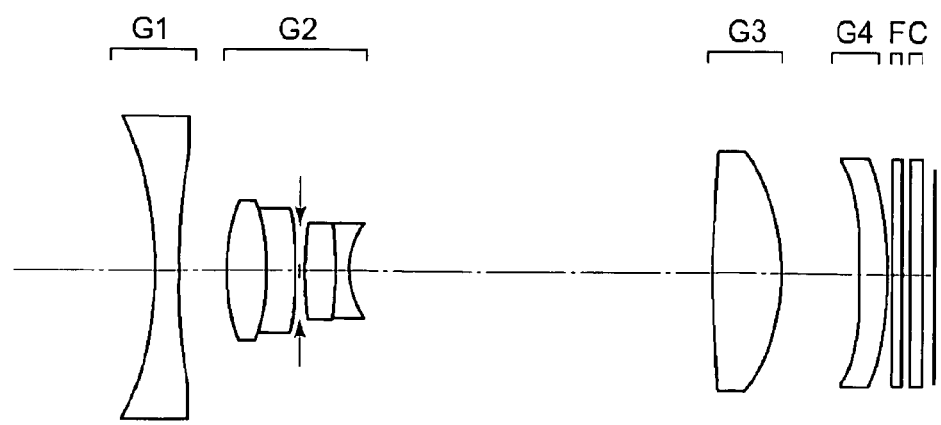

As shown in FIGS. 15A to 15C, the zoom optical system of Example 15 comprises, in order from the object side: a first lens unit G1 having a negative refractive power; a second lens unit G2 having a positive refractive power; a third lens unit G3 having a positive refractive power; and a fourth lens unit G4 having a positive refractive power. When zooming is performed from the wide-angle end to the telephoto end, the first lens unit G1 moves along a locus concave toward the object side, and is arranged slightly closer to the image side in the telephoto end than in the wide-angle end. The aperture stop S and the second lens unit G2 integrally and monotonously move toward the object side. The third lens unit G3 moves along a locus concave toward the object side while increasing the space between the third lens unit and the second lens unit G2, and is arranged slightly closer to the object side in the telephoto end than in the wide-angle end, and the fourth lens unit G4 is fixed with respect to the image surface I.

The first lens unit G1 constituted of one biconcave negative lens, and the second lens unit G2 constituted of, in order from the object side, a cemented lens of a biconvex positive lens and a negative meniscus lens directing its convex surface on the image side, and a cemented lens of a biconvex positive lens and a biconcave negative lens. The third lens unit G3 constituted of one biconvex positive lens, and the fourth lens unit G4 constituted of one positive meniscus lens directing its convex surface on the image side. The aperture stop S is disposed between two cemented lenses of the second lens unit G2.

Aspherical surfaces are used on five surfaces: opposite surfaces of the biconcave negative lens of the first lens unit G1; the object-side surface of the cemented lens on the object side in the second lens unit G2; the image-side surface of the biconvex positive lens of the third lens unit G3; and the object-side surface of the positive meniscus lens of the fourth lens unit G4.

It is to be noted that the diagonal length of the effective image taking region of the image sensor disposed on the image surface I is 7.2 mm.

EXAMPLE 16

Figure 16A:
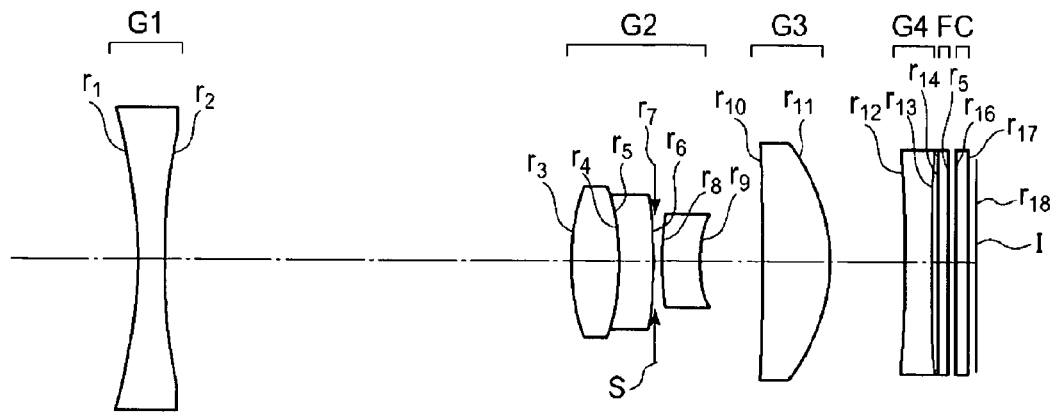
FIGS. 16A to 16C are sectional views similar to those of FIG. 1 of Example 16 of the present invention.
Figure 16B:
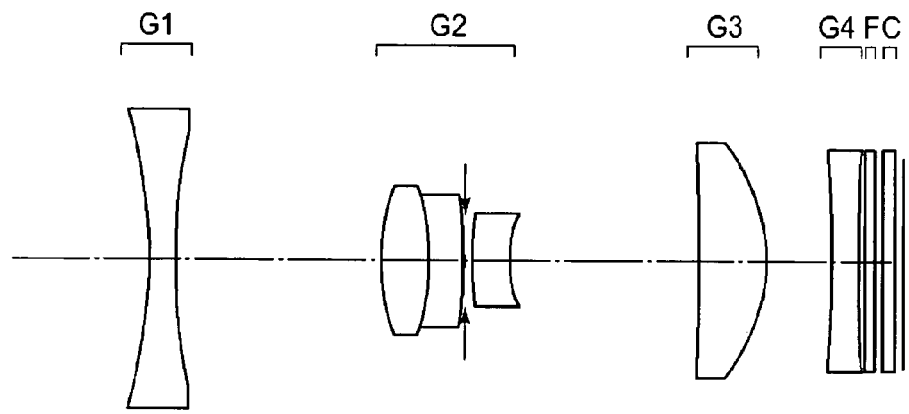
Figure 16C:
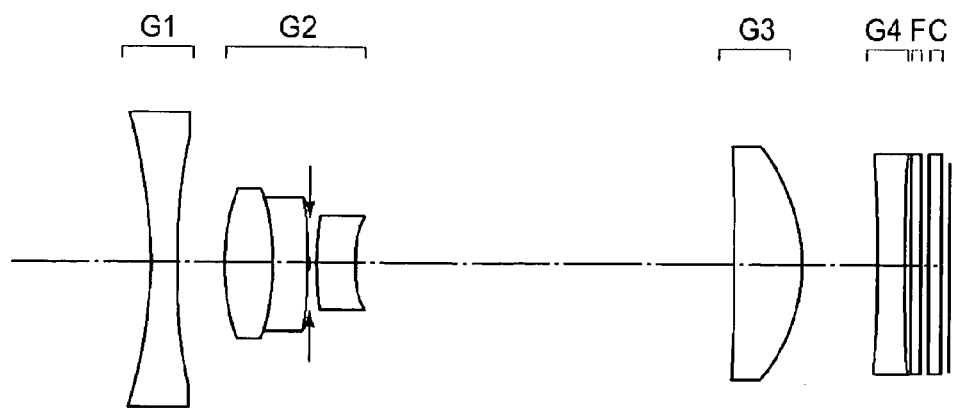

As shown in FIGS. 16A to 16C, the zoom optical system of Example 16 comprises, in order from the object side: a first lens unit G1 having a negative refractive power; a second lens unit G2 having a positive refractive power; a third lens unit G3 having a positive refractive power; and a fourth lens unit G4 having a negative refractive power. When zooming is performed from the wide-angle end to the telephoto end, the first lens unit G1 moves along a locus concave toward the object side, and is arranged slightly closer to the image side in the telephoto end than in the wide-angle end. The aperture stop S and the second lens unit G2 integrally and monotonously move toward the object side. The third lens unit G3 moves along a locus concave toward the object side while increasing the space between the third lens unit and the second lens unit G2, and is arranged slightly closer to the object side in the telephoto end than in the wide-angle end. The fourth lens unit G4 is fixed with respect to the image surface I.

The first lens unit G1 constituted of one biconcave negative lens, and the second lens unit G2 constituted of, in order from the object side, a cemented lens of a biconvex positive lens and a negative meniscus lens directing its convex surface on the image side, and a negative meniscus lens directing its convex surface on the object side. The third lens unit G3 constituted of one positive meniscus lens directing its convex surface on the image side, and the fourth lens unit G4 constituted of one biconcave negative lens. The aperture stop S is disposed between the cemented lens and the negative meniscus lens directing its convex surface on the object side in the second lens unit G2.

Aspherical surfaces are used on five surfaces: opposite surfaces of the biconcave negative lens of the first lens unit G1; the object-side surface of the biconvex positive lens of the second lens unit G2; the image-side surface of the positive meniscus lens of the third lens unit G3; and the object-side surface of the biconcave negative lens of the fourth lens unit G4.

It is to be noted that the diagonal length of the effective image taking region of the image sensor disposed on the image surface I is 7.2 mm.

EXAMPLE 17

Figure 17A:
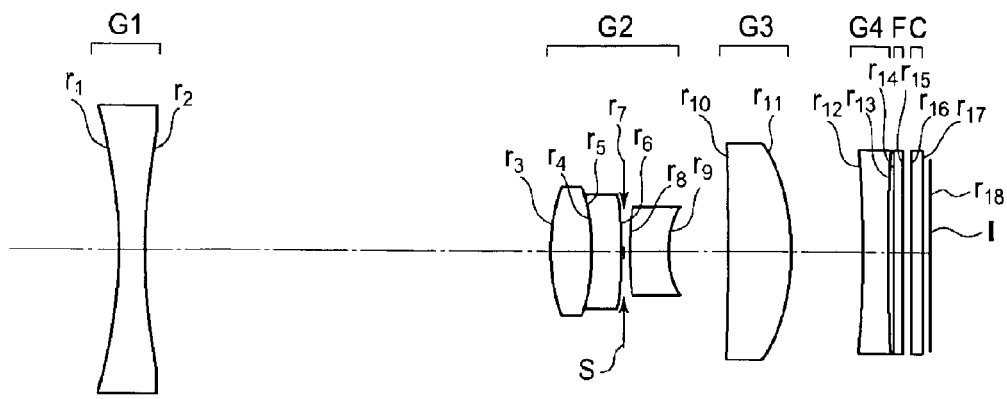
FIGS. 17A to 17C are sectional views similar to those of FIG. 1 of Example 17 of the present invention.
Figure 17B:
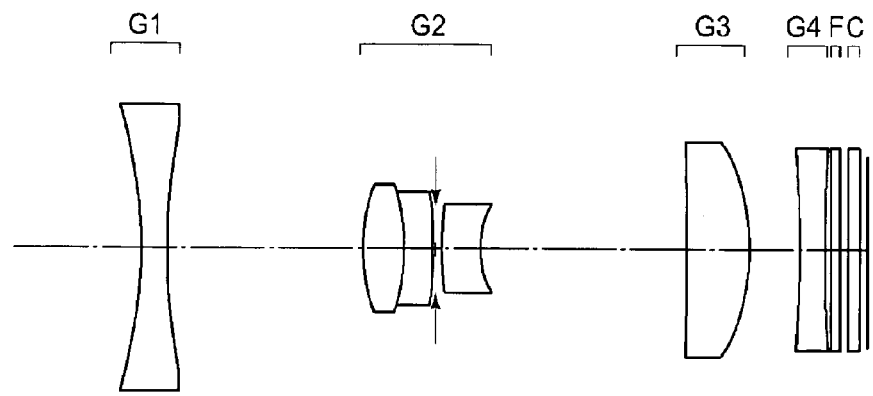
Figure 17C:
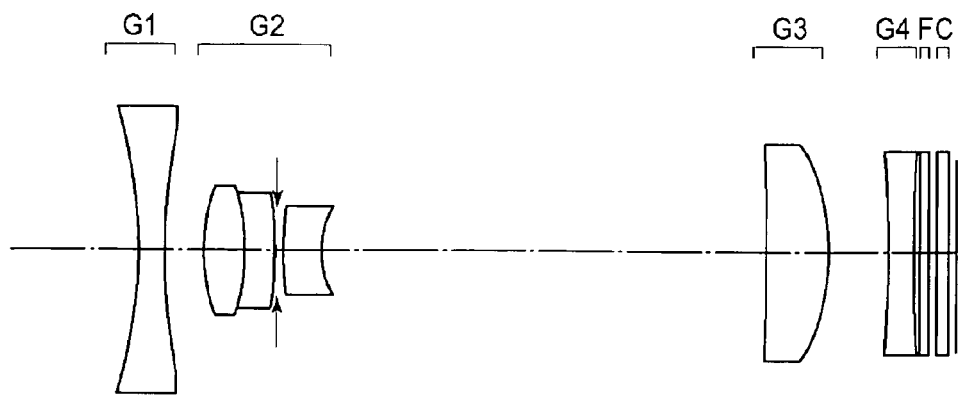

As shown in FIGS. 17A to 17C, the zoom optical system of Example 17 comprises, in order from the object side: a first lens unit G1 having a negative refractive power; a second lens unit G2 having a positive refractive power; a third lens unit G3 having a positive refractive power; and a fourth lens unit G4 having a negative refractive power. When zooming is performed from the wide-angle end to the telephoto end, the first lens unit G1 moves along a locus concave toward the object side, and is arranged slightly closer to the object side in the telephoto end than in the wide-angle end. The aperture stop S and the second lens unit G2 integrally and monotonously move toward the object side. The third lens unit G3 moves along a locus concave toward the object side while increasing the space between the third lens unit and the second lens unit G2, and is arranged slightly closer to the image side in the telephoto end than in the wide-angle end. The fourth lens unit G4 is fixed with respect to the image surface I.

The first lens unit G1 constituted of one biconcave negative lens, and the second lens unit G2 constituted of, in order from the object side, a cemented lens of a biconvex positive lens and a negative meniscus lens directing its convex surface on the image side and a negative meniscus lens directing its convex surface on the object side. The third lens unit G3 constituted of one positive meniscus lens directing its convex surface on the image side, and the fourth lens unit G4 constituted of a biconcave negative lens. The aperture stop S is disposed between the cemented lens and the negative meniscus lens directing its convex surface on the object side in the second lens unit G2.

Aspherical surfaces are used on five surfaces: opposite surfaces of the biconcave negative lens of the first lens unit G1; the object-side surface of the biconvex positive lens of the second lens unit G2; the image-side surface of the positive meniscus lens of the third lens unit G3; and the object-side surface of the biconcave negative lens of the fourth lens unit G4.

It is to be noted that the diagonal length of the effective image taking region of the image sensor disposed on the image surface I is 7.2 mm.

EXAMPLE 18

Figure 18A:
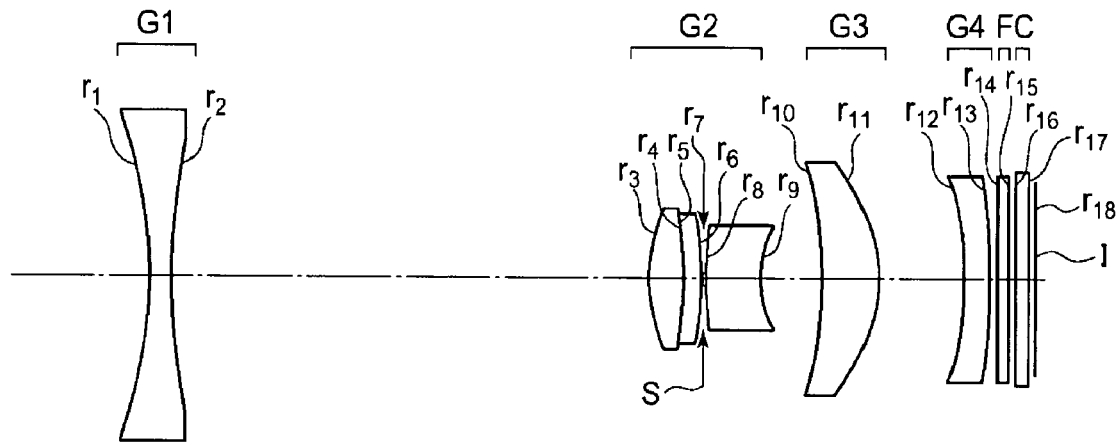
FIGS. 18A to 18C are sectional views similar to those of FIG. 1 of Example 18 of the present invention.
Figure 18B:
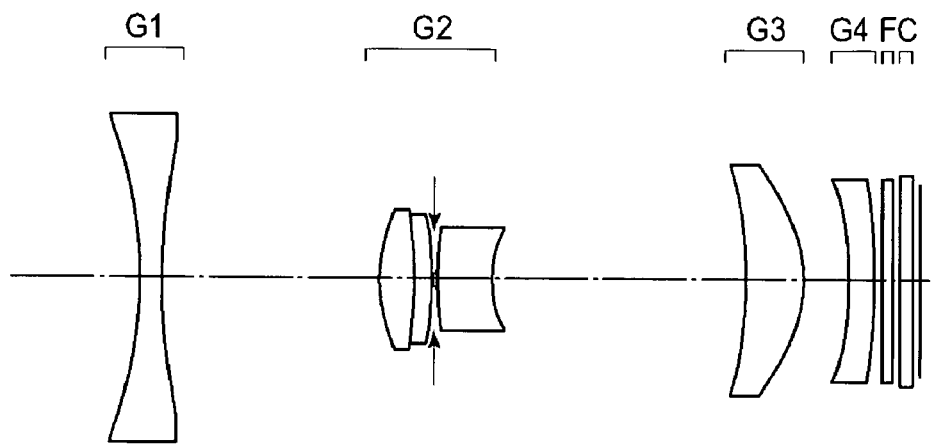
Figure 18C:
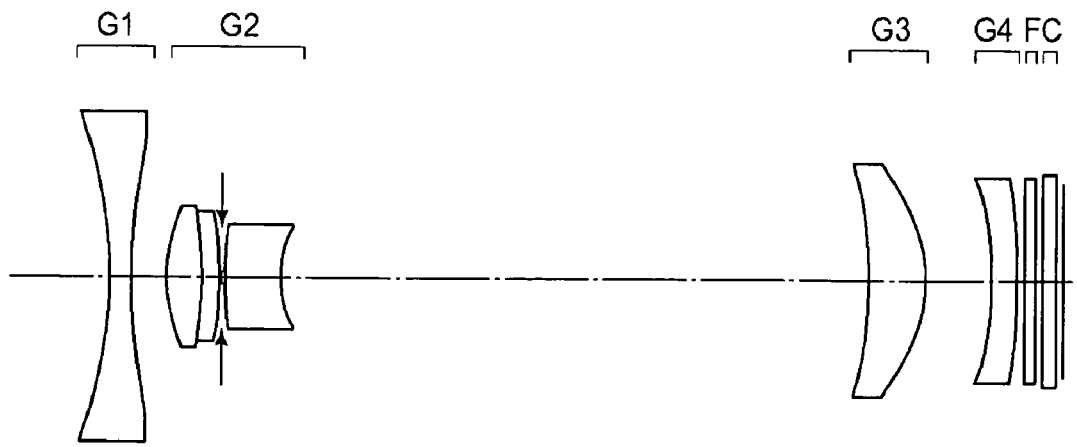
Figure 19A:
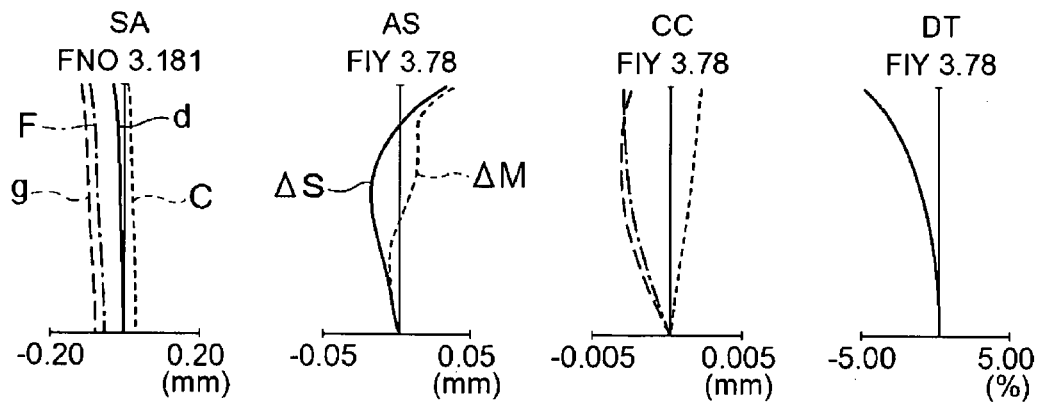
FIGS. 19A to 19C are aberration diagrams of Example 1 when focused on the infinite object.
Figure 19B:
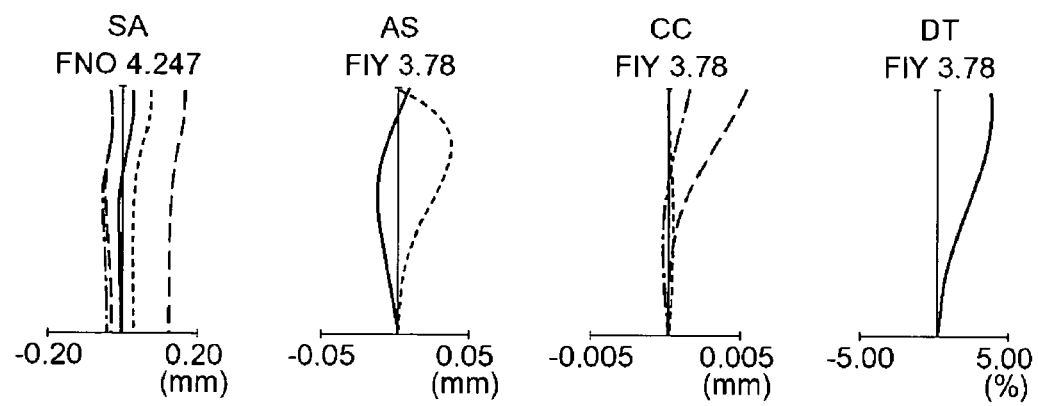
Figure 19C:
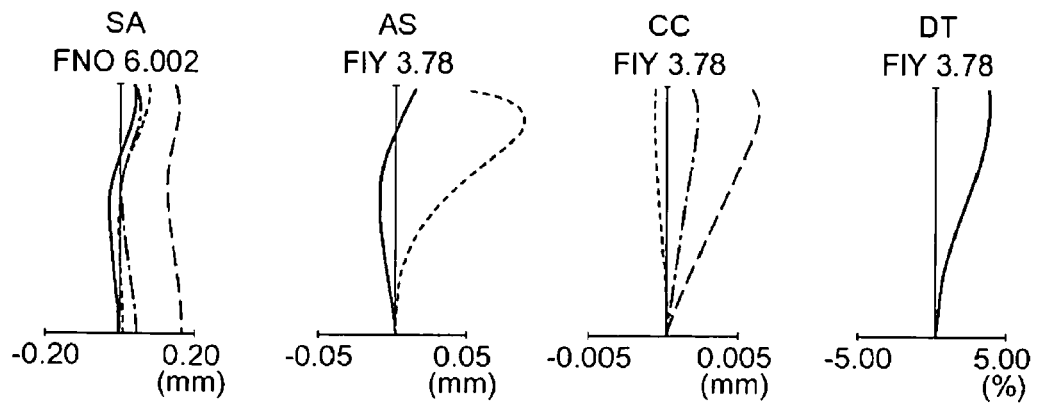
Figure 20A:
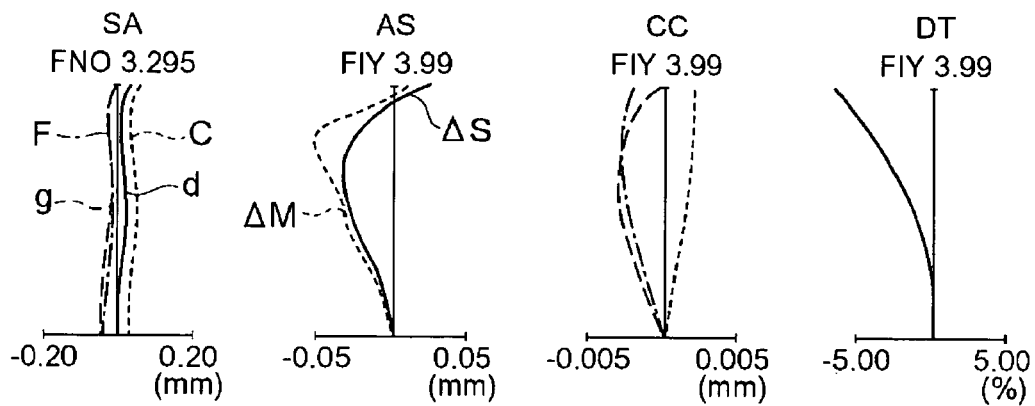
FIGS. 20A to 20C are aberration diagrams of Example 2 when focused on the infinite object.
Figure 20B:
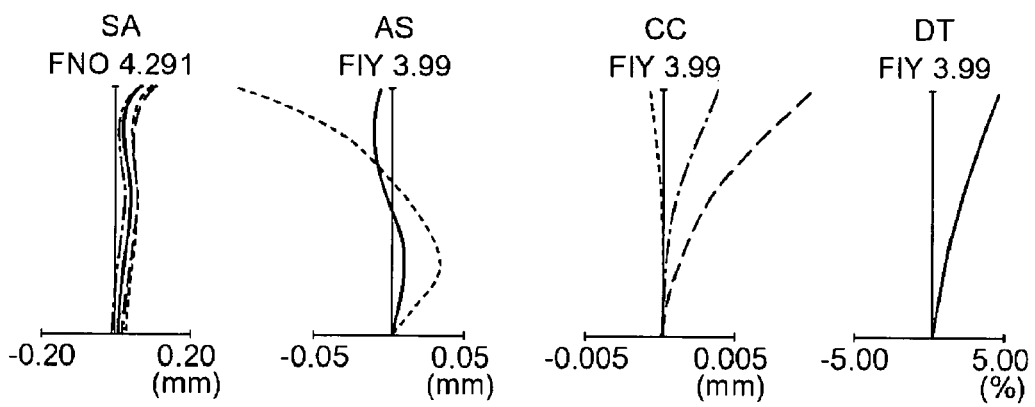
Figure 20C:
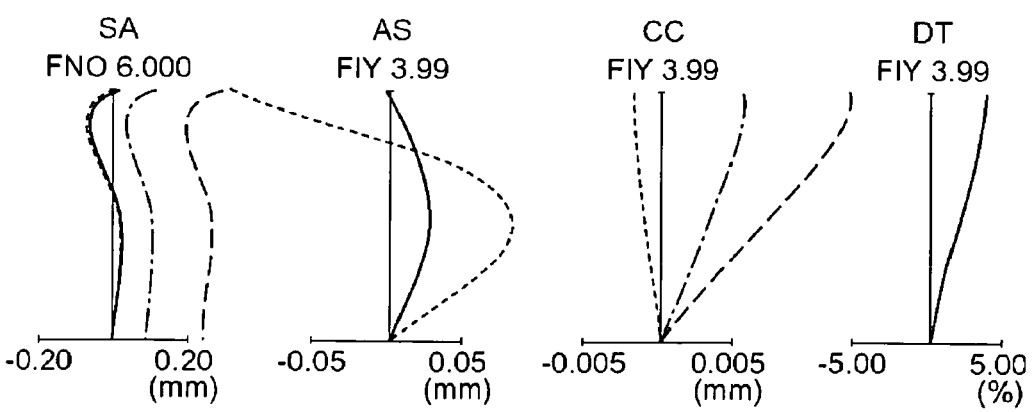
Figure 21A:
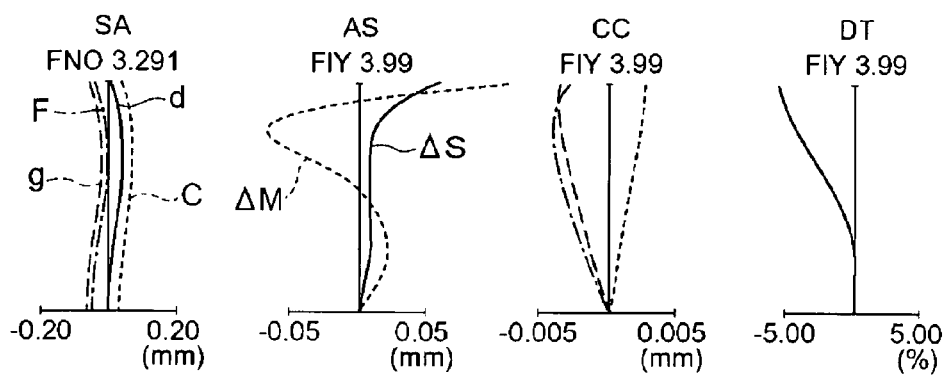
FIGS. 21A to 21C are aberration diagrams of Example 3 when focused on the infinite object.
Figure 21B:
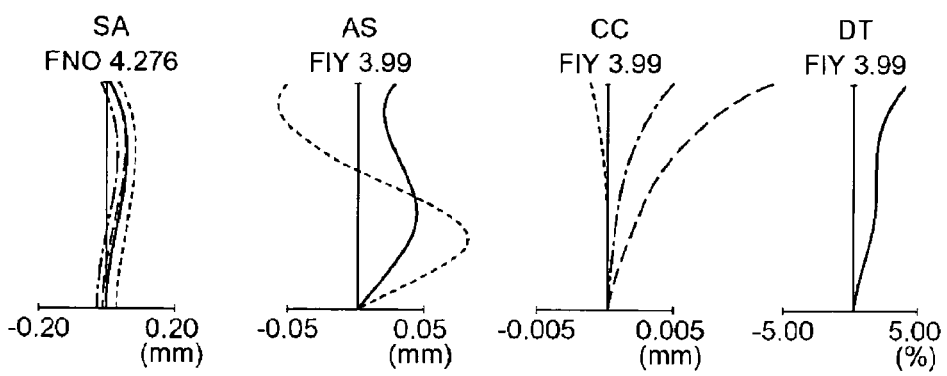
Figure 21C:
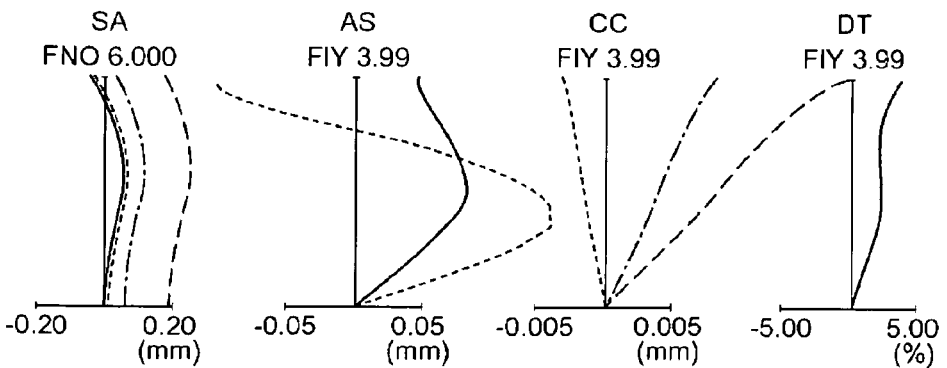
Figure 22A:
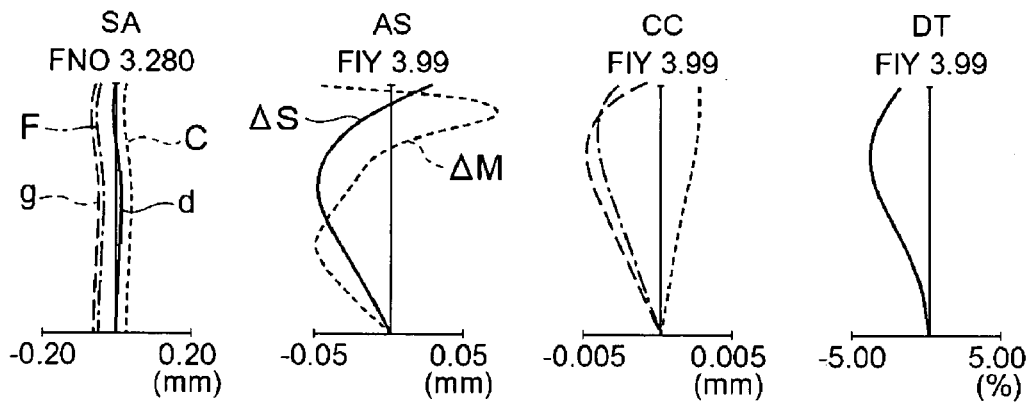
FIGS. 22A to 22C are aberration diagrams of Example 4 when focused on the infinite object.
Figure 22B:
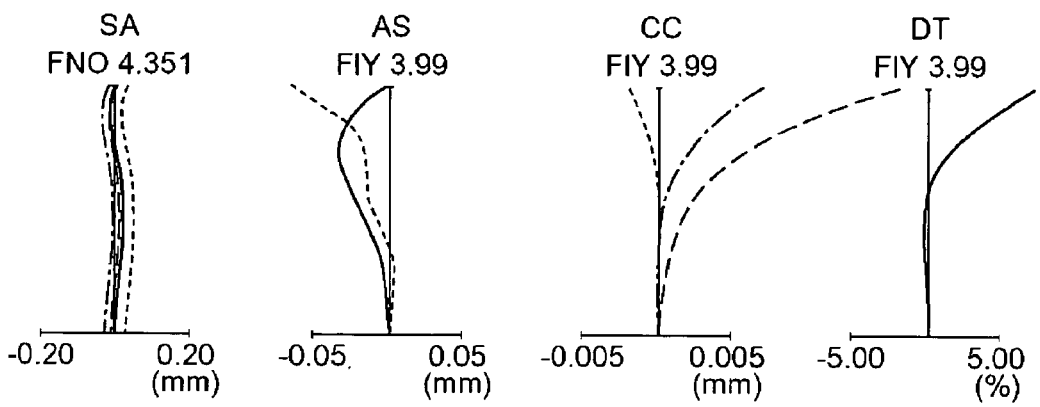
Figure 22C:
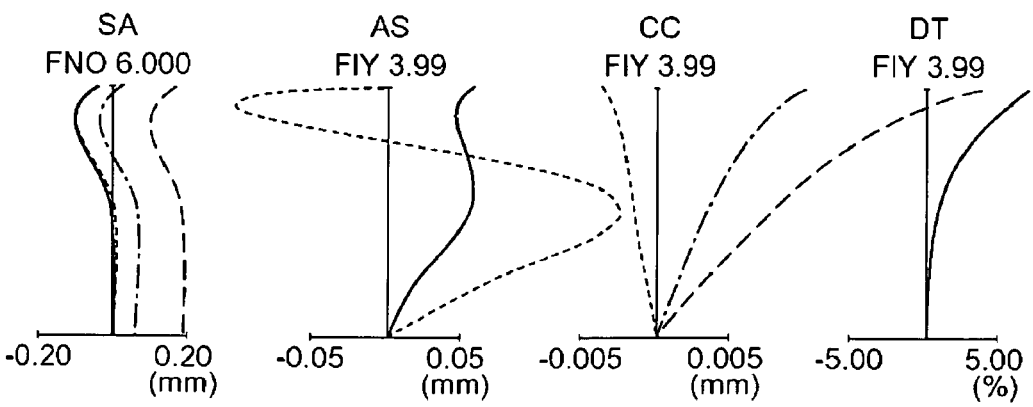
Figure 23A:
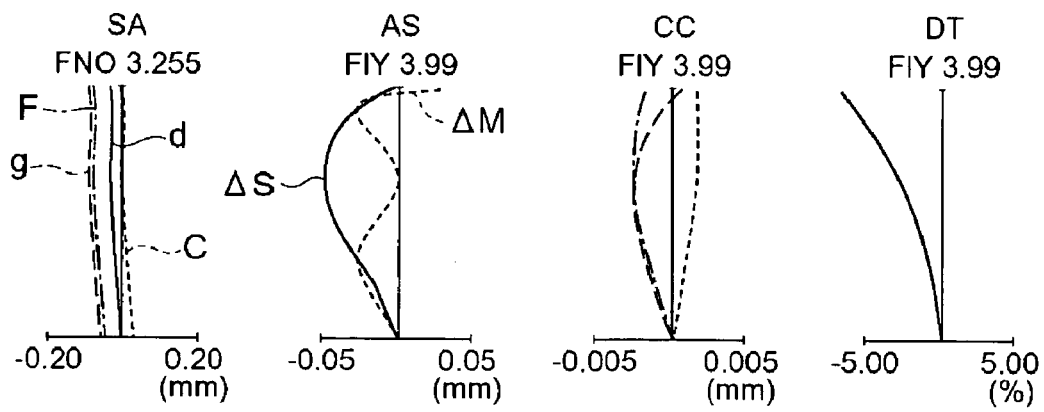
FIGS. 23A to 23C are aberration diagrams of Example 5 when focused on the infinite object.
Figure 23B:
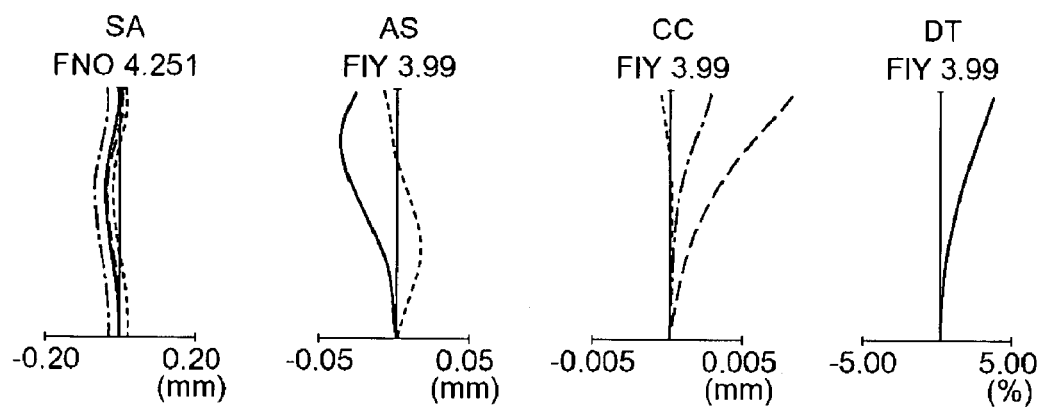
Figure 23C:
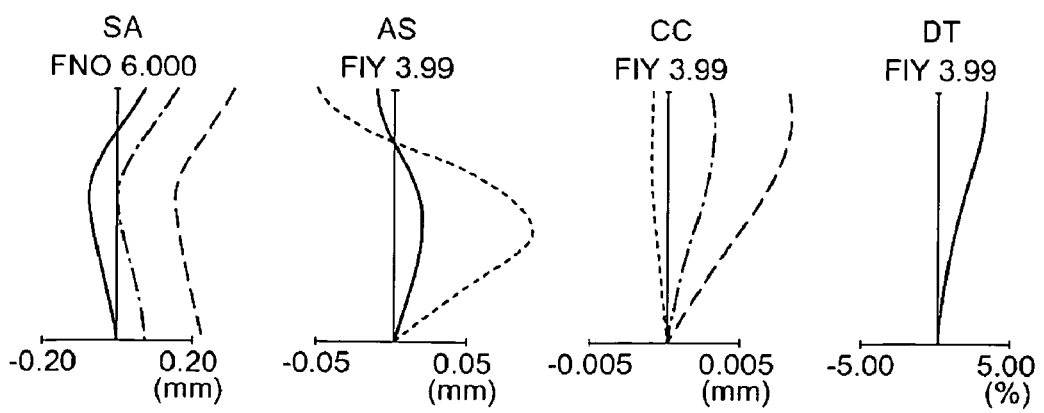
Figure 24A:
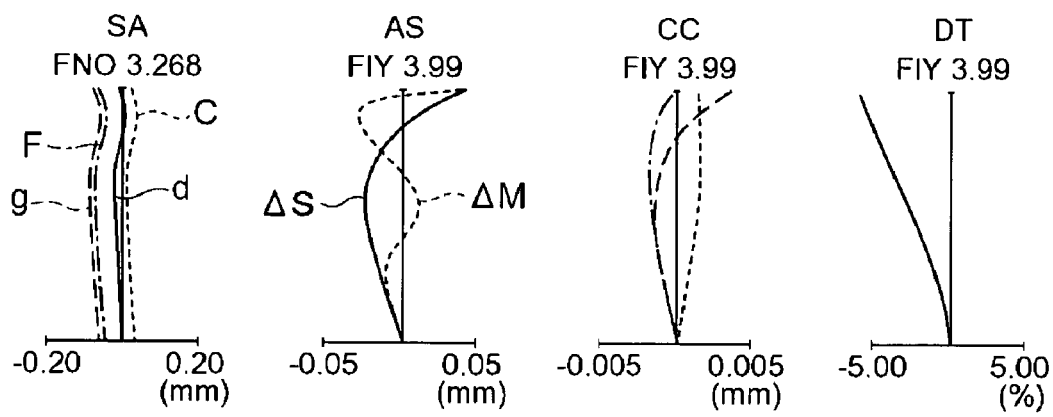
FIGS. 24A to 24C are aberration diagrams of Example 6 when focused on the infinite object.
Figure 24B:
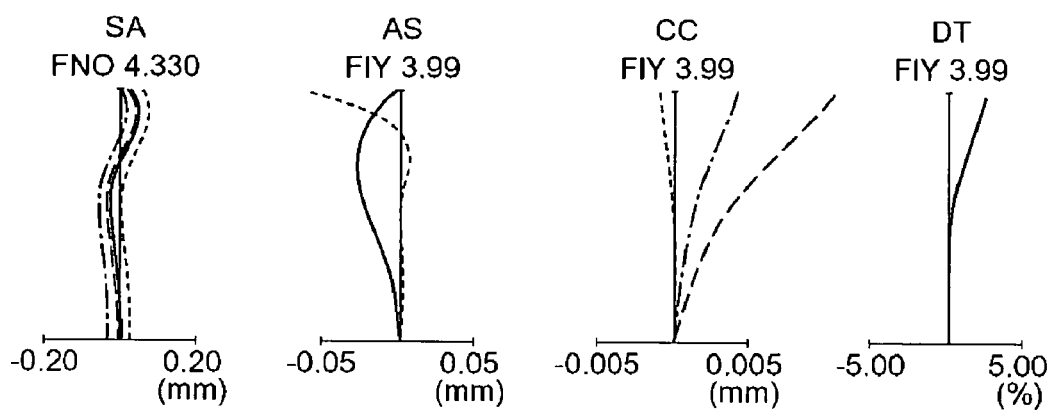
Figure 24C:
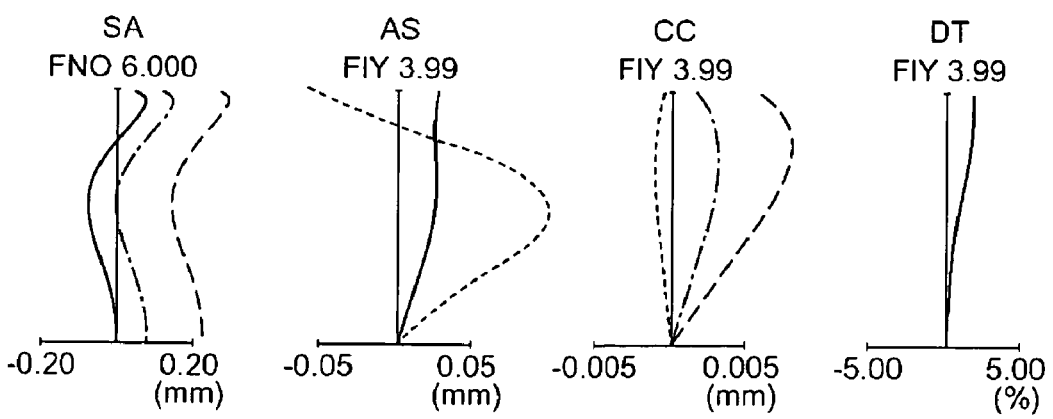
Figure 25A:
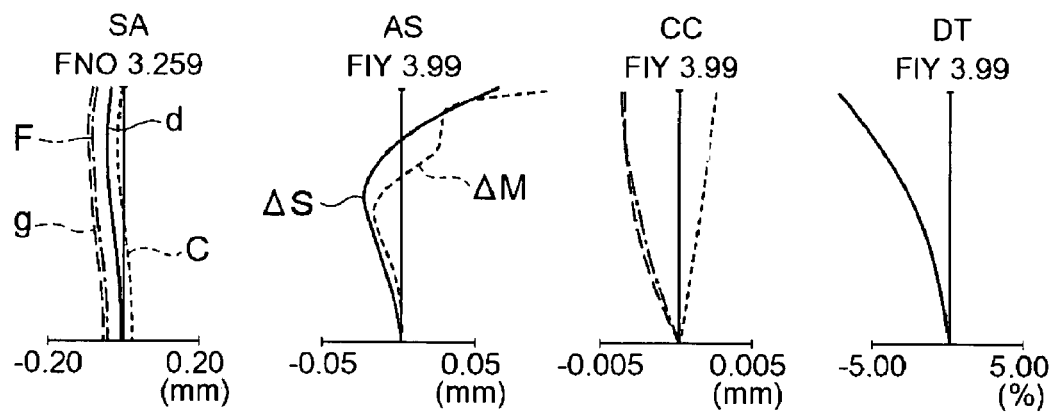
FIGS. 25A to 25C are aberration diagrams of Example 7 when focused on the infinite object.
Figure 25B:
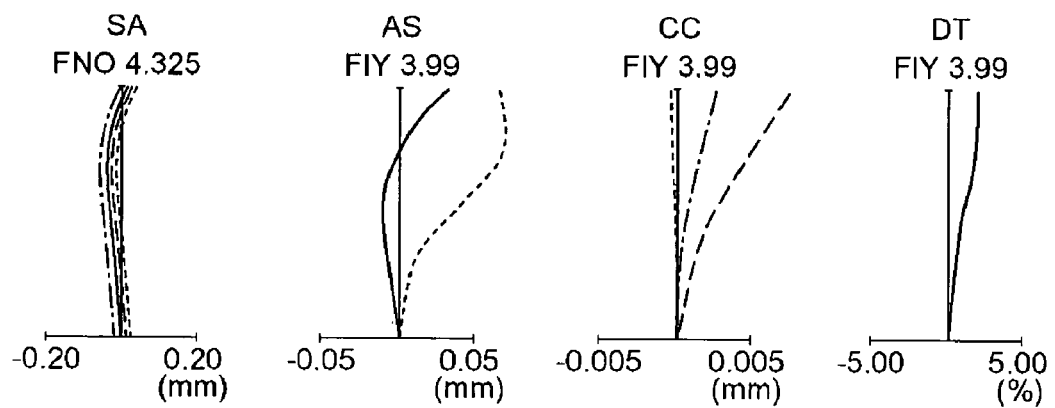
Figure 25C:
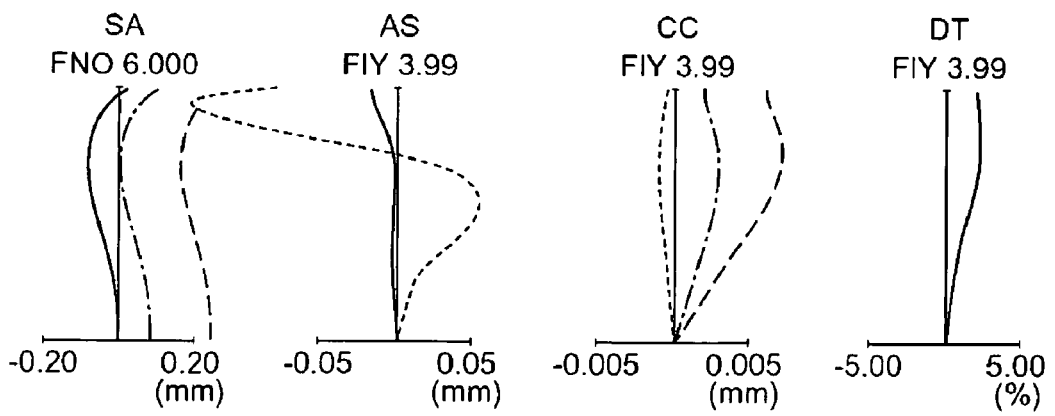
Figure 26A:
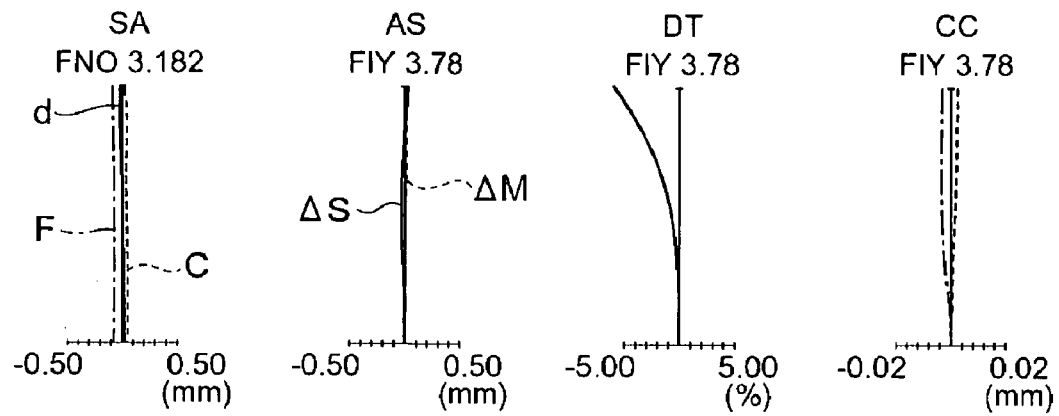
FIGS. 26A to 26C are aberration diagrams of Example 8 when focused on the infinite object.
Figure 26B:
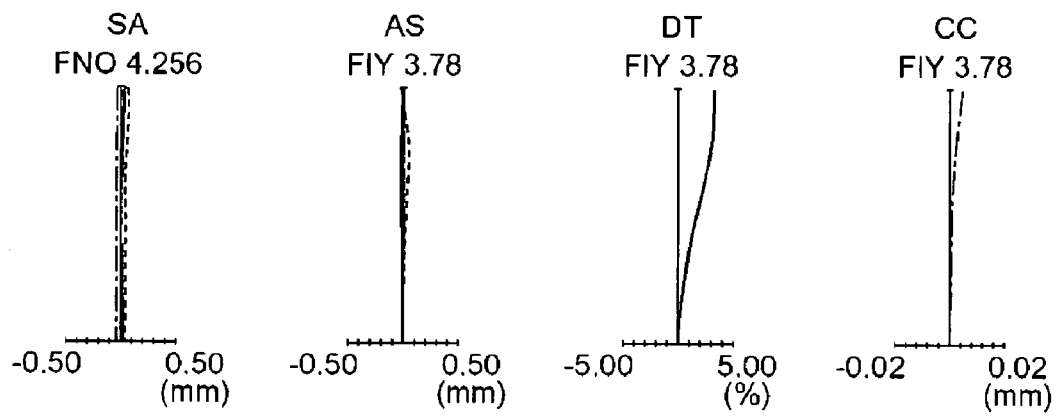
Figure 26C:
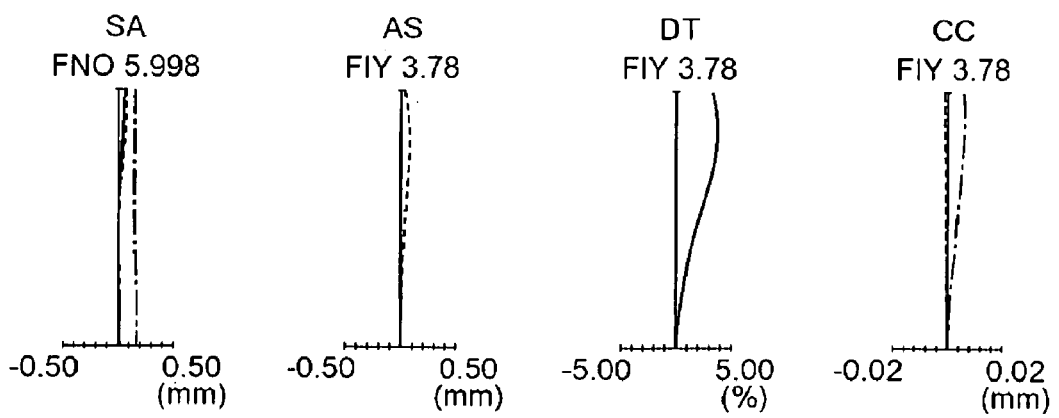
Figure 27A:
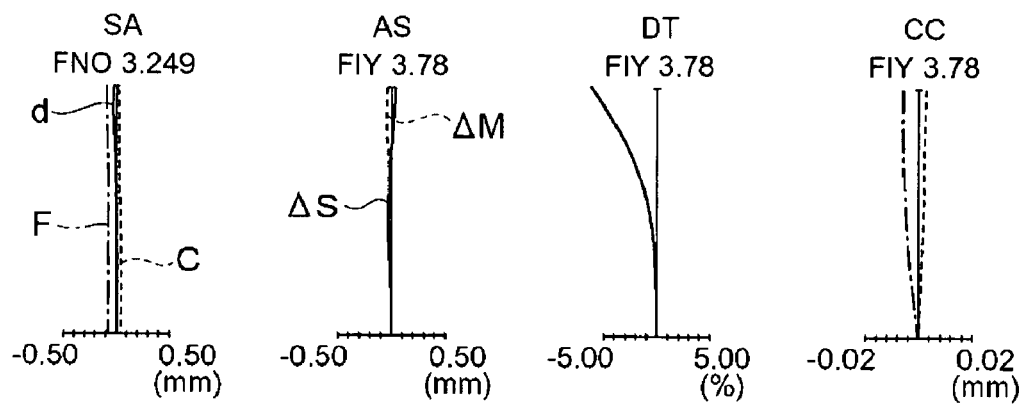
FIGS. 27A to 27C are aberration diagrams of Example 9 when focused on the infinite object.
Figure 27B:
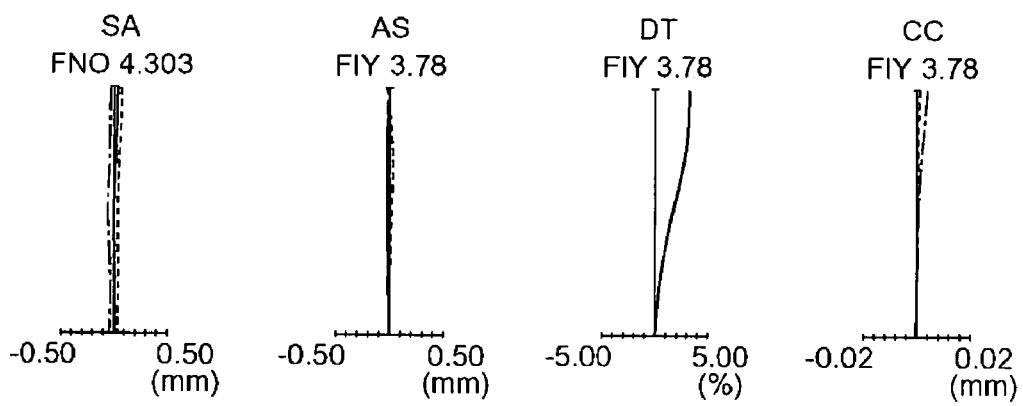
Figure 27C:
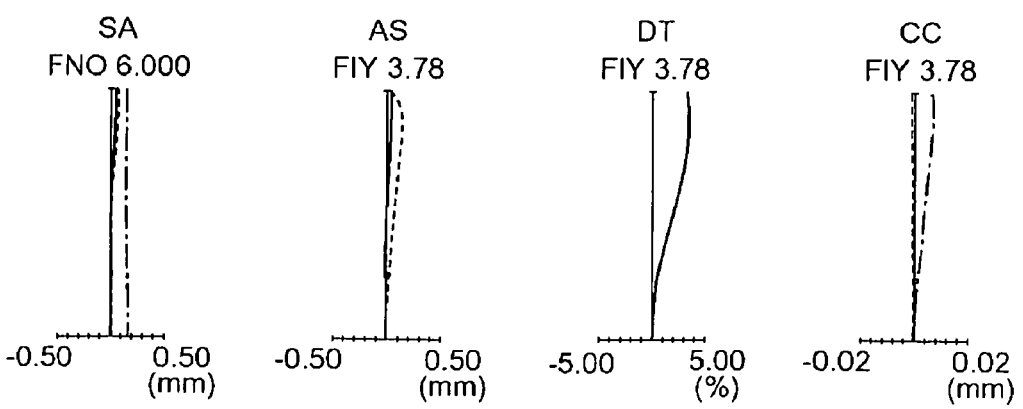
Figure 28A:
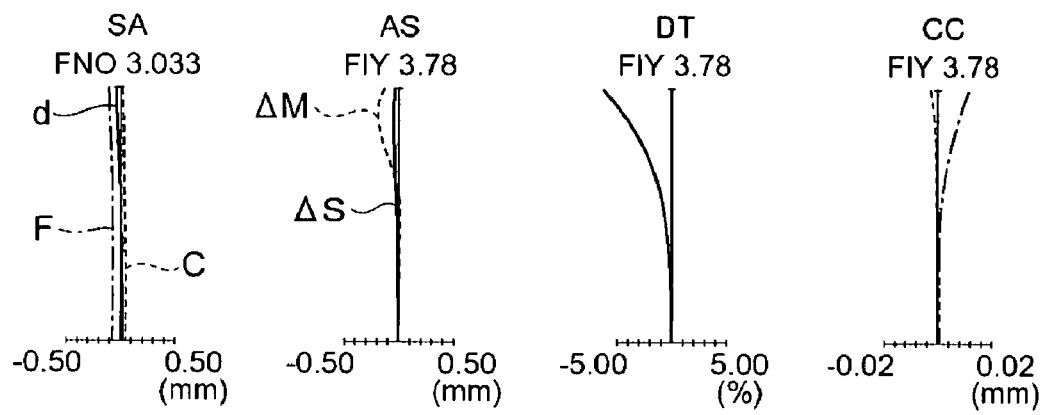
FIGS. 28A to 28C are aberration diagrams of Example 10 when focused on the infinite object.
Figure 28B:
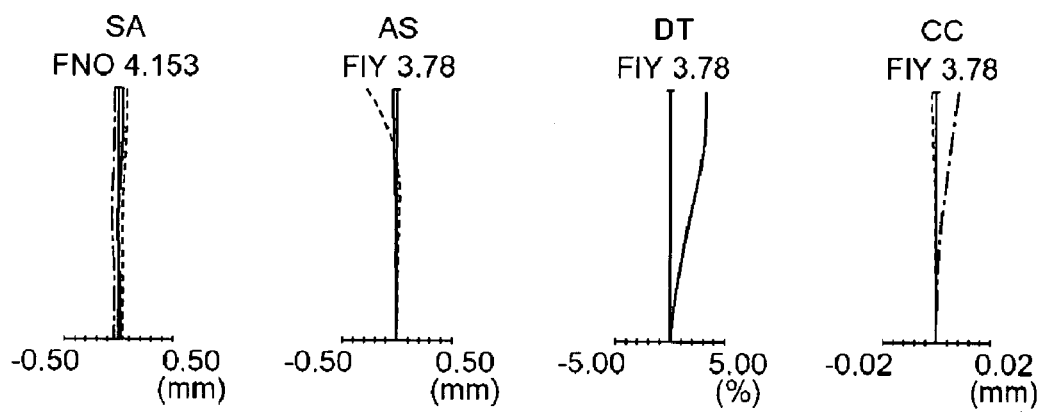
Figure 28C:
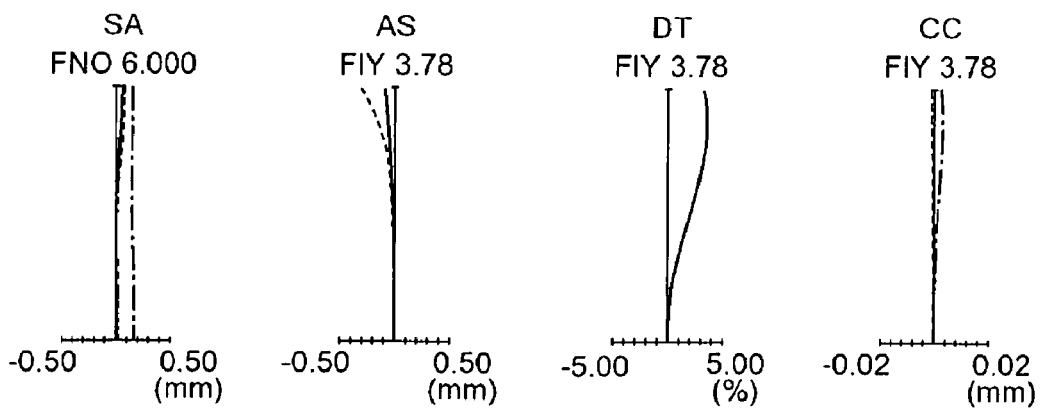
Figure 29A:
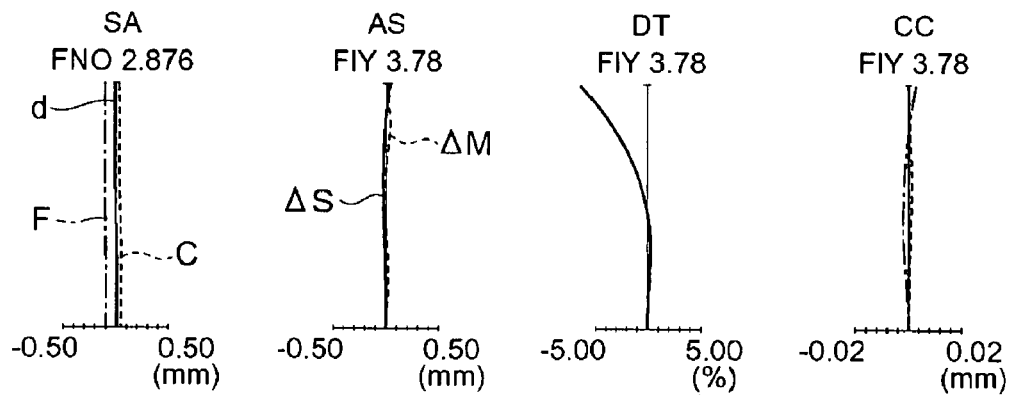
FIGS. 29A to 29C are aberration diagrams of Example 11 when focused on the infinite object.
Figure 29B:
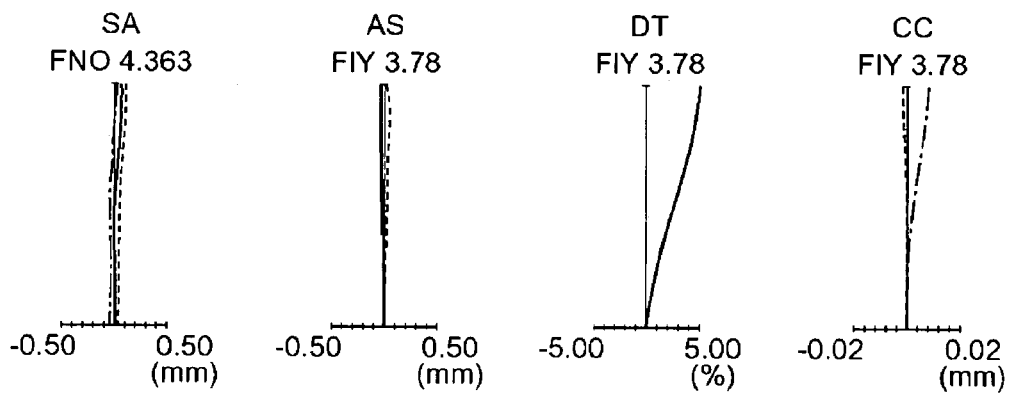
Figure 29C:
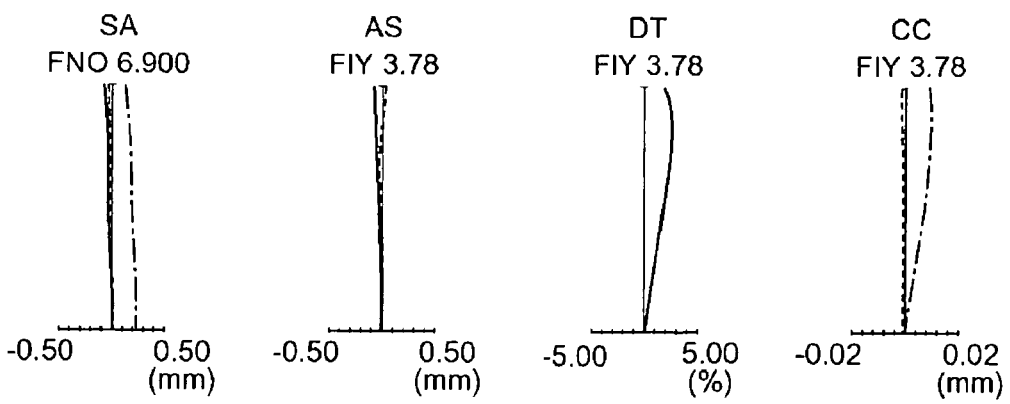
Figure 30A:
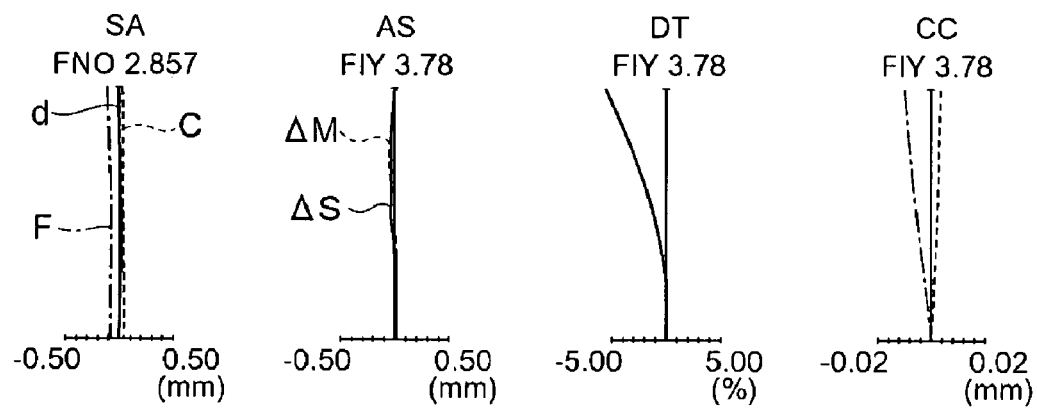
FIGS. 30A to 30C are aberration diagrams of Example 12 when focused on the infinite object.
Figure 30B:
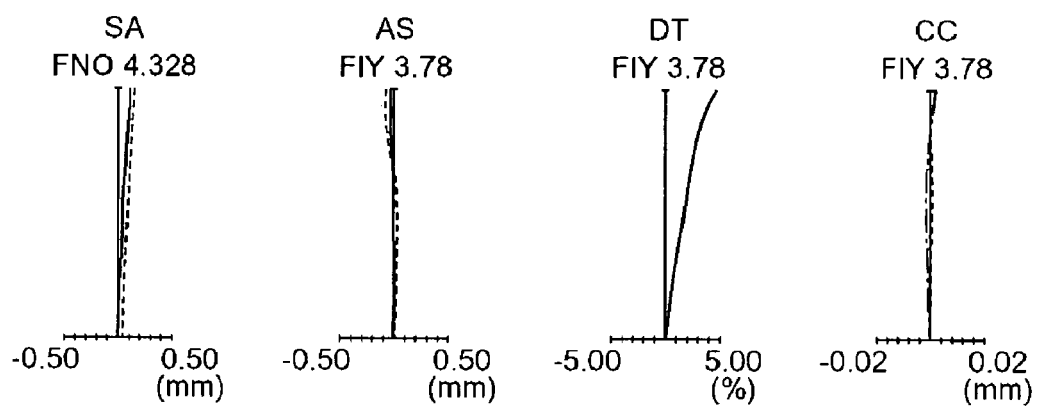
Figure 30C:
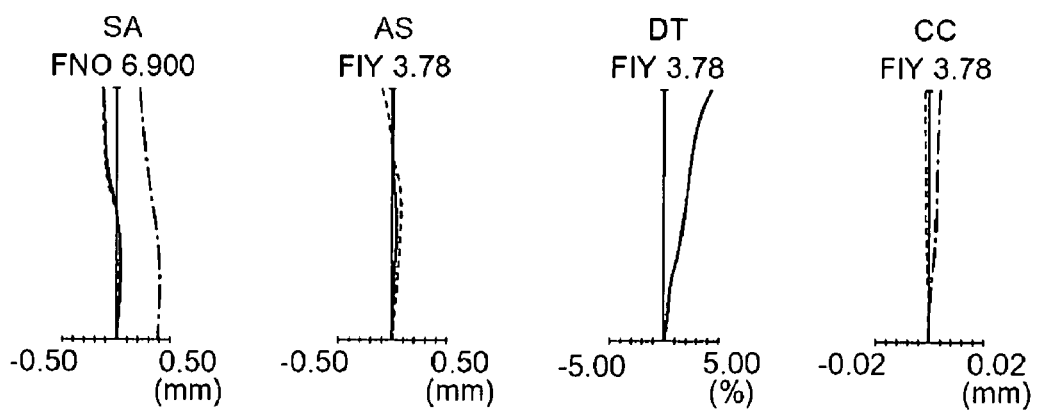
Figure 31A:
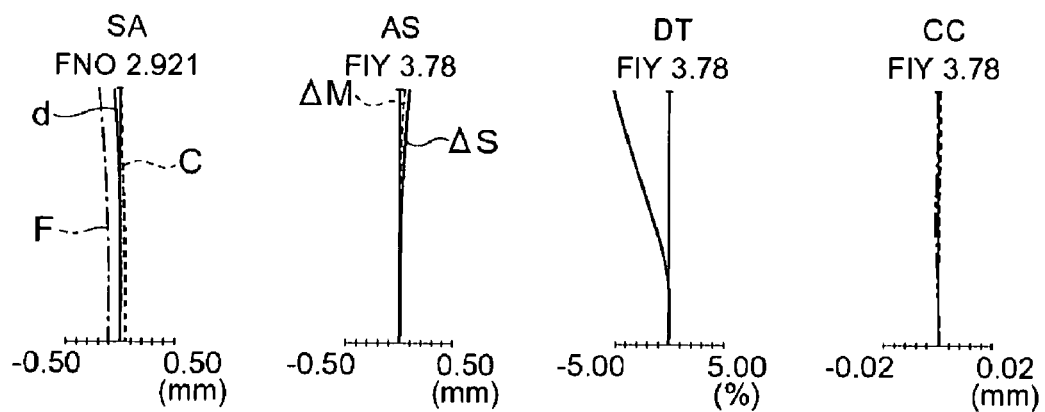
FIGS. 31A to 31C are aberration diagrams of Example 13 when focused on the infinite object.
Figure 31B:
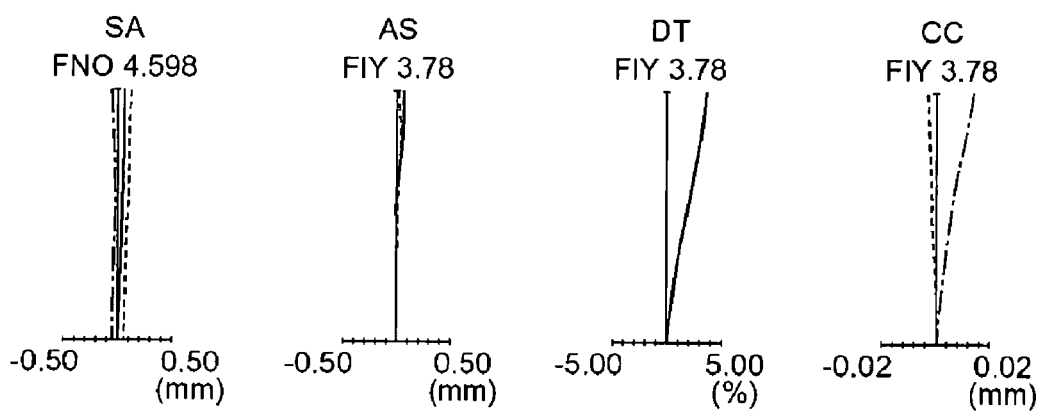
Figure 31C:
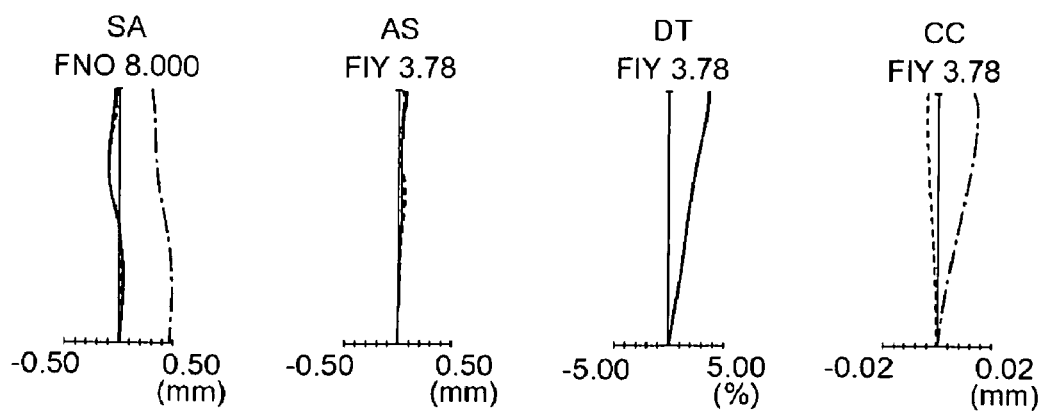
Figure 32A:
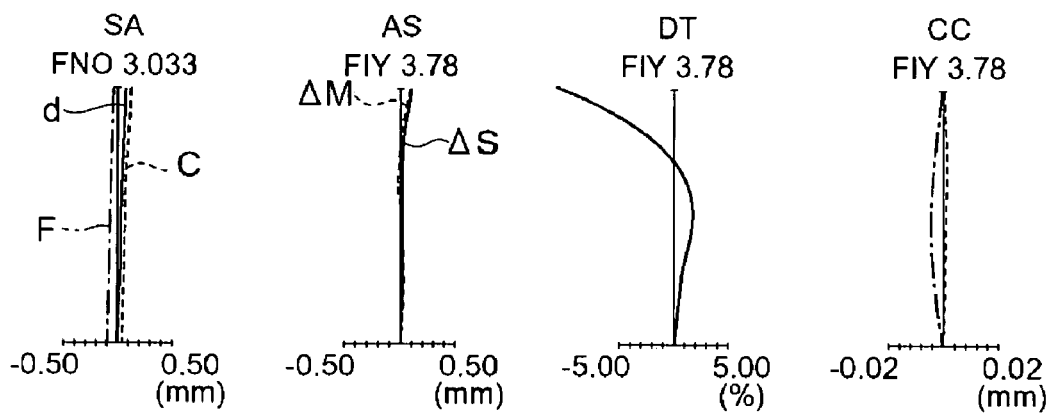
FIGS. 32A to 32C are aberration diagrams of Example 14 when focused on the infinite object.
Figure 32B:
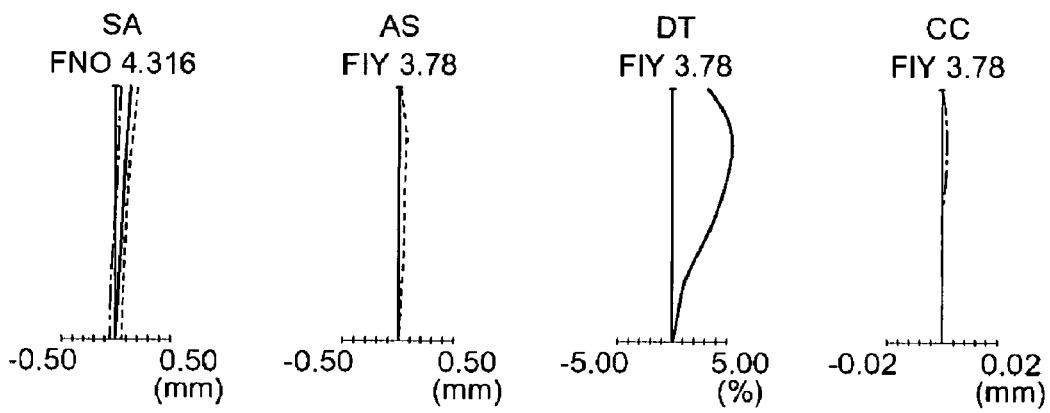
Figure 32C:
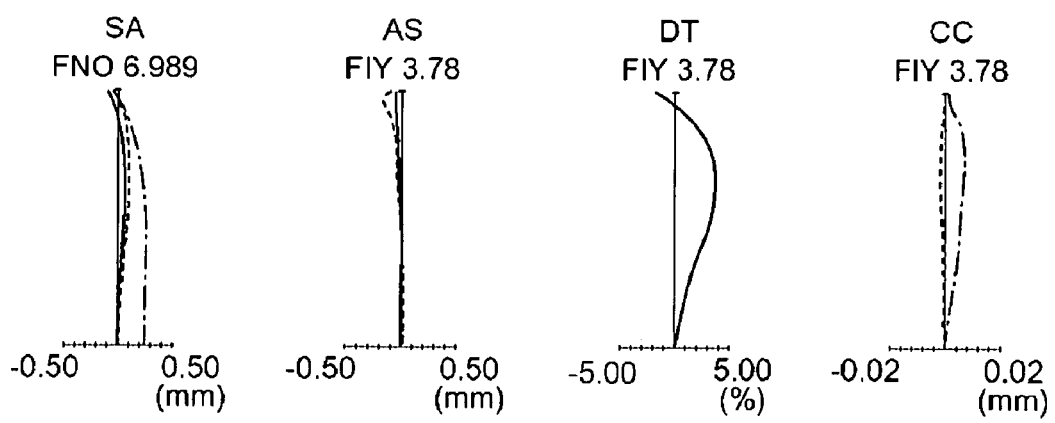
Figure 33A:
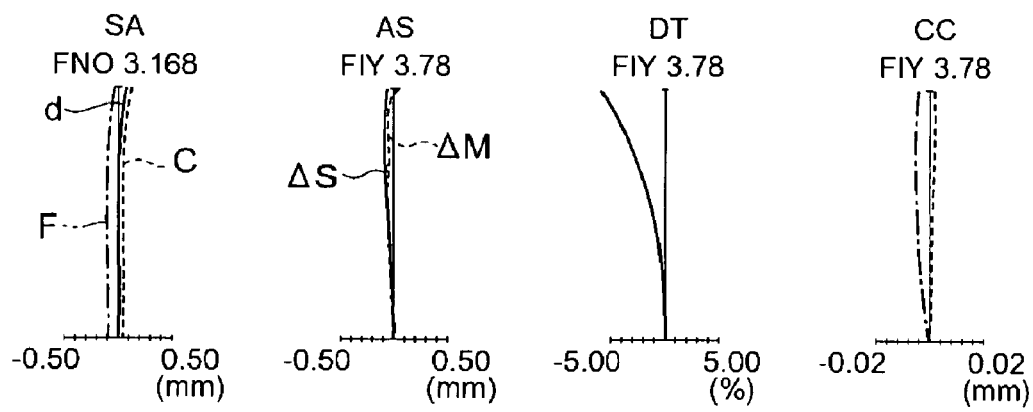
FIGS. 33A to 33C are aberration diagrams of Example 15 when focused on the infinite object.
Figure 33B:
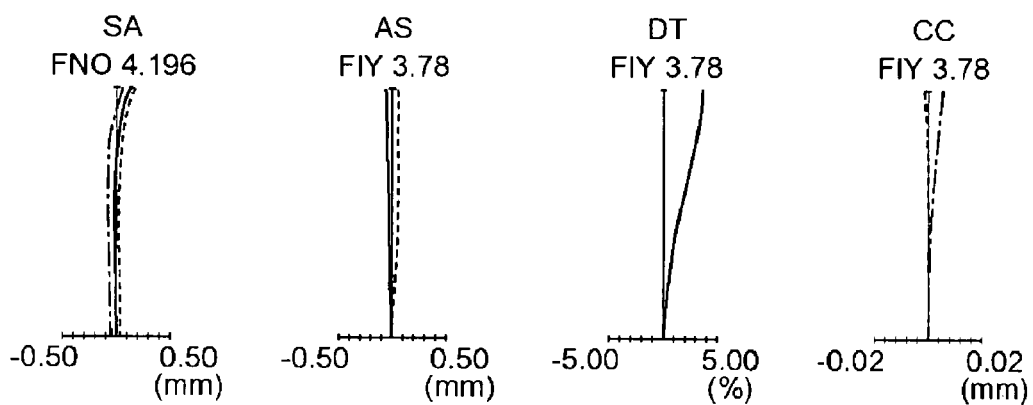
Figure 33C:
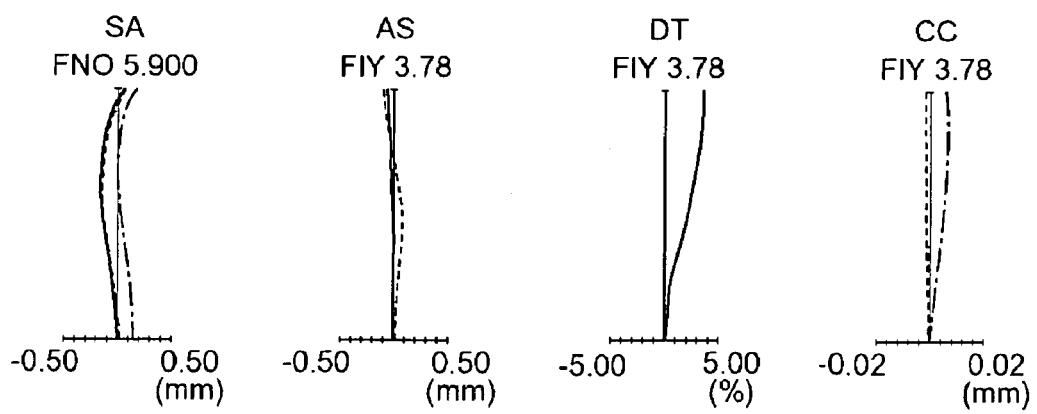
Figure 34A:
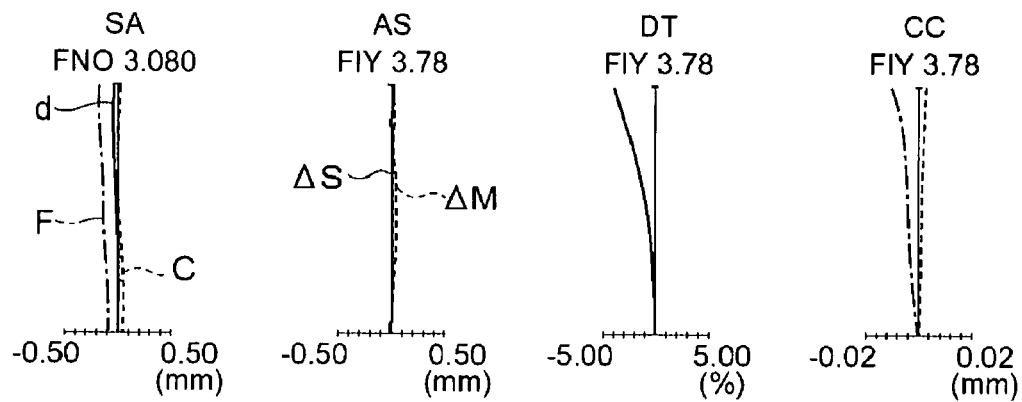
FIGS. 34A to 34C are aberration diagrams of Example 16 when focused on the infinite object.
Figure 34B:
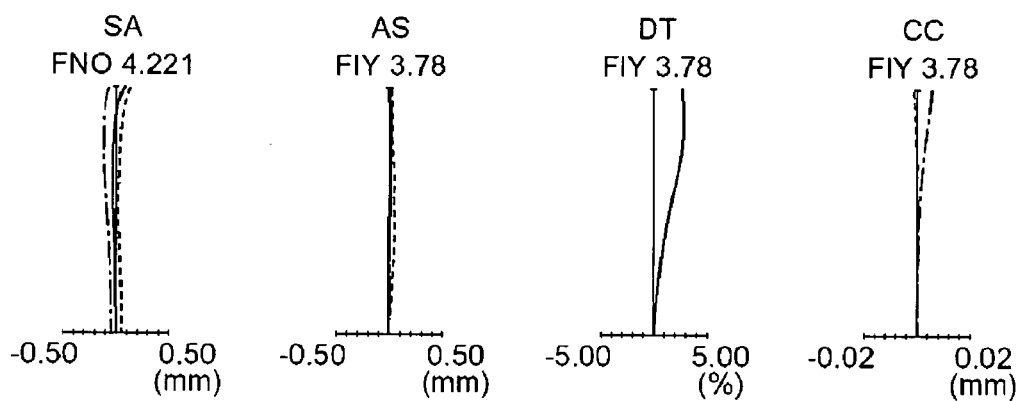
Figure 34C:
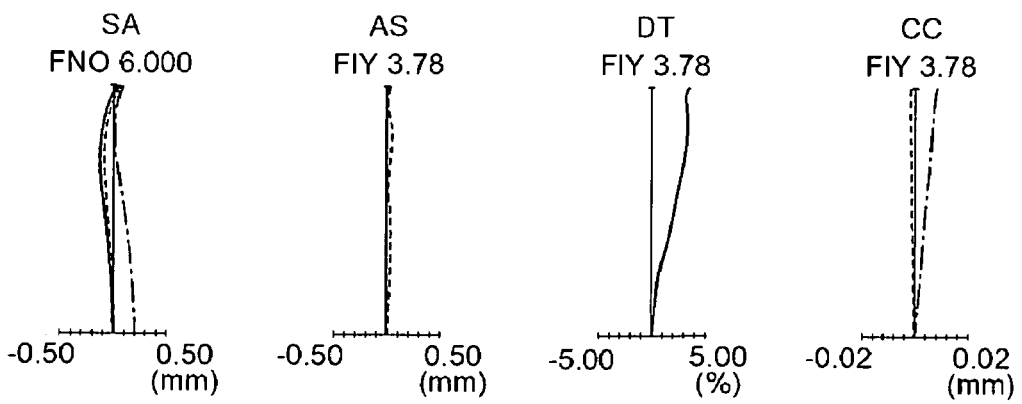
Figure 35A:
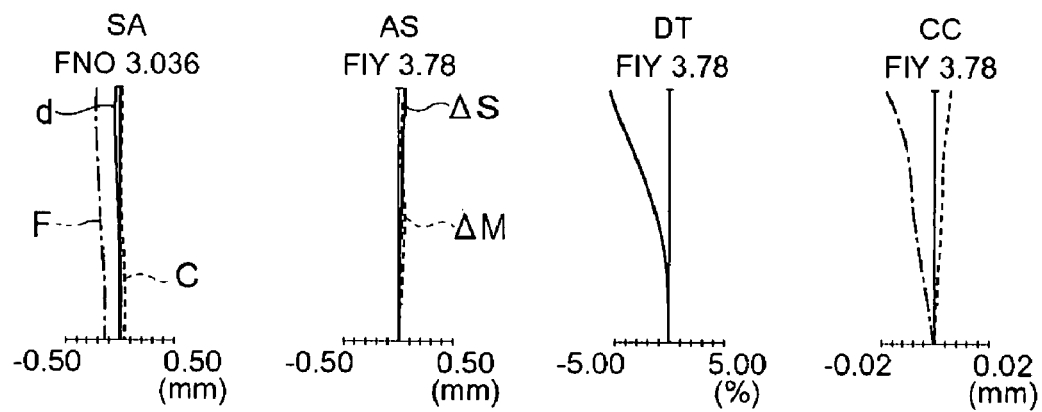
FIGS. 35A to 35C are aberration diagrams of Example 17 when focused on the infinite object.
Figure 35B:
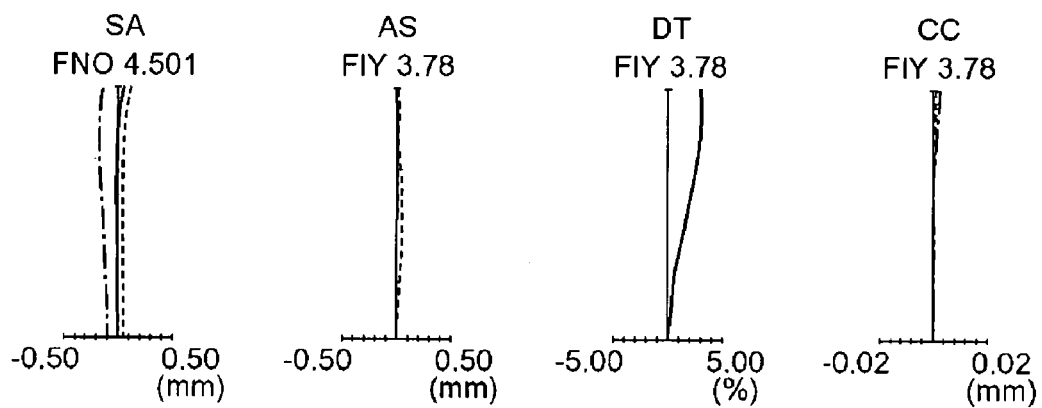
Figure 35C:
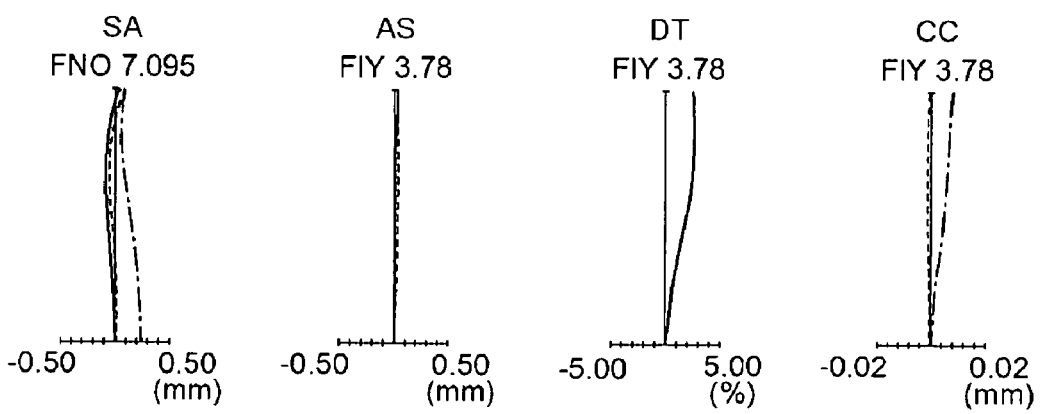
Figure 36A:
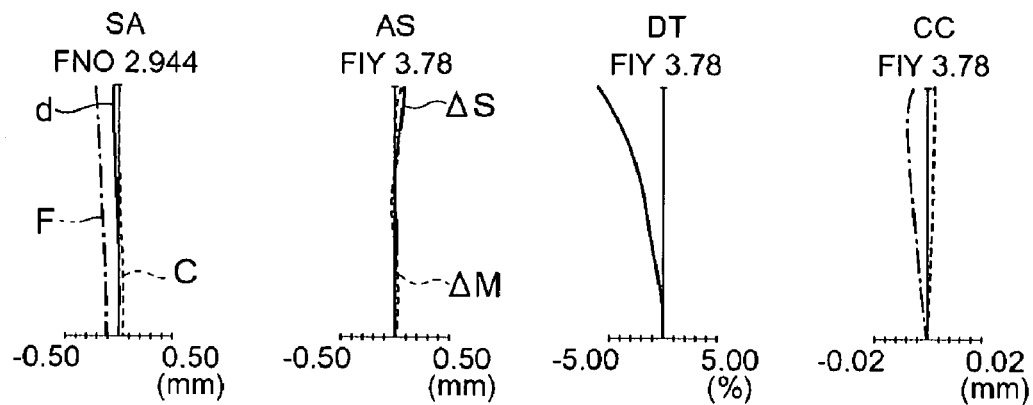
FIGS. 36A to 36C are aberration diagrams of Example 18 when focused on the infinite object.
Figure 36B:
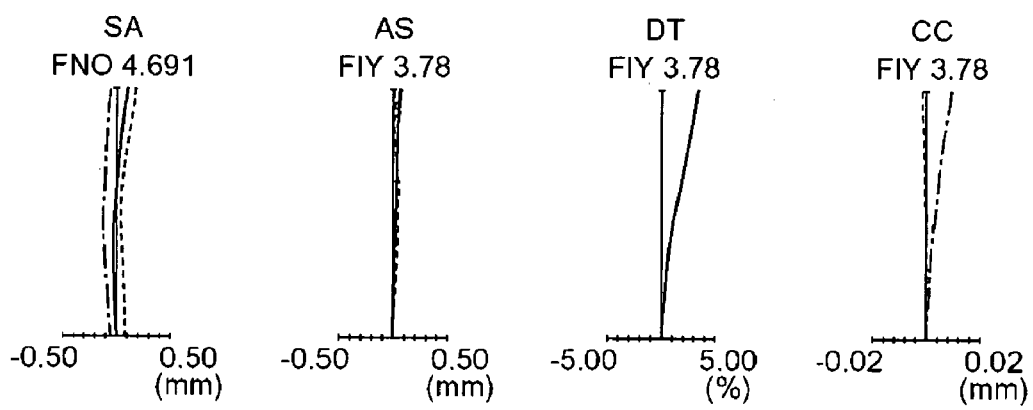
Figure 36C:
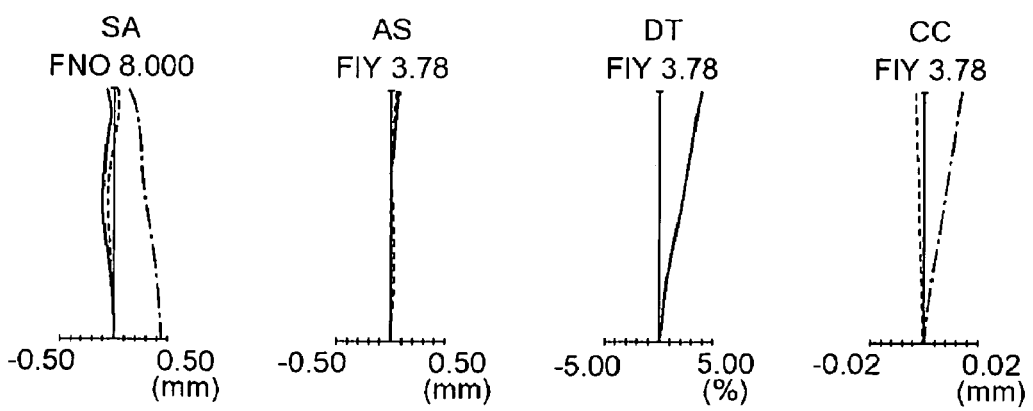

As shown in FIGS. 18A to 18C, the zoom optical system of Example 18 comprises, in order from the object side: a first lens unit G1 having a negative refractive power; a second lens unit G2 having a positive refractive power; a third lens unit G3 having a positive refractive power; and a fourth lens unit G4 having a negative refractive power. When zooming is performed from the wide-angle end to the telephoto end, the first lens unit G1 moves along a locus concave toward the object side, and is arranged slightly closer to the object side in the telephoto end than in the wide-angle end. The aperture stop S and the second lens unit G2 integrally and monotonously move toward the object side. The third lens unit G3 moves along a locus concave toward the object side while increasing the space between the third lens unit and the second lens unit G2, and is arranged slightly closer to the image side in the telephoto end than in the wide-angle end. The fourth lens unit G4 is fixed with respect to the image surface I.

The first lens unit G1 constituted of one biconcave negative lens, and the second lens unit G2 constituted of, in order from the object side, a cemented lens of a biconvex positive lens and a negative meniscus lens directing its concave surface on the object side, and a negative meniscus lens directing its convex surface on the object side. The third lens unit G3 constituted of one positive meniscus lens directing its concave surface on the object side, and the fourth lens unit G4 constituted of one negative meniscus lens directing its concave surface on the object side. The aperture stop S is disposed between the cemented lens and the negative meniscus lens directing its convex surface on the object side in the second lens unit G2.

Aspherical surfaces are used on five surfaces: opposite surfaces of the biconcave negative lens of the first lens unit G1; the object-side surface of the biconvex lens of the second lens unit G2; the image-side surface of the positive meniscus lens of the third lens unit G3; and the object-side surface of the negative meniscus lens of the fourth lens unit G4.

It is to be noted that the diagonal length of the effective image taking region of the image sensor disposed on the image surface I is 7.2 mm.

As described above in Examples 1 to 18, the aperture stop S may be disposed between the lenses of the second lens unit G2, and the aperture stop S may be a variable aperture stop. Alternatively, the aperture shape of this aperture stop S is fixed, and an aperture stop which has a variable aperture and moves integrally with the second lens unit G2 along the optical axis may be disposed immediately before the second lens unit G2. In such constitution, the aperture stop is disposed in an intermediate position of the optical system in a bright state with a reduced F number. Therefore, even in a state in which a space between the lenses of the second lens unit G2 is reduced, an effective diameter is easily balanced, a quantity of light can be adjusted by the aperture stop immediately before the second lens unit G2, and the constitution is advantageous in the miniaturization and the improvement of performance.

There will be described hereinafter numeric value data of the above examples. In addition to the above-described symbols, f denotes a focal length of the zoom optical system, FNO denotes the F number, ω is a half angle of field, WE denotes the wide-angle end, ST denotes the intermediate state, TE denotes the telephoto end, R denotes a radius of curvature of each lens surface, D denotes a space between the lens surfaces, Nd denotes a refractive index of each lens for the wavelength of the d-line, and Vd denotes the Abbe number of each lens. It is to be noted that an aspherical shape is represented by the following equation in a coordinate system in which x axis coincide with the optical axis having the positive direction toward the light traveling direction, and y axis is set to be perpendicular to the optical axis and to intersect with the optical axis at the vertex of the aspherical surface.

$$x=(y^2/r)/[1+\{1-(k+1)(y/r)^2\}^{1/2}]+A4 \cdot y^4+A6 \cdot y^6+A8 \cdot y^8+A10 \cdot y^{10},$$

wherein r denotes a paraxial radius of curvature, k denotes a conic coefficient, and A4, A6, A8 and A10 denote fourth-order, sixth-order, eighth-order and tenth-order aspherical coefficients, respectively.

It is to be noted that in data tables, e means a power of 10. Therefore, in Example 1, the value 2.5934e-4 of the aspherical coefficient A4 of the first surface may also be written as $2.5934 \times 10^{-4}$.

EXAMPLE 1

TABLE 1

| Surface | R | D | Nd | Vd |
|---|---|---|---|---|
| 1 | −11.92(ASP) | 0.90 | 1.49585 | 81.29 |
| 2 | 27.33(ASP) | D2 | | |
| 3 | 4.68(ASP) | 1.53 | 1.80610 | 40.73 |
| 4 | −18.01(ASP) | 0.10 | | |
| 5 | ∞ (STOP) | 0.20 | | |
| 6 | 18.23 | 1.13 | 1.78800 | 47.37 |
| 7 | −18.23 | 0.50 | 1.80518 | 25.42 |
| 8 | 3.25 | D8 | | |
| 9 | −100.00 | 2.39 | 1.52542 | 55.78 |
| 10 | −6.38(ASP) | D10 | | |
| 11 | −11.61(ASP) | 1.0 | 1.52542 | 55.78 |
| 12 | −10.00 | 0.13 | | |
| 13 | ∞ | 0.40 | 1.54771 | 62.84 |
| 14 | ∞ | 0.20 | | |
| 15 | ∞ | 0.50 | 1.51633 | 64.14 |
| 16 | ∞ | 0.4 | | |
| 17 | ∞(IS) | | | |

ASP: Aspherical surface
IS: Image surface

TABLE 2

Aspherical Coefficient

| Surface | k | A4 | A6 | A8 | A10 |
|---|---|---|---|---|---|
| 1 | −8.7549 | 2.5934e−4 | −1.0324e−5 | 1.9658e−7 | −1.1823e−9 |
| 2 | −5.5621 | 6.5808e−4 | −1.0089e−5 | −1.4087e−7 | 8.9371e−9 |
| 3 | −0.9814 | 5.0935e−4 | −2.0108e−5 | 0 | 0 |
| 4 | 26.8018 | 1.7431e−3 | −3.1339e−5 | 0 | 0 |
| 10 | −2.0433 | −3.7794e−4 | −2.5613e−7 | 2.3576e−7 | −2.2294e−9 |
| 11 | −0.9892 | −2.1476e−3 | 6.9184e−5 | −1.2423e−7 | 0 |

TABLE 3

Zoom Data (∞)

|  | WE | ST | TE |
|---|---|---|---|
| f | 6.5 | 10.8 | 18.7 |
| FNO | 3.2 | 4.2 | 6.0 |
| 2ω | 60.24 | 35.61 | 21.08 |
| D2 | 13.03 | 6.81 | 2.33 |
| D8 | 2.78 | 6.92 | 13.33 |
| D10 | 2.58 | 2.28 | 2.55 |

EXAMPLE 2

TABLE 4

| Surface | R | D | Nd | Vd |
|---|---|---|---|---|
| 1 | −10.52(ASP) | 0.90 | 1.49700 | 81.54 |
| 2 | 65.93(ASP) | D2 | | |
| 3 | 5.67(ASP) | 1.24 | 1.80610 | 40.92 |
| 4 | −64.38 | 0.10 | | |
| 5 | ∞ (STOP) | 0.16 | | |
| 6 | 7.27 | 1.60 | 1.80610 | 40.92 |
| 7 | −11.61 | 0.01 | 1.56384 | 60.67 |
| 8 | −11.61 | 0.60 | 1.80518 | 25.42 |
| 9 | 3.13 | D9 | | |
| 10 | −26.48 | 1.96 | 1.52542 | 55.78 |
| 11 | −7.95(ASP) | D11 | | |
| 12 | 12.66(ASP) | 0.80 | 1.52542 | 55.78 |
| 13 | 87.29 | 0.50 | | |
| 14 | ∞ | 0.40 | 1.54771 | 62.84 |
| 15 | ∞ | 0.50 | | |
| 16 | ∞ | 0.50 | 1.51633 | 64.14 |
| 17 | ∞ | 0.49 | | |
| 18 | ∞(IS) | | | |

ASP: Aspherical surface
IS: Image surface

TABLE 5

Aspherical Coefficient

| Surface | k | A4 | A6 | A8 | A10 |
|---|---|---|---|---|---|
| 1 | −2.0411 | 6.7069e−4 | −7.8503e−6 | −1.8300e−7 | 3.4301e−9 |
| 2 | −3.2798 | 5.0207e−4 | 1.5198e−5 | −1.1126e−6 | 1.4226e−8 |
| 3 | −1.8486 | 4.0743e−4 | 6.9464e−5 | −1.3137e−5 | 0.0000 |
| 11 | −1.1386 | −3.2091e−4 | −1.9734e−5 | 5.8425e−7 | 0.0000 |
| 12 | −52.2476 | 1.1369e−3 | −1.1048e−4 | 2.6042e−6 | 0.0000 |

TABLE 6

Zoom Data (∞)

|  | WE | ST | TE |
|---|---|---|---|
| f | 6.5 | 10.8 | 18.7 |
| FNO | 3.3 | 4.3 | 6.0 |
| 2ω | 63.62 | 37.50 | 22.25 |
| D2 | 13.21 | 6.20 | 1.21 |
| D9 | 2.35 | 6.06 | 11.49 |
| D11 | 2.29 | 1.79 | 2.14 |

EXAMPLE 3

TABLE 7

| Surface | R | D | Nd | Vd |
|---|---|---|---|---|
| 1 | −10.44(ASP) | 0.92 | 1.49700 | 81.54 |
| 2 | 65.67(ASP) | D2 | | |
| 3 | 5.64(ASP) | 1.24 | 1.80610 | 40.92 |
| 4 | −63.90 | 0.10 | | |
| 5 | ∞ (STOP) | 0.16 | | |
| 6 | 7.22 | 1.59 | 1.80440 | 39.59 |
| 7 | −11.06 | 0.01 | 1.56384 | 60.67 |
| 8 | −11.06 | 0.60 | 1.80518 | 25.42 |
| 9 | 3.13 | D9 | | |
| 10 | −21.26 | 1.95 | 1.52542 | 55.78 |
| 11 | −7.04(ASP) | D11 | | |
| 12 | 18.90(ASP) | 0.81 | 1.52542 | 55.78 |
| 13 | 71.91(ASP) | 0.51 | | |
| 14 | ∞ | 0.40 | 1.54771 | 62.84 |
| 15 | ∞ | 0.50 | | |
| 16 | ∞ | 0.50 | 1.51633 | 64.14 |
| 17 | ∞ | 0.54 | | |
| 18 | ∞(IS) | | | |

ASP: Aspherical surface
IS: Image surface

TABLE 8

Aspherical Coefficient

| Surface | k | A4 | A6 | A8 | A10 |
|---|---|---|---|---|---|
| 1 | −2.6012 | 7.8726e−4 | −5.6369e−6 | −2.4476e−7 | 3.2708e−9 |
| 2 | −2.4886 | 6.9673e−4 | 2.0024e−5 | −1.0587e−6 | 7.8232e−9 |
| 3 | −1.7671 | 3.6415e−4 | 4.0846e−5 | −3.9529e−6 | 0.0000 |
| 11 | −3.9944 | −2.6447e−4 | −6.5077e−5 | 1.3413e−6 | 0.0000 |
| 12 | −275.4350 | 1.3787e−3 | −1.1378e−4 | 2.8956e−7 | 0.0000 |
| 13 | 0.0000 | −8.3229e−4 | −1.4075e−8 | 0.0000 | 0.0000 |

TABLE 9

Zoom Data (∞)

|  | WE | ST | TE |
|---|---|---|---|
| f | 6.5 | 10.9 | 18.6 |
| FNO | 3.3 | 4.3 | 6.0 |
| 2ω | 63.33 | 37.33 | 22.40 |
| D2 | 13.49 | 6.24 | 1.50 |
| D9 | 2.42 | 6.03 | 11.55 |
| D11 | 2.10 | 1.62 | 1.31 |

EXAMPLE 4

TABLE 10

| Surface | R | D | Nd | Vd |
|---|---|---|---|---|
| 1 | −10.49(ASP) | 0.90 | 1.49700 | 81.54 |
| 2 | 65.24(ASP) | D2 | | |
| 3 | 5.67(ASP) | 1.23 | 1.80610 | 40.92 |
| 4 | −64.32 | 0.10 | | |
| 5 | ∞ (STOP) | 0.15 | | |
| 6 | 7.25 | 1.65 | 1.80440 | 39.59 |
| 7 | −10.47 | 0.01 | 1.56384 | 60.67 |
| 8 | −10.47 | 0.60 | 1.80518 | 25.42 |
| 9 | 3.13 | D9 | | |
| 10 | −19.58 | 1.94 | 1.52542 | 55.78 |
| 11 | −5.63(ASP) | D11 | | |
| 12 | 50.00(ASP) | 0.90 | 1.52542 | 55.78 |
| 13 | 100.00(ASP) | 0.25 | | |
| 14 | ∞ | 0.40 | 1.54771 | 62.84 |
| 15 | ∞ | 0.23 | | |
| 16 | ∞ | 0.50 | 1.51633 | 64.14 |
| 17 | ∞ | 0.15 | | |
| 18 | ∞(IS) | | | |

ASP: Aspherical surface
IS: Image surface

TABLE 11

Aspherical Coefficient

| Surface | k | A4 | A6 | A8 | A10 |
|---|---|---|---|---|---|
| 1 | −3.3192 | 8.7761e−4 | −9.8061e−6 | −2.3171e−7 | 3.7785e−9 |
| 2 | −3.6455 | 8.0979e−4 | 1.8372e−5 | −1.2379e−6 | 1.0317e−8 |
| 3 | −1.8265 | 4.0328e−4 | 6.7966e−5 | −1.2220e−5 | 0.0000 |
| 11 | −3.7461 | −3.6121e−4 | −5.5086e−5 | 1.1366e−6 | 1.1521e−8 |
| 12 | −17.8241 | 3.0854e−3 | −2.0462e−4 | 5.6111e−7 | 0.0000 |
| 13 | 0 | 1.3146e−8 | 1.0851e−7 | 0.0000 | 0.0000 |

TABLE 12

Zoom Data (∞)

| | WE | ST | TE |
|---|---|---|---|
| f | 6.3 | 10.7 | 18.6 |
| FNO | 3.3 | 4.4 | 6.0 |
| 2ω | 63.55 | 36.96 | 21.85 |
| D2 | 13.36 | 6.08 | 1.18 |
| D9 | 2.17 | 5.98 | 11.46 |
| D11 | 2.85 | 2.30 | 2.76 |

EXAMPLE 5

TABLE 13

| Surface | R | D | Nd | Vd |
|---|---|---|---|---|
| 1 | −16.49(ASP) | 0.90 | 1.49700 | 81.54 |
| 2 | 17.47(ASP) | D2 | | |
| 3 | 5.89(ASP) | 1.31 | 1.80610 | 40.92 |
| 4 | −48.57 | 0.10 | | |
| 5 | ∞ (STOP) | 0.38 | | |
| 6 | 7.66 | 1.47 | 1.80610 | 40.92 |
| 7 | −12.35 | 0.01 | 1.56384 | 60.67 |
| 8 | −12.35 | 0.60 | 1.80518 | 25.42 |
| 9 | 3.30 | D9 | | |
| 10 | 40.76 | 2.22 | 1.52542 | 55.78 |
| 11 | −10.80(ASP) | D11 | | |
| 12 | −34.89 | 0.90 | 1.52542 | 55.78 |
| 13 | −11.57(ASP) | 0.25 | | |
| 14 | ∞ | 0.40 | 1.54771 | 62.84 |
| 15 | ∞ | 0.23 | | |
| 16 | ∞ | 0.50 | 1.51633 | 64.14 |
| 17 | ∞ | 0.36 | | |
| 18 | ∞(IS) | | | |

ASP: Aspherical surface
IS: Image surface

TABLE 14

Aspherical Coefficient

| Surface | k | A4 | A6 | A8 | A10 |
|---|---|---|---|---|---|
| 1 | 6.2713 | 4.6281e−4 | 7.9660e−6 | −5.0117e−7 | 1.1488e−8 |
| 2 | −14.3023 | 4.3131e−4 | 2.0709e−5 | −1.5374e−6 | 2.6027e−8 |
| 3 | −2.2930 | 8.4979e−4 | −6.2420e−5 | 6.2228e−6 | 0.0000 |
| 11 | −13.6395 | −7.9925e−4 | −2.1441e−5 | 1.4054e−6 | −2.0937e−8 |
| 13 | 2.6268 | 1.1029e−3 | 8.6287e−5 | −2.4783e−6 | 0.0000 |

TABLE 15

Zoom Data (∞)

| | WE | ST | TE |
|---|---|---|---|
| f | 6.6 | 10.9 | 18.6 |
| FNO | 3.3 | 4.3 | 6.0 |
| 2ω | 63.11 | 37.08 | 22.36 |
| D2 | 13.06 | 6.49 | 2.09 |

EXAMPLE 6

TABLE 15-continued

Zoom Data (∞)

|     | WE   | ST   | TE    |
|-----|------|------|-------|
| D9  | 2.77 | 6.60 | 12.69 |
| D11 | 2.49 | 2.36 | 2.67  |

TABLE 16

| Surface | R           | D    | Nd      | Vd    |
|---------|-------------|------|---------|-------|
| 1       | −10.66(ASP) | 0.90 | 1.49700 | 81.54 |
| 2       | 38.12(ASP)  | D2   |         |       |
| 3       | 5.12(ASP)   | 1.38 | 1.80610 | 40.92 |
| 4       | −30.30(ASP) | 0.10 |         |       |
| 5       | ∞ (STOP)    | 0.31 |         |       |
| 6       | 9.69        | 1.31 | 1.80610 | 40.92 |
| 7       | −11.15      | 0.01 | 1.56384 | 60.67 |
| 8       | −11.15      | 0.60 | 1.80518 | 25.42 |
| 9       | 3.09        | D9   |         |       |
| 10      | 220.69(ASP) | 2.26 | 1.52542 | 55.78 |
| 11      | −8.44(ASP)  | D11  |         |       |
| 12      | −264.24     | 0.90 | 1.52542 | 55.78 |
| 13      | −20.73(ASP) | 0.13 |         |       |
| 14      | ∞           | 0.40 | 1.54771 | 62.84 |
| 15      | ∞           | 0.20 |         |       |
| 16      | ∞           | 0.50 | 1.51633 | 64.14 |
| 17      | ∞           | 0.36 |         |       |
| 18      | ∞(IS)       |      |         |       |

ASP: Aspherical surface
IS: Image surface

TABLE 17

Aspherical Coefficient

| Surface | k         | A4         | A6         | A8         | A10       |
|---------|-----------|------------|------------|------------|-----------|
| 1       | 2.0954    | 9.9284e−4  | 1.4292e−5  | −9.7552e−7 | 2.0293e−8 |
| 2       | −100.2558 | 6.8011e−4  | 2.7395e−5  | −1.7990e−6 | 2.1020e−8 |
| 3       | −3.8250   | 2.8008e−3  | −1.3642e−4 | 1.8252e−6  | 0.0000    |
| 4       | −324.9321 | −1.1098e−3 | 2.5674e−4  | −3.4578e−5 | 0.0000    |
| 10      | 178.1632  | 5.1733e−4  | 0.0000     | 0.0000     | 0.0000    |
| 11      | −4.8466   | 1.1801e−4  | −3.9709e−5 | 1.7420e−6  | −2.2736e−8|
| 13      | −14.3108  | −6.3158e−4 | 1.5915e−4  | −3.9176e−6 | 0.0000    |

TABLE 18

Zoom Data (∞)

|     | WE    | ST    | TE    |
|-----|-------|-------|-------|
| f   | 6.5   | 10.7  | 18.6  |
| FNO | 3.3   | 4.3   | 6.0   |
| 2ω  | 63.39 | 38.14 | 22.65 |
| D2  | 13.07 | 6.93  | 1.90  |
| D9  | 2.82  | 6.77  | 12.24 |
| D11 | 2.41  | 1.93  | 2.95  |

EXAMPLE 7

TABLE 19

| Surface | R           | D    | Nd      | Vd    |
|---------|-------------|------|---------|-------|
| 1       | −14.12(ASP) | 0.90 | 1.49700 | 81.54 |
| 2       | 21.36(ASP)  | D2   |         |       |
| 3       | 5.06(ASP)   | 1.34 | 1.80610 | 40.92 |
| 4       | −28.73      | 0.10 |         |       |
| 5       | ∞ (STOP)    | 0.21 |         |       |
| 6       | 9.71        | 1.33 | 1.80440 | 39.59 |
| 7       | −9.90       | 0.01 | 1.56384 | 60.67 |
| 8       | −9.90       | 0.60 | 1.80518 | 25.42 |
| 9       | 3.06        | D9   |         |       |
| 10      | −61.52      | 2.35 | 1.52542 | 55.78 |
| 11      | −6.61(ASP)  | D11  |         |       |
| 12      | −11.51(ASP) | 1.00 | 1.52542 | 55.78 |
| 13      | −8.59       | 0.13 |         |       |
| 14      | ∞           | 0.40 | 1.54771 | 62.84 |
| 15      | ∞           | 0.20 |         |       |
| 16      | ∞           | 0.50 | 1.51633 | 64.14 |
| 17      | ∞           | 0.42 |         |       |
| 18      | ∞(IS)       |      |         |       |

ASP: Aspherical surface
IS: Image surface

TABLE 20

Aspherical Coefficient

| Surface | k       | A4         | A6         | A8         | A10        |
|---------|---------|------------|------------|------------|------------|
| 1       | 0.7516  | 1.2358e−5  | 1.6437e−5  | −2.3080e−7 | −6.5270e−10|
| 2       | 4.2647  | −2.3091e−4 | 9.5848e−6  | 7.5350e−7  | −2.5412e−8 |
| 3       | −1.8544 | 7.5794e−4  | −3.3738e−5 | 0.0000     | 0.0000     |
| 11      | −0.9391 | −8.6045e−5 | 1.9294e−6  | −1.2024e−6 | 4.1048e−8  |
| 12      | 0       | −1.9309e−3 | 3.2847e−5  | 0.0000     | 0.0000     |

TABLE 21

Zoom Data (∞)

|     | WE    | ST    | TE    |
|-----|-------|-------|-------|
| f   | 6.5   | 10.7  | 18.6  |
| FNO | 3.3   | 4.3   | 6.0   |
| 2ω  | 64.07 | 38.20 | 22.64 |
| D2  | 13.21 | 7.02  | 1.98  |
| D9  | 2.66  | 6.58  | 12.06 |
| D11 | 2.38  | 1.85  | 2.44  |

EXAMPLE 8

TABLE 22

| Surface | R            | D    | Nd      | Vd    |
|---------|--------------|------|---------|-------|
| 1       | −12.342(ASP) | 0.90 | 1.49585 | 81.29 |
| 2       | 24.778(ASP)  | D2   |         |       |
| 3       | 4.605(ASP)   | 1.53 | 1.80610 | 40.92 |
| 4       | −19.256(ASP) | 0.10 |         |       |
| 5       | ∞ (STOP)     | 0.20 |         |       |
| 6       | 18.633       | 1.08 | 1.78800 | 47.37 |
| 7       | −18.633      | 0.01 | 1.56384 | 60.67 |
| 8       | −18.633      | 0.50 | 1.80518 | 25.42 |
| 9       | 3.297        | D9   |         |       |
| 10      | −70.515      | 2.34 | 1.52542 | 55.78 |
| 11      | −6.314(ASP)  | D11  |         |       |
| 12      | −11.608(ASP) | 1.00 | 1.52542 | 55.78 |
| 13      | −10.178      | 0.13 |         |       |
| 14      | ∞            | 0.40 | 1.54771 | 62.84 |
| 15      | ∞            | 0.20 |         |       |
| 16      | ∞            | 0.50 | 1.51633 | 64.14 |
| 17      | ∞            | 0.37 |         |       |
| 18      | ∞(IS)        |      |         |       |

ASP: Aspherical surface
IS: Image surface

TABLE 23

Aspherical Coefficient

| Surface | k       | A4           | A6           | A8          | A10          |
|---------|---------|--------------|--------------|-------------|--------------|
| 1       | −14.452 | −7.36680e−05 | −5.39210e−06 | 2.67986e−07 | −3.93094e−09 |
| 2       | 1.669   | 6.12523e−04  | −3.17858e−05 | 1.00832e−06 | −1.31321e−08 |
| 3       | 0.050   | −7.13822e−04 | 1.59206e−05  | 0.0000      | 0.0000       |
| 4       | 39.707  | 1.97205e−03  | 8.50652e−05  | 0.0000      | 0.0000       |
| 11      | −2.436  | −4.92654e−04 | −1.21534e−06 | 5.08409e−07 | −9.44459e−09 |
| 12      | −2.062  | −2.07213e−03 | 6.44774e−05  | 1.64310e−07 | 0.0000       |

TABLE 24

Zoom Data

|     | WE    | ST    | TE    |
|-----|-------|-------|-------|
| f   | 6.51  | 10.85 | 18.59 |
| FNO | 3.18  | 4.26  | 6.00  |
| 2ω  | 60.57 | 35.62 | 21.18 |
| D2  | 12.97 | 6.84  | 2.43  |
| D9  | 2.79  | 7.00  | 13.35 |
| D11 | 2.66  | 2.32  | 2.55  |

EXAMPLE 9

TABLE 25

| Surface | R            | D    | Nd      | Vd    |
|---------|--------------|------|---------|-------|
| 1       | −12.342(ASP) | 0.90 | 1.49585 | 81.29 |
| 2       | 24.778(ASP)  | D2   |         |       |
| 3       | ∞ (STOP)     | 0.00 |         |       |
| 4       | 4.605(ASP)   | 1.53 | 1.80610 | 40.92 |
| 5       | −19.256(ASP) | 0.30 |         |       |
| 6       | 18.633       | 1.08 | 1.78800 | 47.37 |
| 7       | −18.633      | 0.01 | 1.56384 | 60.67 |
| 8       | −18.633      | 0.50 | 1.80518 | 25.42 |
| 9       | 3.297        | D9   |         |       |
| 10      | −70.515      | 2.34 | 1.52542 | 55.78 |
| 11      | −6.314(ASP)  | D11  |         |       |
| 12      | −11.608(ASP) | 1.00 | 1.52542 | 55.78 |
| 13      | −10.178      | 0.13 |         |       |
| 14      | ∞            | 0.40 | 1.54771 | 62.84 |
| 15      | ∞            | 0.20 |         |       |
| 16      | ∞            | 0.50 | 1.51633 | 64.14 |
| 17      | ∞            | 0.37 |         |       |
| 18      | ∞(IS)        |      |         |       |

ASP: Aspherical surface
IS: Image surface

TABLE 26

Aspherical Coefficient

| Surface | k | A4 | A6 | A8 | A10 |
|---|---|---|---|---|---|
| 1 | −14.452 | −7.36680e−05 | −5.39210e−06 | 2.67986e−07 | −3.93094e−09 |
| 2 | 1.669 | 6.12523e−04 | −3.17858e−05 | 1.00832e−06 | −1.31321e−08 |
| 4 | 0.050 | −7.13822e−04 | 1.59206e−05 | 0.0000 | 0.0000 |
| 5 | 39.707 | 1.97205e−03 | 8.50652e−05 | 0.0000 | 0.0000 |
| 11 | −2.436 | −4.92654e−04 | −1.21534e−06 | 5.08409e−07 | −9.44459e−09 |
| 12 | −2.062 | −2.07213e−03 | 6.44774e−05 | 1.64310e−07 | 0.0000 |

TABLE 27

Zoom Data

|  | WE | ST | TE |
|---|---|---|---|
| f | 6.51 | 10.85 | 18.59 |
| FNO | 3.25 | 4.30 | 6.00 |
| 2ω | 60.57 | 35.62 | 21.18 |
| D2 | 12.97 | 6.84 | 2.43 |
| D9 | 2.80 | 7.00 | 13.35 |
| D11 | 2.66 | 2.32 | 2.55 |

EXAMPLE 10

TABLE 28

| Surface | R | D | Nd | Vd |
|---|---|---|---|---|
| 1 | −12.342(ASP) | 0.90 | 1.49585 | 81.29 |
| 2 | 24.778(ASP) | D2 | | |
| 3 | 4.605(ASP) | 1.53 | 1.80610 | 40.92 |
| 4 | −19.256(ASP) | 0.30 | | |
| 5 | 18.633 | 1.08 | 1.78800 | 47.37 |
| 6 | −18.633 | 0.01 | 1.56384 | 60.67 |
| 7 | −18.633 | 0.50 | 1.80518 | 25.42 |
| 8 | 3.297 | 0.50 | | |
| 9 | ∞ (STOP) | D9 | | |
| 10 | −70.515 | 2.34 | 1.52542 | 55.78 |
| 11 | −6.314(ASP) | D11 | | |
| 12 | −11.608(ASP) | 1.00 | 1.52542 | 55.78 |
| 13 | −10.178 | 0.13 | | |
| 14 | ∞ | 0.40 | 1.54771 | 62.84 |
| 15 | ∞ | 0.20 | | |
| 16 | ∞ | 0.50 | 1.51633 | 64.14 |
| 17 | ∞ | 0.37 | | |
| 18 | ∞(IS) | | | |

ASP: Aspherical surface
IS: Image surface

TABLE 29

Aspherical Coefficient

| Surface | k | A4 | A6 | A8 | A10 |
|---|---|---|---|---|---|
| 1 | −14.452 | −7.36680e−05 | −5.39210e−06 | 2.67986e−07 | −3.93094e−09 |
| 2 | 1.669 | 6.12523e−04 | −3.17858e−05 | 1.00832e−06 | −1.31321e−08 |
| 3 | 0.050 | −7.13822e−04 | 1.59206e−05 | 0.0000 | 0.0000 |
| 4 | 39.707 | 1.97205e−03 | 8.50652e−05 | 0.0000 | 0.0000 |
| 11 | −2.436 | −4.92654e−04 | −1.21534e−06 | 5.08409e−07 | −9.44459e−09 |
| 12 | −2.062 | −2.07213e−03 | 6.44774e−05 | 1.64310e−07 | 0.0000 |

TABLE 30

Zoom Data

|  | WE | ST | TE |
|---|---|---|---|
| f | 6.51 | 10.85 | 18.59 |
| FNO | 3.03 | 4.15 | 6.00 |
| 2ω | 60.50 | 35.59 | 21.17 |
| D2 | 12.97 | 6.84 | 2.43 |
| D9 | 2.30 | 6.50 | 12.85 |
| D11 | 2.66 | 2.32 | 2.55 |

EXAMPLE 11

TABLE 31

| Surface | R | D | Nd | Vd |
|---|---|---|---|---|
| 1 | −12.632 (ASP) | 0.90 | 1.49585 | 81.29 |
| 2 | 48.824 (ASP) | D2 | | |
| 3 | 5.846 (ASP) | 1.46 | 1.80610 | 40.92 |
| 4 | −47.738 (ASP) | 0.05 | | |
| 5 | 6.390 | 1.03 | 1.51633 | 64.14 |
| 6 | 105.180 | 0.05 | | |
| 7 | ∞ (STOP) | 0.10 | | |
| 8 | 89.402 | 0.81 | 1.78800 | 47.37 |
| 9 | 266.679 | 0.01 | 1.56384 | 60.67 |
| 10 | 266.679 | 0.50 | 1.80518 | 25.42 |
| 11 | 3.211 | D11 | | |
| 12 | 431.826 | 2.82 | 1.52542 | 55.78 |
| 13 | −6.529 (ASP) | D13 | | |
| 14 | 29.544 (ASP) | 1.00 | 1.52542 | 55.78 |
| 15 | −2115.094 | 0.18 | | |
| 16 | ∞ | 0.40 | 1.54771 | 62.84 |
| 17 | ∞ | 0.20 | | |
| 18 | ∞ | 0.50 | 1.51633 | 64.14 |
| 19 | ∞ | 0.37 | | |
| 20 | ∞ (IS) | | | |

ASP: Aspherical surface
IS: Image surface

TABLE 32

Aspherical Coefficient

| Surface | k | A4 | A6 | A8 | A10 |
|---|---|---|---|---|---|
| 1 | −4.601 | 1.44022e−04 | −1.15649e−05 | 2.38162e−07 | −1.48559e−09 |
| 2 | 64.783 | 1.37819e−04 | −1.45767e−05 | 2.73389e−07 | −2.67809e−09 |
| 3 | −0.814 | −1.62814e−05 | −2.80654e−05 | 0.0000 | 0.0000 |
| 4 | 27.287 | 1.43091e−04 | −3.59649e−05 | 0.0000 | 0.0000 |
| 13 | −3.476 | −7.88267e−04 | 2.36626e−05 | −5.40533e−07 | 9.37644e−09 |
| 14 | −708.771 | −1.09477e−05 | −4.94946e−05 | 2.45570e−06 | 0.0000 |

TABLE 33

Zoom Data

| | WE | ST | TE |
|---|---|---|---|
| f | 6.50 | 12.85 | 24.92 |
| FNO | 2.88 | 4.36 | 6.90 |
| 2ω | 60.73 | 29.88 | 16.09 |
| D2 | 15.16 | 6.28 | 1.11 |
| D11 | 2.26 | 8.50 | 17.96 |
| D13 | 2.41 | 1.71 | 1.36 |

EXAMPLE 12

TABLE 34

| Surface | R | D | Nd | Vd |
|---|---|---|---|---|
| 1 | −9.944 (ASP) | 0.90 | 1.49700 | 81.54 |
| 2 | 7401.919 (ASP) | D2 | | |
| 3 | 6.282 (ASP) | 1.22 | 1.80610 | 40.92 |
| 4 | −857.948 (ASP) | 0.10 | | |
| 5 | 6.206 | 1.15 | 1.51633 | 64.14 |
| 6 | −5697.765 | 0.10 | | |
| 7 | ∞ (STOP) | 0.10 | | |
| 8 | 31.899 | 1.06 | 1.80518 | 25.42 |
| 9 | 3.499 | D9 | | |
| 10 | −438.020 | 2.74 | 1.52542 | 55.78 |
| 11 | −5.870 (ASP) | D11 | | |
| 12 | −12.016 (ASP) | 1.00 | 1.52542 | 55.78 |
| 13 | −76.944 (ASP) | 0.10 | | |
| 14 | ∞ | 0.40 | 1.54771 | 62.84 |
| 15 | ∞ | 0.20 | | |
| 16 | ∞ | 0.50 | 1.51633 | 64.14 |
| 17 | ∞ | 0.37 | | |
| 18 | ∞ (IS) | | | |

ASP: Aspherical surface
IS: Image surface

TABLE 35

Aspherical Coefficient

| Surface | k | A4 | A6 | A8 | A10 |
|---|---|---|---|---|---|
| 1 | −5.361 | 2.91000e−04 | −3.55384e−06 | −1.46834e−08 | 4.48856e−10 |
| 2 | −54123780.008 | 5.95382e−04 | −5.04980e−06 | −3.48145e−08 | 7.20173e−10 |
| 3 | −0.538 | 5.56671e−05 | −9.97132e−06 | 9.92000e−07 | 0.0000 |
| 4 | −1793111.847 | 2.95826e−04 | 1.93546e−06 | −7.03818e−08 | 0.0000 |
| 11 | −3.691 | −8.73664e−04 | 1.38603e−05 | −2.07023e−07 | 2.82176e−09 |
| 12 | 3.531 | −3.47723e−03 | 1.13536e−04 | 1.61584e−06 | −2.03470e−08 |
| 13 | 193.221 | −3.84220e−03 | 3.42955e−05 | 6.55069e−06 | −7.12518e−08 |

TABLE 36

Zoom Data

| | WE | ST | TE |
|---|---|---|---|
| f | 6.56 | 12.67 | 25.86 |
| FNO | 2.86 | 4.33 | 6.90 |
| 2ω | 60.02 | 30.45 | 15.26 |
| D2 | 16.51 | 7.34 | 1.23 |
| D9 | 2.49 | 8.69 | 18.98 |
| D11 | 2.86 | 2.19 | 1.90 |

EXAMPLE 13

TABLE 37

| Surface | R | D | Nd | Vd |
|---|---|---|---|---|
| 1 | −9.550 ASP | 0.90 | 1.49700 | 81.54 |
| 2 | 7436.537 (ASP) | D2 | | |
| 3 | 6.077 (ASP) | 1.52 | 1.80610 | 40.92 |
| 4 | −150.366 (ASP) | 0.10 | | |
| 5 | 6.526 | 1.36 | 1.48749 | 70.23 |
| 6 | 37.335 | 0.10 | | |
| 7 | ∞ (STOP) | 0.10 | | |
| 8 | 24.486 | 1.12 | 1.84666 | 23.78 |
| 9 | 3.563 | D9 | | |
| 10 | −23.541 | 2.36 | 1.52542 | 55.78 |
| 11 | −5.492 (ASP) | D11 | | |
| 12 | −7.930 (ASP) | 1.00 | 1.52542 | 55.78 |
| 13 | −12.641 (ASP) | 0.13 | | |
| 14 | ∞ | 0.40 | 1.54771 | 62.84 |
| 15 | ∞ | 0.20 | | |
| 16 | ∞ | 0.50 | 1.51633 | 64.14 |
| 17 | ∞ | 0.37 | | |
| 18 | ∞ (IS) | | | |

ASP: Aspherical surface
IS: Image surface

TABLE 38

Aspherical Coefficient

| Surface | k | A4 | A6 | A8 | A10 |
|---|---|---|---|---|---|
| 1 | −4.252 | 4.46874e−04 | −3.21208e−06 | −1.25897e−08 | 1.39474e−10 |
| 2 | −473170157.333 | 7.68713e−04 | −4.88083e−06 | 1.15119e−07 | −2.11027e−09 |
| 3 | −0.321 | 1.92387e−04 | −1.64944e−05 | 8.18573e−06 | 0.0000 |
| 4 | −17580.141 | 2.40113e−04 | 5.33829e−05 | 5.75258e−06 | 0.0000 |
| 11 | −3.213 | −8.34348e−04 | 1.29221e−05 | −5.00650e−07 | 8.93581e−09 |
| 12 | −22.737 | −2.69634e−03 | 9.89730e−05 | 8.97548e−07 | −3.19078e−07 |
| 13 | −160.409 | −1.91887e−03 | 6.30689e−05 | 3.18460e−06 | −3.24049e−07 |

TABLE 39

Zoom Data

| | WE | ST | TE |
|---|---|---|---|
| f | 6.58 | 13.77 | 31.16 |
| FNO | 2.92 | 4.60 | 8.00 |
| 2ω | 59.56 | 28.28 | 12.73 |
| D2 | 18.81 | 7.94 | 1.22 |
| D9 | 2.44 | 8.75 | 21.19 |
| D11 | 2.88 | 2.13 | 2.33 |

EXAMPLE 14

TABLE 40

| Surface | R | D | Nd | Vd |
|---|---|---|---|---|
| 1 | −11.066 (ASP) | 0.90 | 1.49585 | 81.29 |
| 2 | 47.944 (ASP) | D2 | | |
| 3 | 4.456 (ASP) | 0.75 | 1.80610 | 40.92 |
| 4 | 4.735 | 0.01 | 1.56384 | 60.67 |
| 5 | 4.735 | 1.33 | 1.78800 | 47.37 |
| 6 | −25.240 (ASP) | 0.10 | | |
| 7 | ∞ (STOP) | 0.20 | | |
| 8 | 18.892 | 0.93 | 1.78800 | 47.37 |
| 9 | 34.093 | 0.01 | 1.56384 | 60.67 |
| 10 | 34.093 | 0.50 | 1.80518 | 25.42 |
| 11 | 3.340 | D11 | | |
| 12 | −32.885 | 2.45 | 1.52542 | 55.78 |
| 13 | −6.702 (ASP) | D13 | | |
| 14 | −61.572 (ASP) | 1.00 | 1.52542 | 55.78 |
| 15 | −11.075 | 0.13 | | |
| 16 | ∞ | 0.40 | 1.54771 | 62.84 |
| 17 | ∞ | 0.20 | | |
| 18 | ∞ | 0.50 | 1.51633 | 64.14 |
| 19 | ∞ | 0.37 | | |
| 20 | ∞ (IS) | | | |

ASP: Aspherical surface
IS: Image surface

TABLE 41

Aspherical Coefficient

| Surface | k | A4 | A6 | A8 | A10 |
|---|---|---|---|---|---|
| 1 | −7.418 | −2.17928E−05 | −2.42677E−05 | 3.80713E−07 | 3.98078e−10 |
| 2 | 11.889 | 3.69338E−04 | −4.19483E−05 | 5.64048E−07 | 3.51294E−09 |
| 3 | 0.337 | −9.33621E−04 | 3.63258E−05 | 0.0000 | 0.0000 |
| 6 | 6.161 | 2.00672E−03 | 1.31617E−04 | 0.0000 | 0.0000 |
| 13 | −0.776 | −8.44178E−04 | 3.51523E−05 | 6.30475E−07 | −2.93577E−08 |
| 14 | 195.474 | −6.69998E−03 | 3.95455E−04 | −6.06401E−06 | 0.0000 |

TABLE 42

Zoom Data

| | WE | ST | TE |
|---|---|---|---|
| f | 6.48 | 12.41 | 24.77 |
| FNO | 3.03 | 4.32 | 6.99 |
| 2ω | 62.53 | 31.16 | 16.58 |
| D2 | 14.54 | 5.72 | 0.85 |
| D11 | 2.65 | 7.54 | 17.12 |
| D13 | 2.68 | 2.48 | 1.97 |

EXAMPLE 15

TABLE 43

| Surface | R | D | Nd | Vd |
|---|---|---|---|---|
| 1 | −11.535 (ASP) | 0.92 | 1.52542 | 55.78 |
| 2 | 44.496 (ASP) | D2 | | |
| 3 | 5.974 (ASP) | 1.43 | 1.80610 | 40.92 |
| 4 | −9.711 | 0.01 | 1.56384 | 60.67 |
| 5 | −9.711 | 0.95 | 1.51633 | 64.14 |
| 6 | −21.069 | 0.10 | | |
| 7 | ∞ (STOP) | 0.20 | | |
| 8 | 14.326 | 1.13 | 1.78800 | 47.37 |
| 9 | −14.326 | 0.01 | 1.56384 | 60.67 |
| 10 | −14.326 | 0.50 | 1.80518 | 25.42 |
| 11 | 3.669 | D11 | | |
| 12 | 61.202 | 2.31 | 1.52542 | 55.78 |
| 13 | −8.645 (ASP) | D13 | | |
| 14 | −41.658 (ASP) | 1.00 | 1.52542 | 55.78 |
| 15 | −14.560 | 0.13 | | |
| 16 | ∞ | 0.40 | 1.54771 | 62.84 |
| 17 | ∞ | 0.20 | | |
| 18 | ∞ | 0.50 | 1.51633 | 64.14 |
| 19 | ∞ | 0.37 | | |
| 20 | ∞ (IS) | | | |

ASP: Aspherical surface
IS: Image surface

TABLE 44

| | | Aspherical Coefficient | | | |
|---|---|---|---|---|---|
| Surface | k | A4 | A6 | A8 | A10 |
| 1 | −4.739 | −2.42892e−05 | 5.93100e−06 | 1.06044e−07 | −7.34218e−09 |
| 2 | −286.654 | 4.03482e−04 | −9.96697e−06 | 1.21655e−06 | −3.75453e−08 |
| 3 | −0.361 | −7.83563e−04 | −3.53928e−05 | 0.0000 | 0.0000 |
| 13 | −5.933 | −8.36717e−04 | −3.42841e−05 | 2.37781e−06 | −4.11212e−08 |
| 14 | −418.964 | −2.41451e−03 | −1.13925e−05 | 2.20868e−06 | 0.0000 |

TABLE 45

| | Zoom Data | | |
|---|---|---|---|
| | WE | ST | TE |
| f | 6.50 | 10.93 | 18.54 |
| FNO | 3.17 | 4.20 | 5.90 |
| 2ω | 60.65 | 35.19 | 21.24 |
| D2 | 12.75 | 6.03 | 1.50 |
| D11 | 2.40 | 6.36 | 12.39 |
| D13 | 2.50 | 2.31 | 2.67 |

EXAMPLE 16

TABLE 46

| Surface | R | D | Nd | Vd |
|---|---|---|---|---|
| 1 | −16.722 (ASP) | 0.92 | 1.52542 | 55.78 |
| 2 | 24.383 (ASP) | D2 | | |
| 3 | 5.978 (ASP) | 1.78 | 1.80610 | 40.92 |
| 4 | −7.110 | 0.01 | 1.56384 | 60.67 |
| 5 | −7.110 | 1.17 | 1.48749 | 70.23 |
| 6 | −25.129 | 0.10 | | |
| 7 | ∞ (STOP) | 0.20 | | |
| 8 | 19.667 | 1.34 | 1.92286 | 18.90 |
| 9 | 3.966 | D9 | | |
| 10 | −72.976 | 2.46 | 1.52542 | 55.78 |
| 11 | −5.477 (ASP) | D11 | | |
| 12 | −71.478 (ASP) | 1.00 | 1.52542 | 55.78 |
| 13 | 58.292 | 0.23 | | |
| 14 | ∞ | 0.40 | 1.54771 | 62.84 |
| 15 | ∞ | 0.20 | | |
| 16 | ∞ | 0.50 | 1.51633 | 64.14 |
| 17 | ∞ | 0.37 | | |
| 18 | ∞ (IS) | | | |

ASP: Aspherical surface
IS: Image surface

TABLE 47

| | | Aspherical Coefficient | | | |
|---|---|---|---|---|---|
| Surface | k | A4 | A6 | A8 | A10 |
| 1 | −13.560 | −1.30819e−04 | −4.39392e−06 | 3.95509e−07 | −4.29437e−09 |
| 2 | −4.801 | 8.85323e−05 | −9.61643e−06 | 4.34121e−07 | 3.74699e−09 |
| 3 | −0.486 | −8.31598e−04 | −2.95169e−05 | −1.18596e−06 | 0.0000 |
| 11 | −3.079 | −7.41409e−04 | −2.81216e−05 | 1.39026e−06 | −4.31410e−08 |
| 12 | 309.973 | −4.76487e−04 | 2.74533e−05 | 8.84682e−07 | 0.0000 |

TABLE 48

| | Zoom Data | | |
|---|---|---|---|
| | WE | ST | TE |
| f | 6.53 | 11.18 | 19.53 |
| FNO | 3.08 | 4.22 | 6.00 |
| 2ω | 59.28 | 34.77 | 20.31 |
| D2 | 14.14 | 7.02 | 1.64 |
| D9 | 2.35 | 6.76 | 13.36 |
| D11 | 2.27 | 1.88 | 2.35 |

EXAMPLE 17

TABLE 49

| Surface | R | D | Nd | Vd |
|---|---|---|---|---|
| 1 | −19.181(ASP) | 0.92 | 1.52542 | 55.78 |
| 2 | 21.906(ASP) | D2 | | |
| 3 | 6.268(ASP) | 1.63 | 1.80610 | 40.92 |
| 4 | −9.628 | 0.01 | 1.56384 | 60.67 |
| 5 | −9.628 | 1.28 | 1.48749 | 70.23 |
| 6 | −36.586 | 0.10 | | |
| 7 | ∞ (STOP) | 0.20 | | |
| 8 | 15.142 | 1.59 | 1.92286 | 18.90 |
| 9 | 4.115 | D9 | | |
| 10 | −57.058 | 2.63 | 1.69350 | 53.21 |
| 11 | −7.792(ASP) | D11 | | |
| 12 | −133.522(ASP) | 1.00 | 1.52542 | 55.78 |
| 13 | 154.287 | 0.16 | | |
| 14 | ∞ | 0.40 | 1.54771 | 62.84 |
| 15 | ∞ | 0.20 | | |
| 16 | ∞ | 0.50 | 1.51633 | 64.14 |
| 17 | ∞ | 0.37 | | |
| 18 | ∞(IS) | | | |

ASP: Aspherical surface
IS: Image surface

TABLE 50

Aspherical Coefficient

| Surface | k | A4 | A6 | A8 | A10 |
|---|---|---|---|---|---|
| 1 | −12.994 | −1.62330e−04 | −5.98347e−06 | 3.89382e−07 | −3.89826e−09 |
| 2 | −1.612 | −1.80218e−05 | −1.19773e−05 | 4.95776e−07 | 2.10340e−11 |
| 3 | −0.289 | −6.38433e−04 | −2.17034e−05 | 4.50188e−07 | 0.0000 |
| 11 | −4.538 | −6.52811e−04 | 9.29476e−06 | 2.09845e−07 | −9.20293e−09 |
| 12 | 1032.803 | −1.37679e−03 | 6.16885e−05 | −4.02989e−07 | 0.0000 |

TABLE 51

Zoom Data

|  | WE | ST | TE |
|---|---|---|---|
| f | 6.52 | 12.55 | 25.07 |
| FNO | 3.04 | 4.50 | 7.09 |
| 2ω | 60.30 | 31.10 | 15.95 |
| D2 | 16.37 | 7.85 | 1.56 |
| D9 | 2.29 | 8.50 | 18.07 |
| D11 | 2.80 | 1.76 | 2.11 |

EXAMPLE 18

TABLE 52

| Surface | R | D | Nd | Vd |
|---|---|---|---|---|
| 1 | −14.957(ASP) | 0.90 | 1.49700 | 81.54 |
| 2 | 27.924(ASP) | D2 | | |
| 3 | 5.876(ASP) | 1.29 | 1.80610 | 40.92 |
| 4 | −19.955 | 0.01 | 1.56384 | 60.67 |
| 5 | −19.955 | 0.64 | 1.48749 | 70.23 |
| 6 | −34.624 | 0.10 | | |
| 7 | ∞ (STOP) | 0.20 | | |
| 8 | 12.534 | 2.14 | 1.92286 | 18.90 |
| 9 | 3.811 | D9 | | |
| 10 | −23.691 | 2.36 | 1.52542 | 55.78 |
| 11 | −5.644(ASP) | D11 | | |
| 12 | −18.529(ASP) | 1.00 | 1.52542 | 55.78 |
| 13 | −29.667 | 0.29 | | |
| 14 | ∞ | 0.40 | 1.54771 | 62.84 |
| 15 | ∞ | 0.20 | | |
| 16 | ∞ | 0.50 | 1.51633 | 64.14 |
| 17 | ∞ | 0.37 | | |
| 18 | ∞(IS) | | | |

ASP: Aspherical surface
IS: Image surface

TABLE 53

Aspherical Coefficient

| Surface | k | A4 | A6 | A8 | A10 |
|---|---|---|---|---|---|
| 1 | −7.211 | −1.11916e−04 | −2.65958e−06 | 3.43230e−07 | −6.14939e−09 |
| 2 | 9.879 | 6.85835e−05 | −2.66199e−05 | 1.55893e−06 | −2.75621e−08 |
| 3 | −0.293 | −5.00819e−04 | −2.87026e−05 | 1.61429e−06 | 0.0000 |
| 11 | −1.825 | 1.73237e−04 | −2.95462e−05 | 1.14852e−06 | −1.86965e−08 |
| 12 | 10.769 | −1.92977e−04 | 9.27715e−06 | 0.0000 | 0.0000 |

TABLE 54

Zoom Data

|  | WE | ST | TE |
|---|---|---|---|
| f | 6.59 | 14.07 | 31.61 |
| FNO | 2.94 | 4.69 | 8.00 |
| 2ω | 59.74 | 27.822 | 12.522 |
| D2 | 18.44 | 8.35 | 1.17 |
| D9 | 2.55 | 10.04 | 22.95 |
| D11 | 2.96 | 1.51 | 2.30 |

FIGS. 19A to 36C show aberration diagrams of Examples 1 to 18 when focused on an infinite object. In these drawings, FIGS. 19A, 20A, 21A, 22A, 23A, 24A, 25A, 26A, 27A, 28A, 29A, 30A, 31A, 32A, 33A, 34A, 35A and 36A show a spherical aberration (SA), an astigmatism (AS), a chromatic aberration of magnification (CC) and a distortion (DT) in the wide-angle end. FIGS. 19B, 20B, 21B, 22B, 23B, 24B, 25B, 26B, 27B, 28B, 29B, 30B, 31B, 32B, 33B, 34B, 35B and 36B show the above aberrations in the intermediate state. FIGS. 19C, 20C, 21C, 22C, 23C, 24C, 25C, 26C, 27C, 28C, 29C, 30C, 31C, 32C, 33C, 34C, 35C and 36C show the above aberrations in the telephoto end. In the drawings, "FIY" (3.78 mm, 3.99 mm) denotes a maximum image height These aberration diagrams show an aberration situation to the maximum image height that is larger than the image height Y' which is a half of the diagonal length of the effective image taking region.

The following tables 55-1 to 55-3 show values of the conditions (1) to (14) of Examples 1 to 18 described above.

TABLE 55-1

| Condition | Example | | | | | | |
|---|---|---|---|---|---|---|---|
| | 1 | 2 | 3 | 4 | 5 | 6 | 7 |
| (1) | −0.39 | −0.72 | −0.73 | −0.72 | −0.03 | −0.56 | −0.20 |
| (2) | −0.02 | −0.03 | −0.04 | −0.04 | −0.01 | −0.02 | −0.01 |
| (3) | 0.003 | 0.002 | 0.003 | 0.004 | 0.003 | 0.004 | 0.001 |
| (4) | −1.72 | −1.92 | −1.93 | −1.94 | −1.76 | −1.78 | −1.81 |
| (5) | 2.87 | 2.87 | 2.86 | 2.95 | 2.83 | 2.86 | 2.86 |
| (6) | 1.48 | 1.45 | 1.44 | 1.48 | 1.46 | 1.44 | 1.44 |
| (7) | 4.69 | 5.61 | 5.57 | 6.16 | 4.72 | 4.64 | 4.97 |
| (8) | 1.14 | 1.86 | 1.99 | 1.81 | 0.58 | 0.93 | 1.24 |
| (9) | 1.19 | 1.13 | 1.13 | 1.19 | 1.20 | 1.19 | 1.21 |
| (10) | 0.42 | 0.39 | 0.40 | 0.40 | 0.42 | 0.42 | 0.42 |
| (11) | 2.15 | 1.94 | 1.94 | 1.97 | 2.08 | 2.05 | 2.06 |
| (12) | −1.65 | −1.84 | −1.84 | −1.94 | −1.67 | −1.72 | −1.73 |
| (13) | −0.57 | −0.64 | −0.65 | −0.66 | −0.59 | −0.60 | −0.60 |
| (14) | −2.97 | −3.16 | −3.16 | −3.21 | −2.89 | −2.94 | −2.96 |

TABLE 55-2

| Condition | Example | | | | | | |
|---|---|---|---|---|---|---|---|
| | 8 | 9 | 10 | 11 | 12 | 13 | 14 |
| (1) | −0.335 | −0.335 | −0.335 | −0.589 | −0.997 | −0.997 | −0.625 |
| (2) | −0.012 | −0.011 | −0.019 | −0.011 | −0.056 | −0.086 | −0.005 |
| (3) | 0.003 | 0.002 | 0.004 | 0.000 | 0.000 | 0.000 | −0.001 |
| (4) | −1.711 | −1.711 | −1.711 | −1.895 | −1.795 | −1.783 | −1.831 |
| (5) | 2.856 | 2.856 | 2.856 | 3.805 | 3.942 | 4.750 | 3.805 |
| (6) | 1.479 | 1.479 | 1.479 | 1.633 | 1.710 | 1.650 | 1.513 |
| (7) | 4.649 | 4.649 | 4.649 | 6.649 | 6.908 | 8.250 | 5.211 |
| (8) | 1.197 | 1.197 | 1.197 | 0.970 | 1.027 | 1.608 | 1.512 |
| (9) | 1.177 | 1.177 | 1.177 | 1.341 | 1.286 | 1.314 | 1.257 |
| (10) | 0.412 | 0.412 | 0.412 | 0.352 | 0.326 | 0.277 | 0.330 |
| (11) | 2.128 | 2.128 | 2.128 | 2.425 | 2.325 | 2.381 | 2.272 |
| (12) | −1.619 | −1.619 | −1.619 | −2.158 | −2.347 | −2.696 | −2.103 |
| (13) | −0.567 | −0.567 | −0.567 | −0.567 | −0.595 | −0.568 | −0.553 |
| (14) | −2.928 | −2.928 | −2.928 | −3.903 | −4.244 | −4.883 | −3.803 |

TABLE 55-3

| Condition | Example | | | |
|---|---|---|---|---|
| | 15 | 16 | 17 | 18 |
| (1) | −0.588 | −0.186 | −0.066 | −0.302 |
| (2) | −0.012 | −0.007 | −0.002 | −0.009 |
| (3) | 0.001 | 0.001 | −0.001 | 0.000 |
| (4) | −1.795 | −1.842 | −1.799 | −1.761 |
| (5) | 2.846 | 3.000 | 3.805 | 4.805 |
| (6) | 1.484 | 1.577 | 1.650 | 1.695 |
| (7) | 5.204 | 6.546 | 7.243 | 7.847 |
| (8) | 0.753 | 1.162 | 1.316 | 1.625 |
| (9) | 1.315 | 1.392 | 1.439 | 1.327 |
| (10) | 0.462 | 0.464 | 0.378 | 0.276 |
| (11) | 2.378 | 2.494 | 2.603 | 2.403 |
| (12) | −1.728 | −1.938 | −2.275 | −2.650 |
| (13) | −0.607 | −0.646 | −0.598 | −0.552 |
| (14) | −3.125 | −3.472 | −4.114 | −4.800 |

In addition, the zoom optical system of the present invention can be used in an image taking apparatus which comprises an image forming optical system and an electronic image sensor for receiving the image of an object formed by the image taking optical system such as a CCD image sensor to perform photographing, especially in a digital camera or a video camera, or an information processing device such as a personal computer, a telephone, or especially a cellular phone. Embodiments of the image taking apparatus will be described hereinafter.

Figure 37:
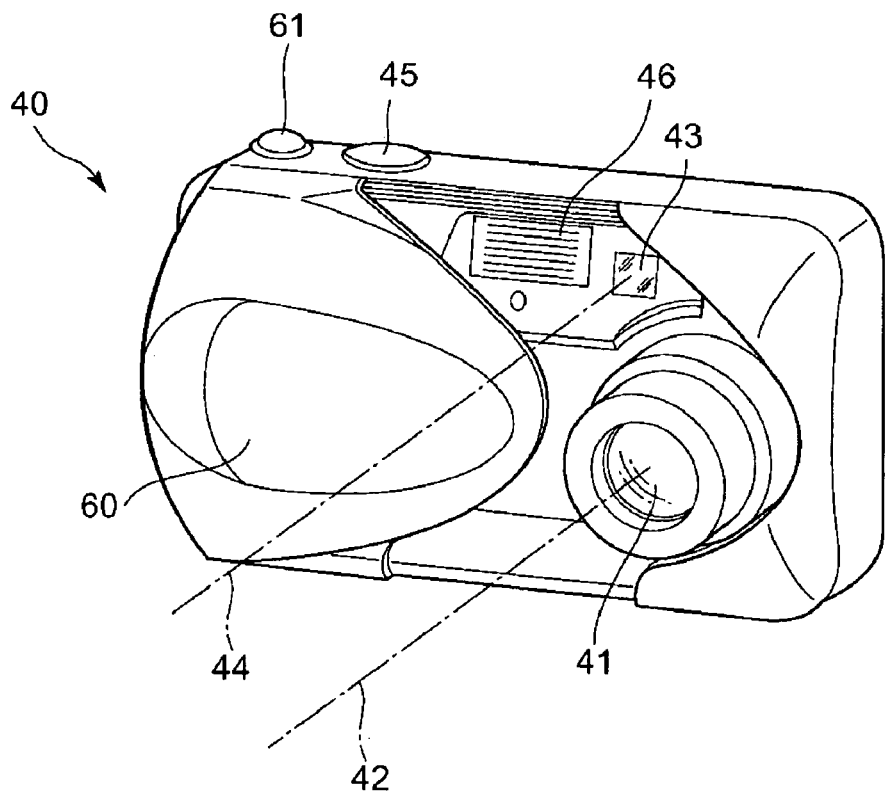
FIG. 37 is a front perspective view showing an appearance of a digital camera in which the zoom optical system of the present invention is incorporated.
Figure 38:
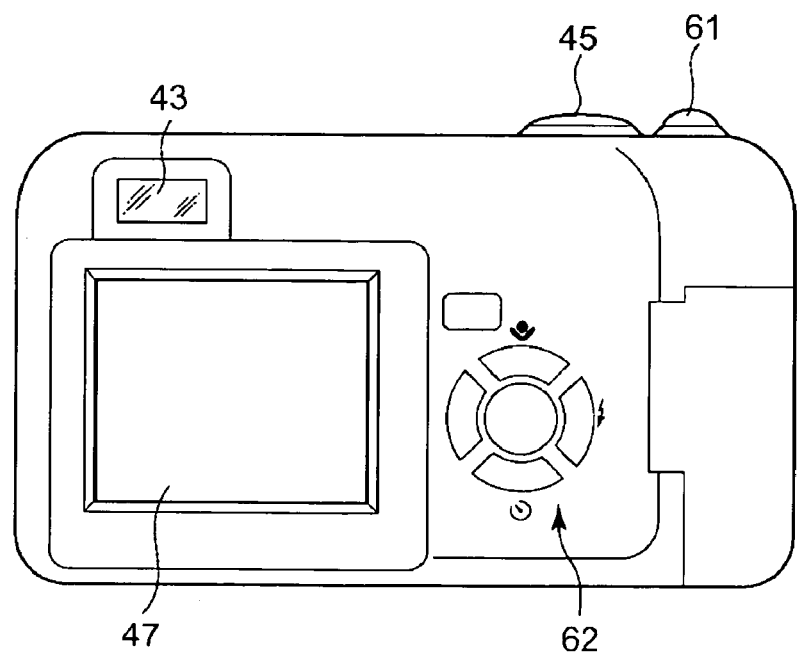
FIG. 38 is a rear view of the digital camera of FIG. 37.
Figure 39:
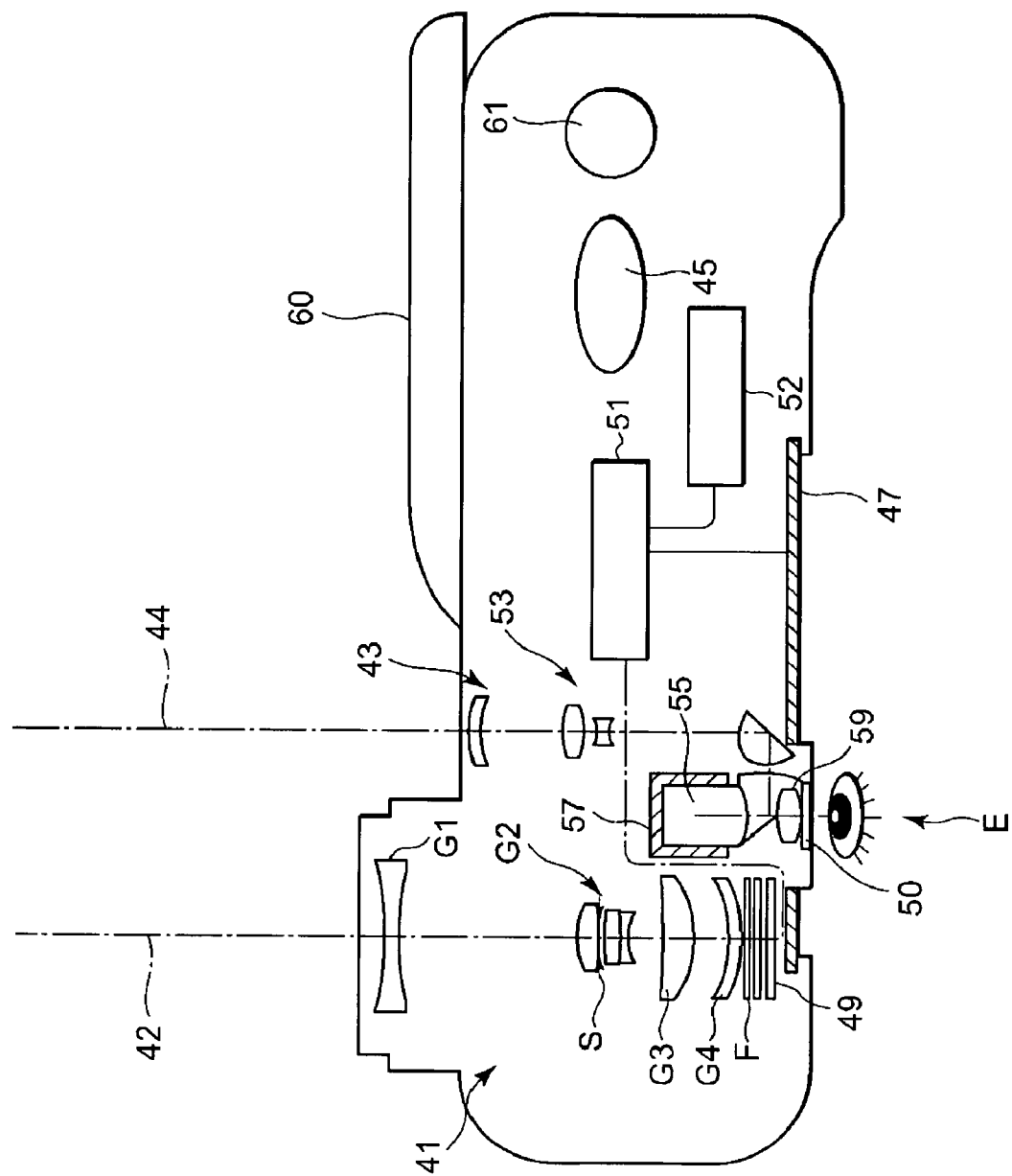
FIG. 39 is a diagrammatically sectional plan view of the digital camera of FIG. 37 for explaining the internal constitution thereof.

FIGS. 37 to 39 are conceptual diagrams of a digital camera in which the zoom optical system of the present invention is incorporated in a image forming optical system. FIG. 37 is a front perspective view showing an appearance of a digital camera 40, FIG. 38 is a rear view of the digital camera, and FIG. 39 is a diagrammatically sectional plan view showing the internal constitution of the digital camera 40. FIGS. 37 and 39 show that the image forming optical system 41 is brought into a non-collapsed state. In this example, the digital camera 40 includes: the image forming optical system 41; a finder optical system 43 having a finder optical path 44; a shutter release button 45; a flash lamp 46; a liquid crystal display monitor 47; a focal length control button 61; a setting change switch 62 and the like. When the image forming optical system 41 is collapsed, a cover 60 is slid to cover the image forming optical system 41, the finder optical system 43 and the flash lamp 46 with the cover 60. Moreover, when the cover 60 is opened to set the camera 40 to a photographing state, the image forming optical system 41 is brought into a non-collapsed state a shown in FIGS. 37 and 39. When the shutter release button 45 disposed in the upper portion of the camera 40 is pressed, the photographing is performed through the image forming optical system 41 in conjunction with the pressing of the button. As the image forming optical system, any of Examples 1 to 18 of the present invention may be used. In this embodiment, the zoom optical system of Example 1 is used. Therefore, the image forming optical system 41 comprises the first lens unit G1, the second lens Unit G2, the third lens unit G3 and the fourth lens unit G4. The aperture stop S is disposed in the second lens unit G2. An image of an object is formed by the image forming optical system 41 on the light receiving surface of a CCD image sensor 49 via the low pass filter F coated with an IR (infrared) cut coating and cover glass. The image of the object received by the CCD image sensor 49 is displayed as an electronic image in the liquid crystal display monitor 47 disposed in a rear surface of the camera via processing means 51. This processing means 51 is connected to recording means 52, and the electronic image can be recorded. It is to be noted that this recording means 52 may be disposed separately from the processing means 51, or may be constituted so that the image is electronically recorded in and reproduced from a storage medium such as a hard disc, a memory card, a DVD±R, a DVD±RW or the like. The camera may be constituted as a silver salt camera in which a silver salt film is disposed instead of the CCD image sensor 49.

Furthermore, the objective optical system 53 for the finder is disposed along the finder optical path 44. The objective optical system 53 for the finder includes a plurality of lens units (three units in this example) and two prisms. These optical elements constitute a zoom optical system whose focal length changes in conjunction with the zoom optical system of the image forming optical system 41. The object image formed by the objective optical system 53 for the finder is formed on the view field frame 57 of the erecting prism 55 which is an image erecting member. Behind the erecting prism 55, there is disposed an eyepiece optical system 59 which guides an erected image into an observer's eyeball E. It is to be noted that a cover member 50 is disposed on the exit side of the eyepiece optical system 59.

The digital camera 40 constituted in this manner is small in size and has an excellent performance since the image forming optical system 41 has a high performance, is small-sized, and can be collapsed when stored.

Figure 40:
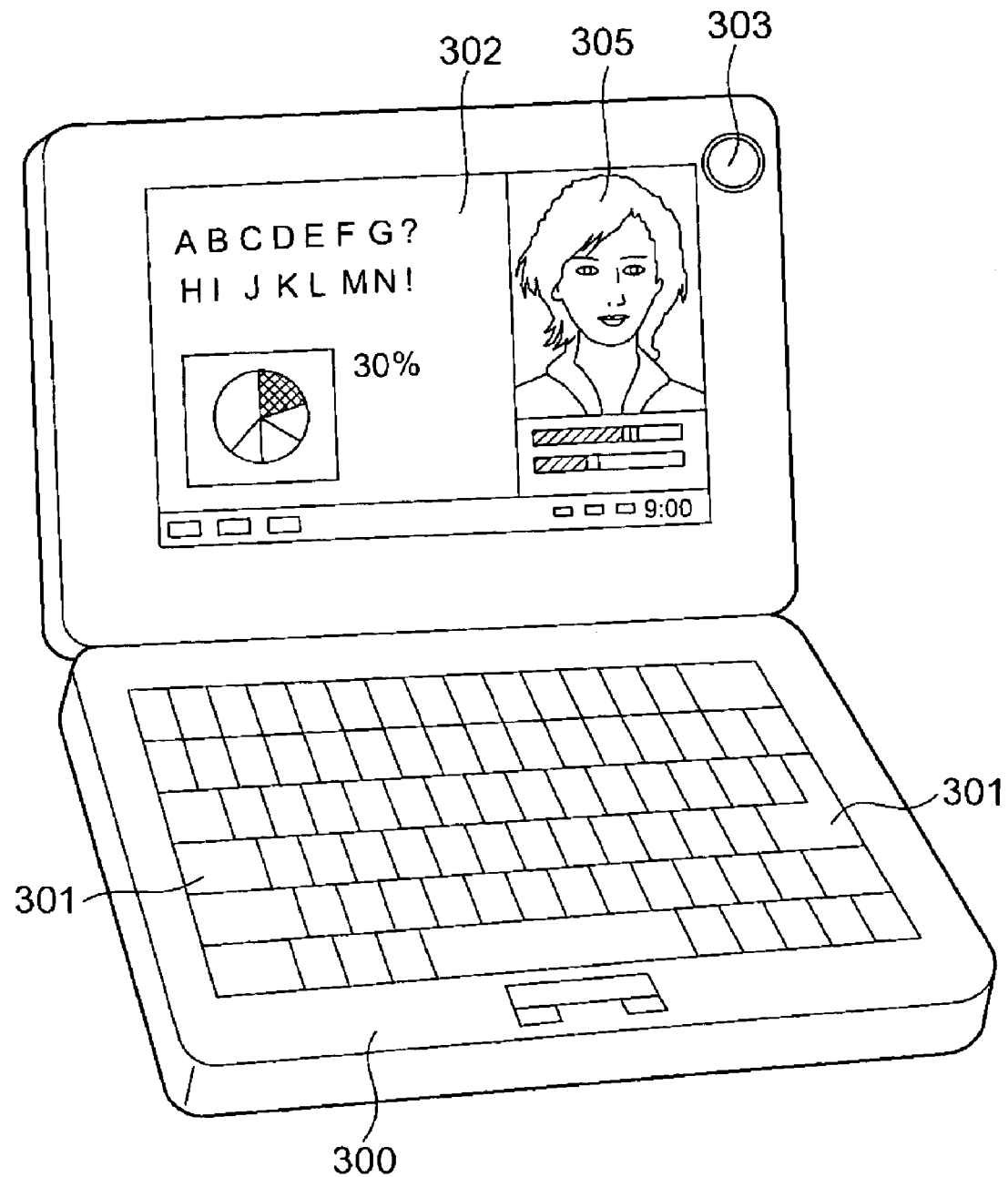
FIG. 40 is a front perspective view of a personal computer whose cover is opened and in which the zoom optical system of the present invention is incorporated.
Figure 41:
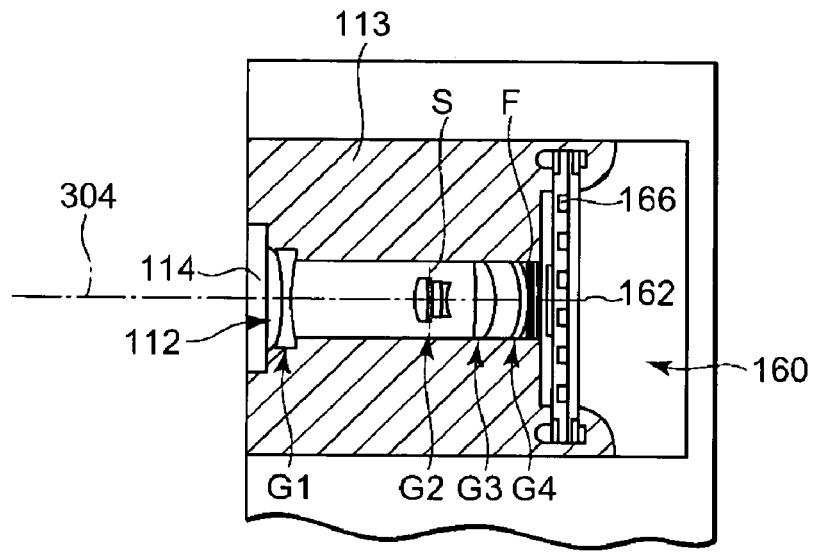
FIG. 41 is a sectional view of an objective optical system of the personal computer.
Figure 42:
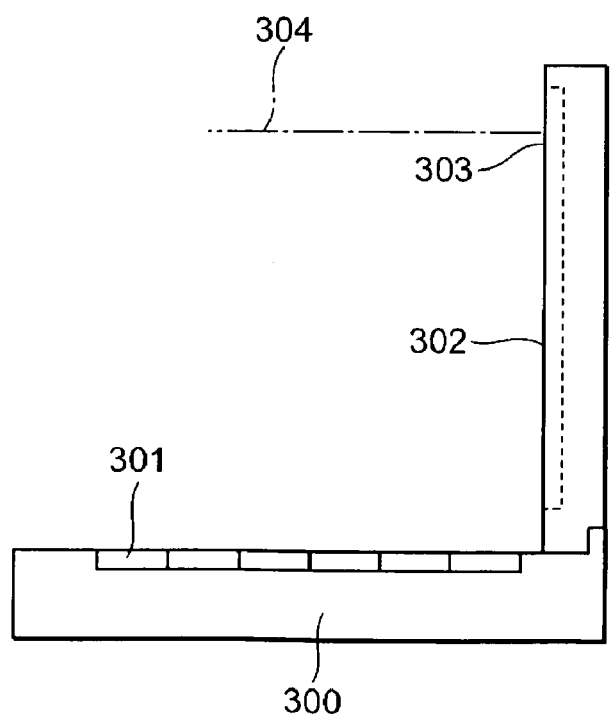
FIG. 42 is a side view showing a state of FIG. 40.

Next, FIGS. 40 to 42 show a personal computer as an example of the information processing apparatus in which the zoom optical system of the present invention is built as an image forming optical system. FIG. 40 is a front perspective view of a personal computer 300 whose cover is opened, FIG. 41 is a sectional view of the image pickup unit 303 of the personal computer 300, and FIG. 42 is a side view showing the state of FIG. 40. As shown in FIGS. 40 to 42, the personal computer 300 includes: a keyboard 301 for inputting information from the outside by an operator; information processing means or recording means (not shown); a monitor 302 which displays information to the operator; and an image pickup unit 303. Here, the monitor 302 may be a transmission type liquid crystal display element which illuminates the rear surface with back light (not shown), a reflective liquid crystal display element which reflects light from a front surface to display the image, a CRT display or the like. In the drawing, the image pickup unit 303 is built in an upper right portion of the monitor 302, but this place is not limited, and the system may be built in any portion around the monitor 302 or the keyboard 301.

The image pickup unit 303 has an image forming optical system 112 including the zoom optical system (not shown) of the present invention, and an image sensor chip 162 which receives the image formed by the image forming optical system 112. These components are built in the personal computer 300.

Here, the optical low pass filter F is additionally attached onto the image sensor chip 162, and integrally formed as an image sensor unit 160. The image sensor unit can be fitted into a rear end of a lens barrel 113 of the image forming optical system 112 by a one-touch operation. Therefore, the image forming optical system 112 or the image sensor chip 162 need not to be made alignment adjustment or surface space adjustment. Therefore, the image pickup unit can easily be assembled. A front end of the lens barrel 113 is provided with cover glass 114 for protecting the image forming optical system 112. It is to be noted that a driving mechanism of the zoom optical system in the lens barrel 113 is omitted from the drawing.

The object image received by the image sensor chip 162 is input into processing means of the personal computer 300 via a terminal 166, and displayed as an electronic image in the monitor 302. FIG. 40 shows, as one example, an image 305 photographed by the operator. The image 305 may be displayed in a communication partner's personal computer in a remote area via processing means and the internet or the phone.

Figure 43:
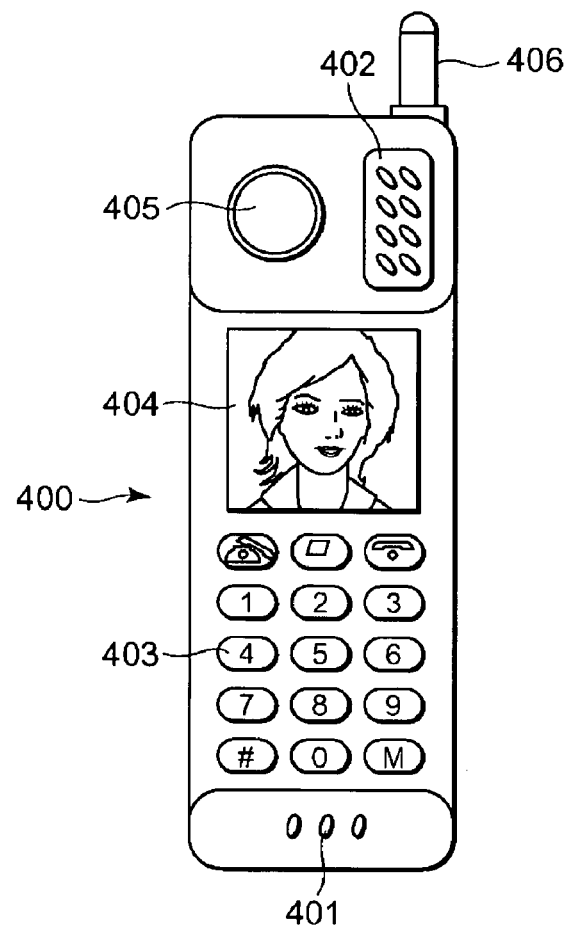
FIG. 43 is a front view of a cellular phone in which the zoom optical system of the present invention is incorporated.
Figure 44:
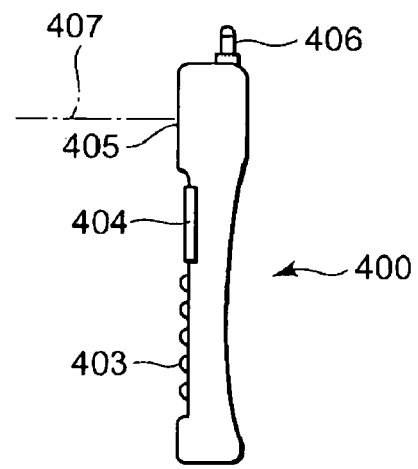
FIG. 44 is a side view of the cellular phone shown in FIG. 43.
Figure 45:
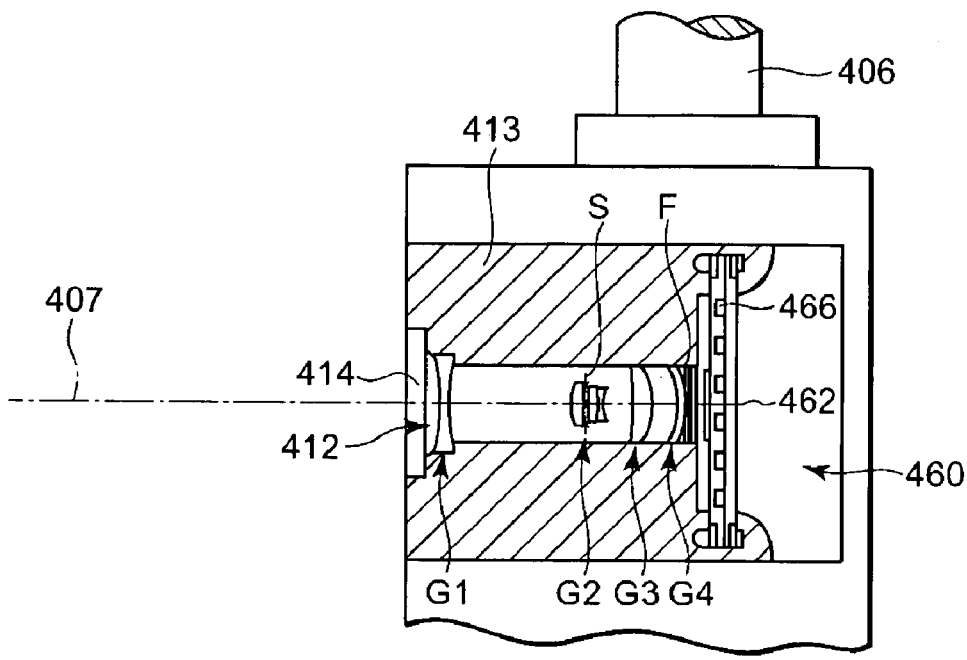
FIG. 45 is a sectional view of a image forming optical system of the cellular phone shown in FIG. 43.

Next, a cellular phone convenient to carry will be described as an example of the information processing apparatus in which the zoom optical system of the present invention is built as an image forming optical system with reference to FIGS. 43 to 45. FIG. 43 is a front view of a cellular phone 400, FIG. 44 is a side view of the cellular phone, and FIG. 45 is a sectional view of the image forming optical system 405. As shown in FIGS. 43 to 45, the cellular phone 400 has: a microphone 401 which inputs operator's voice as information; a speaker 402 which outputs talking partner's voice; an input keys 403 by which the operator inputs information; a monitor 404 which displays the operator, a photographed image of a talking partner or the like and information such as a phone number; a image pickup unit 405; an antenna 406 which transmits and receives a communication radio wave; and processing means (not shown) which processes image information, communication information, input signal and the like. Here, the monitor 404 is a liquid crystal display element. The arrangement of the constituent elements is not limited to that shown in the drawings. This image pickup unit 405 includes: the image forming optical system 412 disposed along an image taking optical path 407 and including the zoom optical system (not shown) of the present invention, and the image sensor chip 462 which receives the object image. These components are built in the cellular phone 400.

Here, the optical low pass filter F is additionally attached onto the image sensor chip 462, and integrally formed as the image sensor unit 460. The image sensor unit 460 can be fitted into a rear end of the lens barrel 413 of the image forming optical system 412 by the one-touch operation. Therefore, the image forming optical system 412 or the image sensor chip 462 does not be made alignment adjustment or surface space adjustment. Therefore, the system can easily be assembled. The front end of the lens barrel 413 is provided with the cover glass 414 for protecting the image forming optical system 412. It is to be noted that the driving mechanism of the zoom optical system in the lens barrel 413 is omitted from the drawing.

The object image received by the image sensor chip 462 is input into processing means (not shown) via the terminal 466, and displayed as the electronic image in both or either of the monitor 404 and a communication partner's monitor. In a case where the image is transmitted to the communication partner, processing means includes a signal processing function of converting information of the object image received by the image sensor chip 462 into a transmittable signal.

It is to be noted that when the filter such as a low pass filter is omitted in each embodiment, the camera can be constituted to be thin when collapsed.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom optical system comprising, in order from an object side: a first lens unit having a negative refractive power; a second lens unit having a positive refractive power; and a third lens unit having a positive refractive power, the zoom optical system changing a space between the lens units to thereby perform zooming and focusing, the first lens unit comprising a biconcave negative lens, the zoom optical system satisfying the following condition (1):

$$-3.0 < (r_{1GF} + r_{1GR})/(r_{1GF} - r_{1GR}) < 0.3 \tag{1}$$

wherein $r_{1GF}$ denotes a paraxial radius of curvature of an object-side surface of the negative lens of the first lens unit, and $r_{1GR}$ denotes a paraxial radius of curvature of an image-side surface of the negative lens of the first lens unit, and wherein the negative lens of the first lens unit has an aspherical surface whose negative refractive power weakens with distance from an optical axis.

2. The zoom optical system according to claim 1, wherein the object-side surface of the negative lens of the first lens unit is formed to be aspherical.

3. The zoom optical system according to claim 2, wherein the aspherical surface satisfies the following condition (2):

$$-0.1 < Asp_{1GF}/r_{1GF} < 0 \tag{2}$$

wherein $Asp_{1GF}$ denotes a deviation of the aspherical surface from a reference sphere in a position where an off-axial chief ray having a maximum angle of field passes through the object-side surface of the negative lens of the first lens unit in the wide-angle end.

4. The zoom optical system according to claim 1, further comprising:
   a fourth lens unit disposed between the third lens unit and an image surface and having an aspherical surface,
   wherein a space between the third lens unit and the fourth lens unit changes to perform the zooming or the focusing.

5. The zoom optical system according to claim 1, further comprising:
   a fourth lens unit which is a single lens disposed between the third lens unit and an image surface,
   wherein a space between the third lens unit and the fourth lens unit changes to perform the zooming or the focusing.

6. The zoom optical system according to claim 1, further comprising:
   a fourth lens unit disposed between the third lens unit and an image surface and having a positive refractive power,
   wherein a space between the third lens unit and the fourth lens unit changes to perform the zooming or the focusing.

7. A zoom optical system comprising, in order from an object side: a first lens unit having a negative refractive power; a second lens unit having a positive refractive power; and a third lens unit having a positive refractive power,
   the zoom optical system changing a space between the lens units to thereby perform zooming and focusing,
   the first lens unit being constituted of a negative lens,
   the zoom optical system satisfying the following conditions (1)(4):

$$-3.0 < (r_{1GF} + r_{1GR})/(r_{1GF} - r_{1GR}) < 0.3 \quad (1),$$

$$-5.0 < f_{1G}/f_{2G} < -1.3 \quad (4),$$

wherein $f_{1G}$ denotes a focal length of the first lens unit, and $f_{2G}$ denotes a focal length of the second lens unit, $r_{1GF}$ denotes a paraxial radius of curvature of an object-side surface of the negative lens of the first lens unit, and $r_{1GR}$ denotes a paraxial radius of curvature of an image-side surface of the negative lens of the first lens unit 8. The zoom optical system according to claim 7, wherein the negative lens of the first lens unit is a biconcave negative lens.

9. The zoom optical system according to claim 7, wherein the object-side surface of the negative lens is formed to be aspherical, and satisfies the following condition (2):

$$-0.1 < Asp_{1GF}/r_{1GF} < 0 \quad (2),$$

wherein $Asp_{1GF}$ denotes a deviation of the aspherical surface from a reference sphere in a position where an off-axial chief ray having a maximum angle of field passes through the object-side surface of the negative lens of the first lens unit in the wide-angle end.

10. A zoom optical system comprising, in order from an object side: a first lens unit having a negative refractive power; a second lens unit having a positive refractive power; and a third lens unit having a positive refractive power,
   the zoom optical system changing a space between the lens units to thereby perform zooming and focusing,
   the first lens unit comprising a negative lens,
   the zoom optical system satisfying the following conditions (5) to (7):

$$1.8 < f_t/f_w \quad (5);$$

$$0.50 < f_{2G}/f_w < 2.00 \quad (6);$$

and $$1.0 < d_{12w}/d_{23w} < \infty \quad (7),$$

wherein $f_w$ denotes a focal length of the zoom optical system in a wide-angle end, $f_t$ denotes a focal length of the zoom optical system in a telephoto end, $f_{2G}$ denotes a focal length of the second lens unit, $d_{12w}$ denotes an axial length between a lens surface of the first lens unit closest to an image side and a lens surface of the second lens unit closest to the object side in the wide-angle end, and $d_{23w}$ denotes an axial length between a lens surface of the second lens unit closest to the image side and a lens surface of the third lens unit closest to the object side in the wide-angle end
   wherein the second lens unit comprises three lenses including two positive lenses and one negative lens.

11. A zoom optical system comprising, in order from an object side: a first lens unit having a negative refractive power; a second lens unit having a positive refractive power; and a third lens unit having a positive refractive power,
   the zoom optical system changing a space between the lens units to thereby perform zooming and focusing,
   the first lens unit comprising a negative lens,
   the second lens unit comprising, in order from the object side, a positive lens, a positive lens directing a convex surface on the object side and a negative lens directing a concave surface on an image side, the positive lens directing a convex surface on the object side being cemented to the negative lens directing a concave surface on the image side, wherein an aperture stop is positioned between the positive lens and the positive lens directing the convex surface on the object side in the second lens unit;
   wherein the aperture stop is constituted so that an aperture shape is fixed, and a brightness adjusting member is disposed between the other lenses.

12. A zoom optical system comprising, in order from an object side: a first lens unit having a negative refractive power; a second lens unit having a positive refractive power; and a third lens unit having a positive refractive power,
   the zoom optical system changing a space between the lens units to thereby perform zooming and focusing,
   the first lens unit comprising a negative lens,
   the third lens unit including a positive lens directing a convex surface on an image side,
   the zoom optical system satisfying the following condition (8):

$$0.1 < (r_{3GF} + r_{3GR})/(r_{3GF} - r_{3GR}) < 5.0 \quad (8),$$

wherein $r_{3GF}$ denotes a paraxial radius of curvature of an object-side surface of the positive lens of the third lens unit, and $r_{3GR}$ denotes a paraxial radius of curvature of an image-side surface of the positive lens of the third lens unit, and
   wherein only the third lens unit moves to perform the focusing.

13. A zoom optical system comprising, in order from an object side: a first lens unit having a negative refractive power; a second lens unit having a positive refractive power; a third lens unit having a positive refractive power; and a fourth lens unit,
   the zoom optical system changing a space between the lens units to thereby perform zooming and focusing,
   the first lens unit including a negative lens, the number of lenses included in the first lens unit being one,
   the number of lenses included in the second lens unit being three,
   the number of lenses included in the third lens unit being one,
   the number of lenses included in the fourth lens unit being one, the second lens unit being comprising two positive lenses and a negative lens,
wherein the fourth lens unit is fixes during the zooming.

14. The zoom optical system according to claim 4 or 13, wherein the zoom optical system is a four-unit zoom lens system.

15. The zoom optical system according to any one of claims 1, 7, 10, 12, and 13, wherein the total number of lenses included in the zoom optical system is six.

16. The zoom optical system according to any one of claims 1, 7, 10, 12 and 13, further satisfying the following condition:

$$0.6 < TLG_{sum}/f_w < 1.7 \quad (9),$$

wherein $TLG_{sum}$ denotes a sum of thicknesses of the lens units constituting the zoom optical system, and $f_w$ denotes a focal length of the zoom optical system in the wide-angle end.

17. The zoom optical system according to any one of claims 1, 7, 10, 12, and 13, further satisfying the following condition:

$$0.2 < TLG_{sum}/f_t < 1.5 \quad (10),$$

wherein $TLG_{sum}$ denotes a sum of thicknesses of the lens units constituting the zoom optical system, and $f_t$ denotes a focal length of the zoom optical system in a telephoto end.

18. The zoom optical system according to any one of claims 1, 7, 10, 12 and 13, further satisfying the following condition:

$$1.2 < TLG_{sum}/Y' < 3.0 \quad (11),$$

wherein $TLG_{sum}$ denotes a sum of thicknesses of the lens units constituting the zoom optical system, and Y' denotes an image height.

19. The zoom optical system according to any one of claims 1, 7, 10, 12 and 13, further satisfying the following condition:

$$-3.0 < \Delta_{12WT}/f_w < -1 \quad (12),$$

wherein $\Delta_{12WT}$ denotes a difference of a space between the first lens unit and the second lens unit in the telephoto from that in the wide-angle end, and $f_w$ denotes a focal length of the zoom optical system in the wide-angle end.

20. The zoom optical system according to any one of claims 1, 7, 10, 12 and 13, further satisfying the following condition:

$$-0.9 < \Delta_{12WT}/f_t < -0.3 \quad (13),$$

wherein $\Delta_{12WT}$ denotes a difference of a space between the first lens units and the second lens units in the telephoto end from that in the wide-angle end, and $f_t$ denotes a focal length of the zoom optical system in the telephoto end.

21. The zoom optical system according to any one of claims 1, 7, 10, 12 and 13, satisfying the following condition:

$$-5.0 < \Delta_{12WT}/Y' < -1.0 \quad (14),$$

wherein $\Delta_{12WT}$ denotes a difference of a space between the first lens units and the second lens units in the telephoto end and that in the wide-angle end, and Y' denotes an image height.

22. A zoom optical system comprising, in order from an object: side: a first lens unit having a negative refractive power; a second lens unit having a positive refractive power; a third lens unit having a positive refractive power; and a fourth lens unit,
the zoom optical system changing a space between the lens units to thereby perform zooming and focusing,
the first lens unit being constituted of a biconcave negative lens,
the second lens unit having an aperture stop,
the third lens unit being constituted of a positive lens having a convex surface on an image side,
the fourth lens unit being constituted of a lens,
the number of the lenses constituting the second lens unit being not less than that of the lenses constituting the first lens unit, the third lens unit and the fourth lens unit,
wherein the fourth lens is a meniscus lens directing a concave on an object side, and
the third lens unit is moved to perform focusing.

23. The zoom optical system according to claim 22, further satisfying the following condition (1):

$$-3.0 < (r_{1GF} + r_{1GR})/(r_{1GF} - r_{1GR}) < 0.3 \quad (1),$$

wherein $r_{1GF}$ denotes a paraxial radius of curvature of an object-side surface of the negative lens of the first lens unit, and $r_{1GR}$ denotes a paraxial radius of curvature of an image-side surface of the negative lens of the first lens unit.

24. The zoom optical system according to claim 22, further satisfying the following conditions (5) to (7):

$$1.8 < f_t/f_w \quad (5);$$

$$0.50 < f_{2G}/f_w < 2.00 \quad (6);$$

and $$1.0 < d_{12W}/d_{23w} < \infty \quad (7),$$

wherein $f_w$ denotes a focal length of the zoom optical system in a wide-angle end, $f_t$ denotes a focal length of the zoom optical system in a telephoto end, $f_{2G}$ denotes a focal length of the second lens unit, $d_{12w}$ denotes an axial length between a lens surface of the first lens unit closest to an image side and a lens surface of the second lens unit closest to the object side in the wide-angle end, and $d_{23w}$ denotes an axial length between a lens surface of the second lens unit closest to the image side and a lens surface of the third lens unit closest to the object side in the wide-angle end.

25. The zoom optical system according to claim 22, wherein the aperture stop is constituted so that an aperture shape is fixed, and a brightness adjusting member is disposed between the other lenses.

26. The zoom optical according to claim 22, further satisfying the following condition (8):

$$0.1 < (r_{3GF} + r_{3GR})/(r_{3GF} - r_{3GR}) < 5.0 \quad (8),$$

wherein $r_{3GF}$ denotes a paraxial radius of curvature of an object-side surface of the positive lens of the third lens unit, and $r_{3GR}$ denotes a paraxial radius of curvature of an image-side surface of the positive lens of the third lens unit.

27. A zoom optical system comprising, in order from an object side: a first lens unit having a negative refractive power; a second lens unit having a positive refractive power; and a third lens unit having a positive refractive power,
the zoom optical system changing a space between the lens units to thereby perform zooming and focusing,
the first lens unit comprising a negative lens,
the second lens unit comprising, in order from the object side, a positive lens, a positive lens directing a convex surface on the object side and a negative lens directing a concave surface on an image side, the positive lens directing a convex surface on the object side being cemented to the negative lens directing a concave surface on the image side,
wherein an aperture stop is positioned between the positive lens and the positive lens directing the convex surface on the object side in the second lens unit;

and wherein the zoom optical system satisfies the following condition:

$$1.2 < TLG_{sum}/Y' < 3.0 \quad (11),$$

wherein $TLG_{sum}$ denotes a sum of thicknesses of the lens units constituting the zoom optical system, and Y' denotes an image height.

28. A zoom optical system comprising, in order from an object side: a first lens unit having a negative refractive power; a second lens unit having a positive refractive power; and a third lens unit having a positive refractive power, the zoom optical system changing a space between the lens units to thereby perform zooming and focusing, the first lens unit comprising a negative lens, the second lens unit comprising, in order from the object side, a positive lens, a positive lens directing a convex surface on the object side and a negative lens directing a concave surface on an image side, the positive lens directing a convex surface on the object side being cemented to the negative lens directing a concave surface on the image side, wherein an aperture stop is positioned between the positive lens and the positive, lens directing the convex surface on the object side in the second lens unit;

and wherein the zoom optical system satisfies the following condition:

$$-5.0 < \Delta_{12WT}/Y' < -1.0 \quad (14),$$

wherein $\Delta_{12WT}$ denotes a difference of a space between the first lens units and the second lens units in the telephoto end and that in the wide-angle end, and Y' denotes an image height.

\* \* \* \* \*